United States Patent
He

(10) Patent No.: US 11,805,941 B1
(45) Date of Patent: *Nov. 7, 2023

(54) SCALABLE AUTOMATED COOKING SYSTEM

(71) Applicant: Zhengxu He, Reno, NV (US)

(72) Inventor: Zhengxu He, Reno, NV (US)

( * ) Notice: Subject to any disclaimer, the term of this patent is extended or adjusted under 35 U.S.C. 154(b) by 490 days.

This patent is subject to a terminal disclaimer.

(21) Appl. No.: 17/062,553

(22) Filed: Oct. 3, 2020

Related U.S. Application Data

(63) Continuation-in-part of application No. 16/537,640, filed on Aug. 12, 2019, now abandoned, which is a continuation-in-part of application No. 16/180,051, filed on Nov. 5, 2018, now Pat. No. 11,363,916, which is a continuation-in-part of application No. 15/921,908, filed on Mar. 15, 2018, now Pat. No. 11,330,929, which is a continuation-in-part of application No. 15/798,357, filed on Oct. 30, 2017, now Pat. No. 11,096,514, said application No. 16/537,640 is a continuation-in-part of application No. 15/157,319, filed on May 17, 2016, now Pat. No. 10,455,987, which is a continuation of application No. 13/770,081, filed on Feb. 19, 2013, now abandoned.

(60) Provisional application No. 62/597,096, filed on Dec. 11, 2017, provisional application No. 62/480,334, filed on Mar. 31, 2017, provisional application No.
(Continued)

(51) Int. Cl.
*A47J 37/00* (2006.01)
*A47J 27/14* (2006.01)
*A47J 44/00* (2006.01)
*A23L 5/10* (2016.01)

(52) U.S. Cl.
CPC ............ *A47J 37/00* (2013.01); *A23L 5/10* (2016.08); *A23L 5/11* (2016.08); *A47J 27/14* (2013.01); *A47J 44/00* (2013.01)

(58) Field of Classification Search
None
See application file for complete search history.

(56) References Cited

U.S. PATENT DOCUMENTS

| 1,964,804 A | * | 7/1934 | Barnard | ............... A63H 19/30 246/465 |
| 3,908,531 A | * | 9/1975 | Morley | ............... A47J 37/1219 99/336 |

(Continued)

FOREIGN PATENT DOCUMENTS

| CN | 101683236 A | * | 3/2010 | ............ A47J 27/004 |
| EP | 0455477 A2 | * | 11/1991 | ......... G07F 17/0085 |

*Primary Examiner* — John J Norton

(57) ABSTRACT

An automatic cooking system includes a computer system that stores recipes, cooking stations each comprising a cookware that can cook food ingredients therein to produce a first cooked food, wherein the computer system can assign and schedule a plurality of dishes to be cooked at the cooking stations, containers configured to hold food ingredients, mini vehicles each carrying containers of food ingredients, wherein the computer system can control at least some of movements of the mini vehicles in accordance to the recipes, a loading apparatus configured to load containers of food ingredients to the mini vehicles, and a dispensing apparatus that can dispense food ingredients from containers to a cookware.

20 Claims, 55 Drawing Sheets

Related U.S. Application Data

62/466,294, filed on Mar. 2, 2017, provisional application No. 62/422,022, filed on Nov. 14, 2016.

(56) References Cited

U.S. PATENT DOCUMENTS

| | | | | |
|---|---|---|---|---|
| 4,270,486 | A * | 6/1981 | Leverenz | A23P 20/12 |
| | | | | 118/679 |
| 4,503,502 | A * | 3/1985 | Chapin | A47J 27/14 |
| | | | | 99/335 |
| 4,748,902 | A * | 6/1988 | Maurantonio | A47J 37/1228 |
| | | | | 99/341 |
| 4,919,950 | A * | 4/1990 | Mak | G07F 11/70 |
| | | | | 426/523 |
| 5,165,331 | A * | 11/1992 | Hayashi | G07F 9/105 |
| | | | | 99/450.2 |
| 5,241,899 | A * | 9/1993 | Kuhlman | A47J 27/18 |
| | | | | 118/16 |
| 5,782,170 | A * | 7/1998 | Pomara, Jr. | A47J 37/1228 |
| | | | | 426/438 |
| 6,112,645 | A * | 9/2000 | Chang | A47J 37/1228 |
| | | | | 99/335 |
| 7,478,749 | B2 * | 1/2009 | Clothier | G06Q 10/087 |
| | | | | 235/383 |
| 7,899,709 | B2 * | 3/2011 | Allard | A47F 10/06 |
| | | | | 219/388 |
| 8,276,506 | B2 * | 10/2012 | Tojo | B25J 9/0003 |
| | | | | 99/348 |
| 2002/0176921 | A1 * | 11/2002 | Torghele | A21C 1/142 |
| | | | | 426/549 |
| 2015/0013550 | A1 * | 1/2015 | Lin | A47J 37/1228 |
| | | | | 99/404 |

* cited by examiner

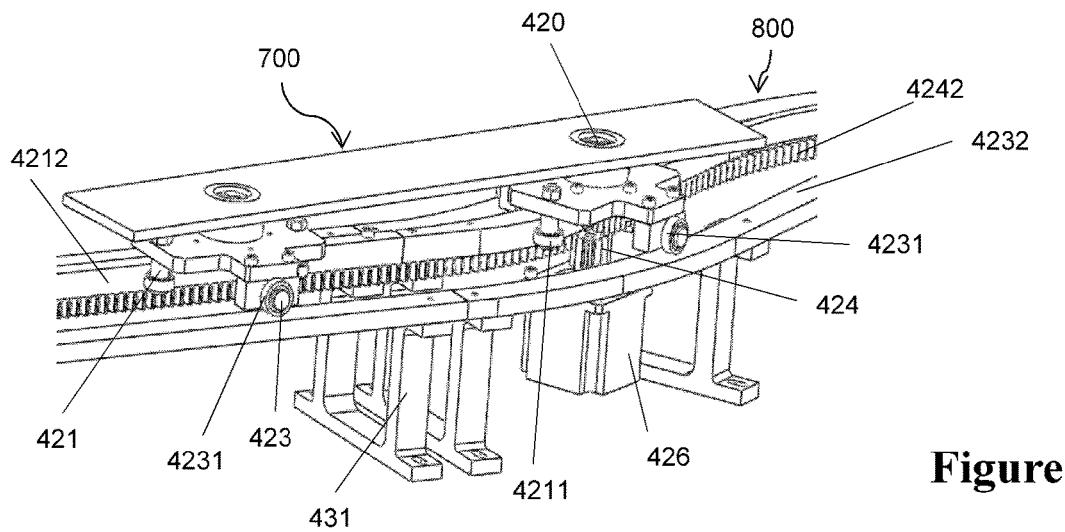
Figure 9A
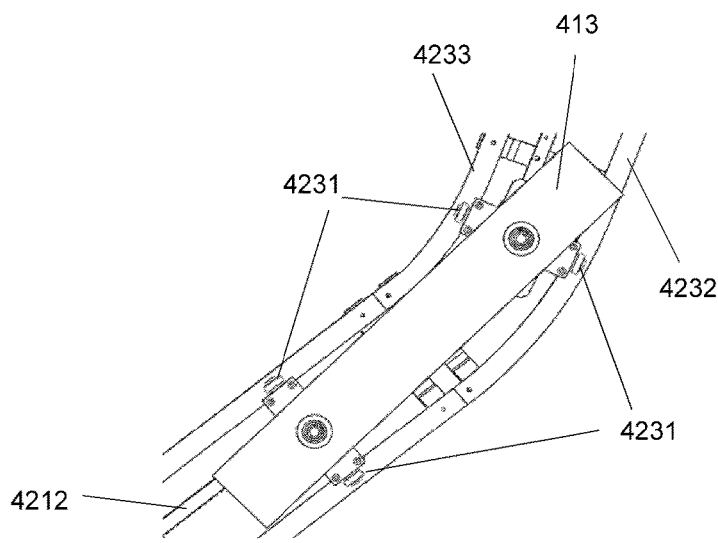
Figure 9B
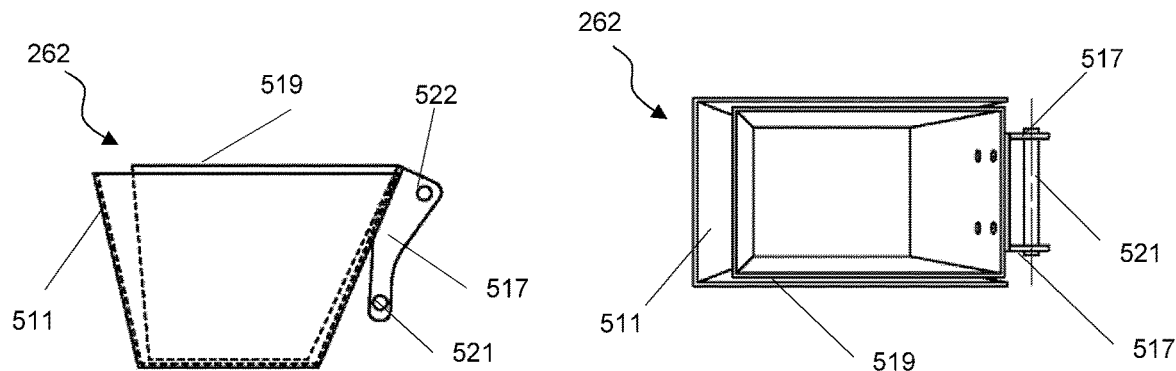
Figure 10A  Figure 10B

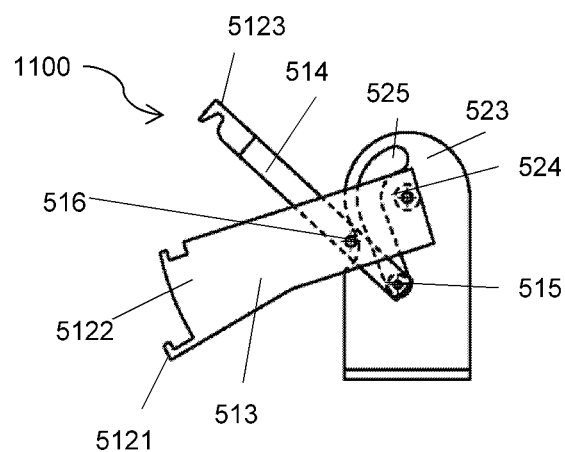
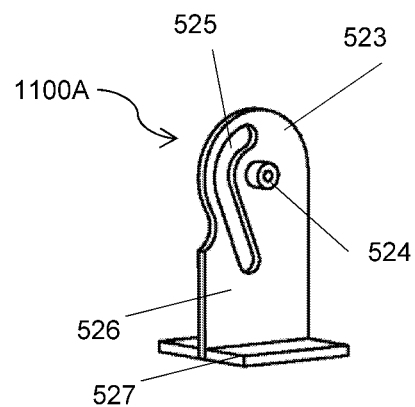
Figure 11A
Figure 11B
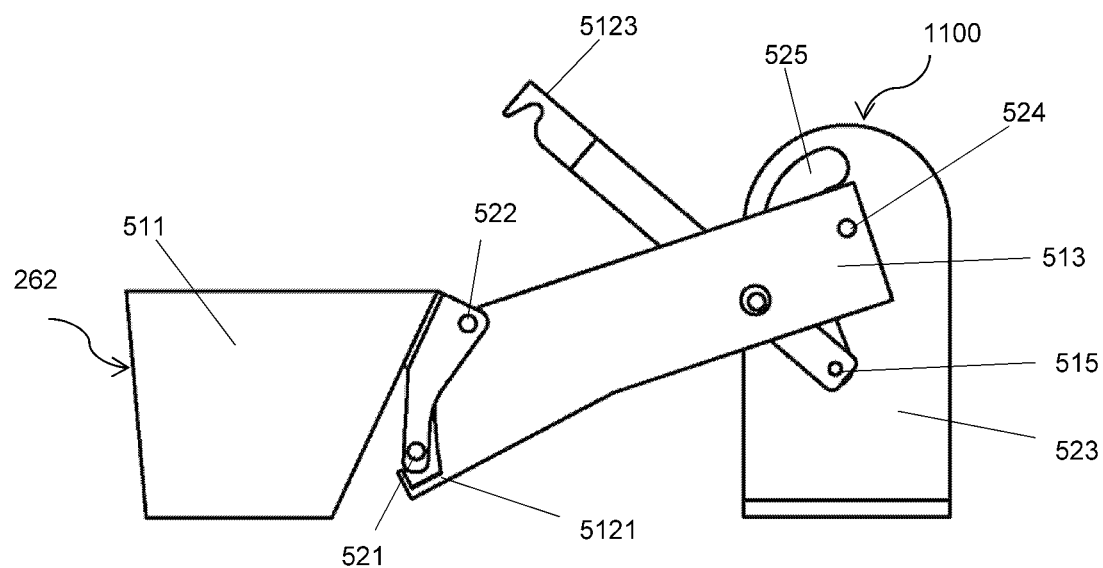
Figure 11C

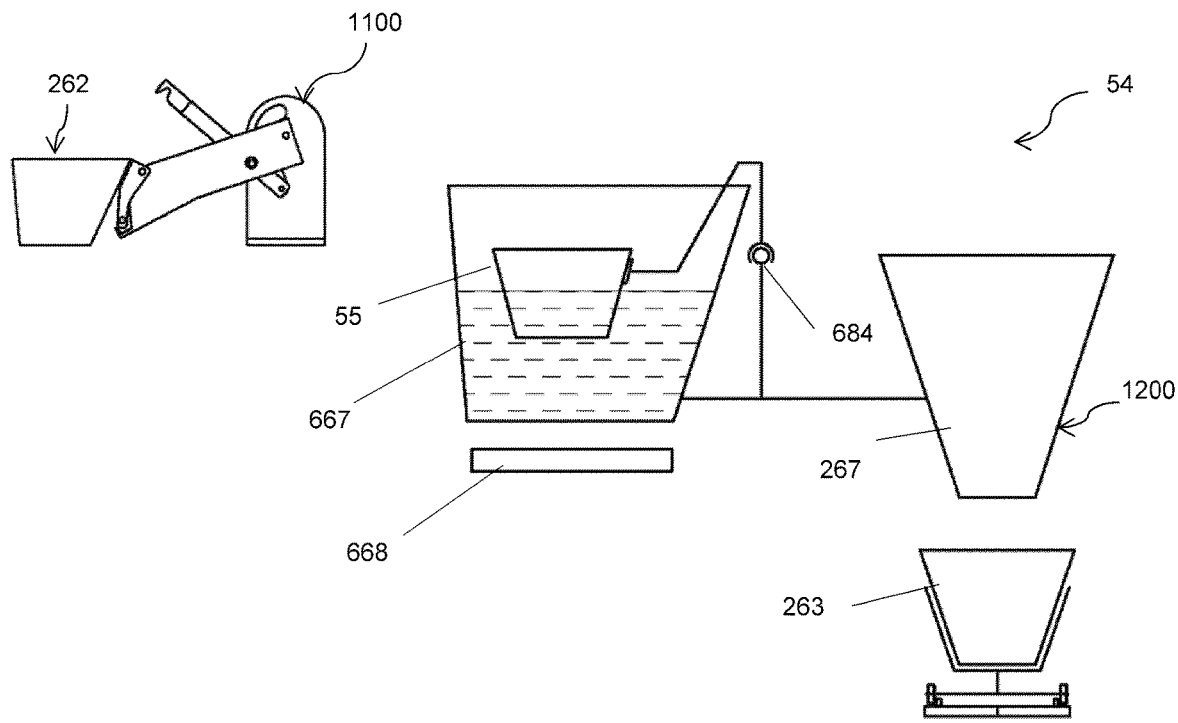
Figure 12B
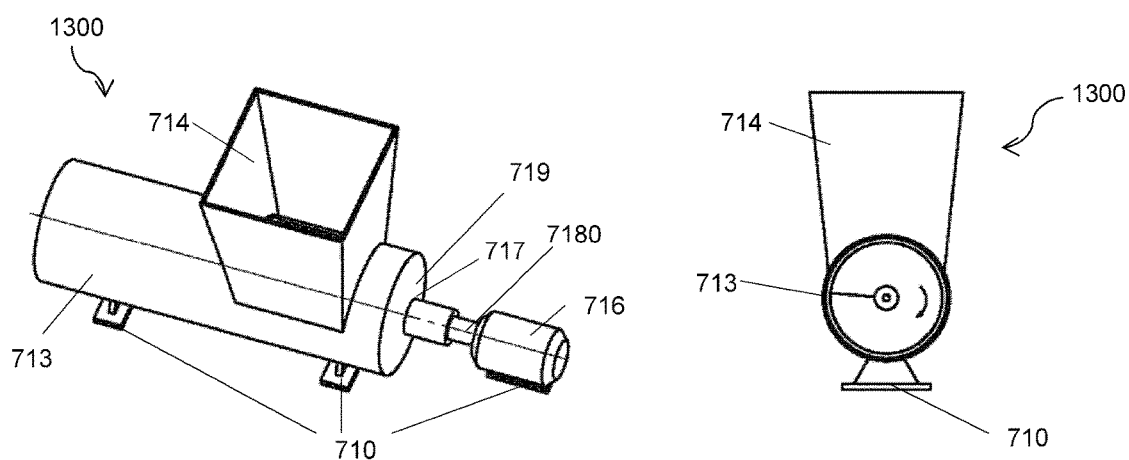
Figure 13A
Figure 13B

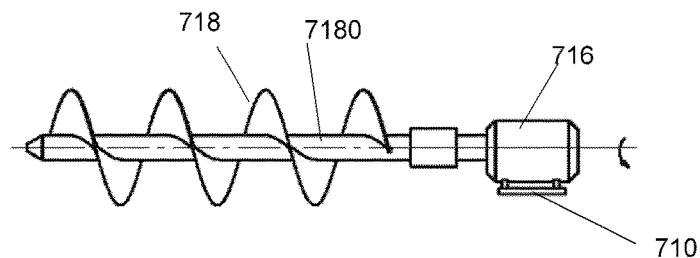
Figure 13C
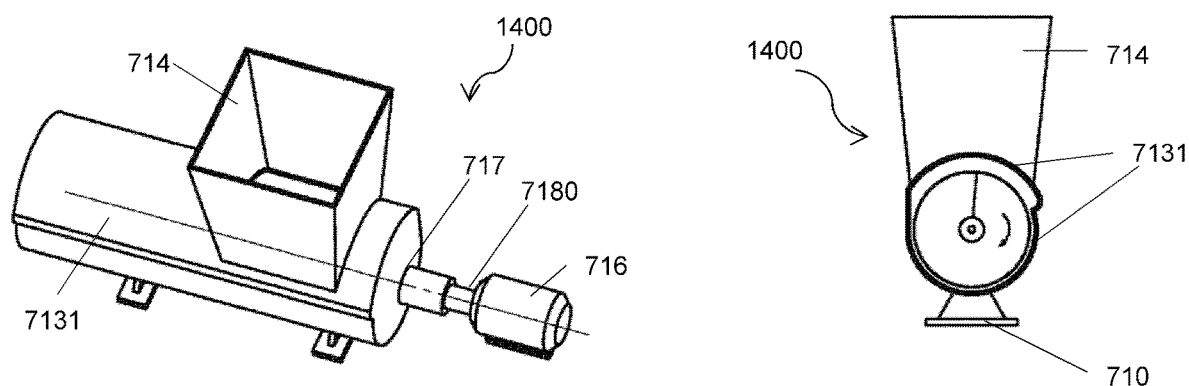
Figure 14A
Figure 14B
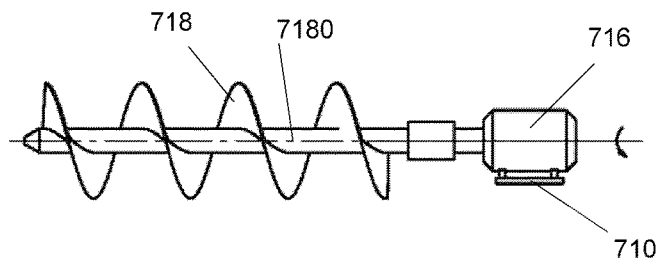
Figure 14C

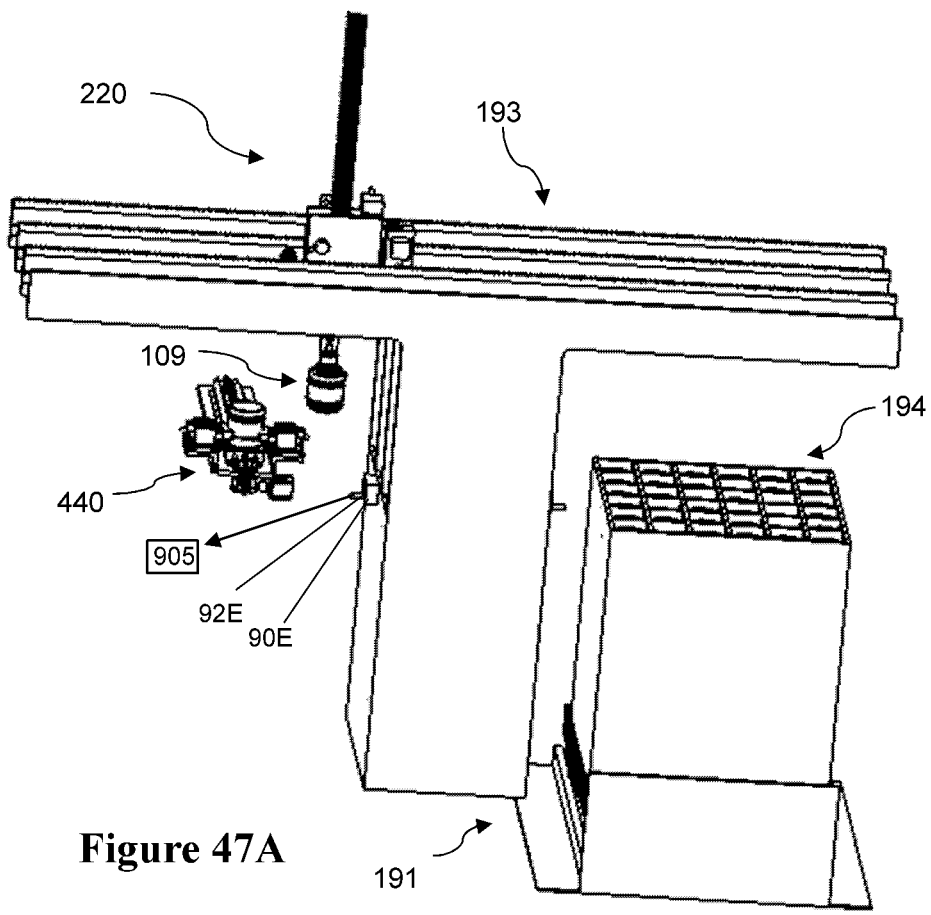
Figure 47A
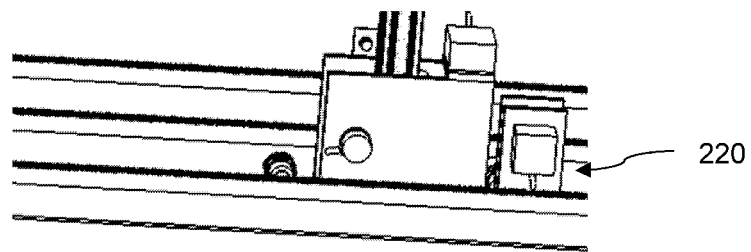
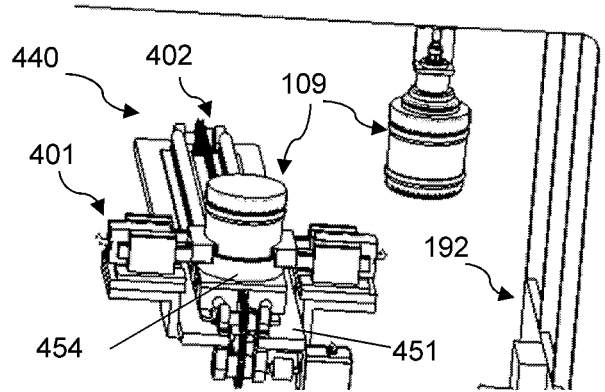
Figure 47B

Store sub-programs in computers 905, 903,903x and 904, so the computer is configured to receive the signals to control the motor(s) and/or other electric or electronic devices of the cooking system 610 (or 610x), the storage system 560, the transport system 801, the unloading apparatus 703,etc, connected to the computer. Install a database in computer 907. Store the IDs of the cooking systems, IDs of the computers 905, 903, 903x and 904 in the computer 80. 860

Store a menu, which is a list or sub-list of food items which can be cooked by a cooking system, in the computer 80. 861

For each food item in the menu and each cooking system, store a recipe comprising a "list of cooking sub-programs, IDs of the second computers and relative timings,"; and a "list of ingredient contents exclusively needed for the food item and their dispensing timings." 862

Store the information of the containers of the storage apparatus 191 in the computer, including a list of positions of and food ingredients in the containers. When the transfer apparatus 220 moves each container in the transport cart 194 to a position in the storage apparatus 191, and the QR code or barcode on the container is decoded. The computer system 909 matches the code with the container in the "transport cart content information," and add the container's information to the list of positions of and food ingredients in the containers of the storage apparatus 191. 863

Dynamically store the battery information and the information on the time dependent positions of each mini vehicle 790 in the transport system 801 in the computer, the computer may control the mini vehicle 790 to charge when the battery of the mini vehicle 790 is running low. 864

Figure 62

When an inquiry is made for a food item on the menu, the computer is configured to read the "list of ingredient contents" of the food item and determine if there are enough ingredients in the storage apparatus 191. If yes, then allow an order for the food item. If not, then do not allow an order for the food item. 871

↓

For each food item ordered, the computer system 909 is configured to determine the positions of the needed containers and then remove these containers from the "list of containers in the storage apparatus 191." 872

↓

Following Step 872, for the food item ordered, schedule the following: (1) the transfer and cap-opening of the needed container; (2) the cooking of the ordered food item at a cooking system. 873

↓

Following Step 873, for the food item ordered, add the following to the "list of instructions" on the computer 901: (1) the "list of transfer and cap-opening sub-programs, the IDs of the second computers and the computers 904 and relative timings" with relative timings substituted by real timings per the schedule in Step 873; (2) the "list of cooking sub-programs, the IDs of the second computers and relative timings" with relative timings substituted by real timings per the schedule in Step 873. (3) the " list of the relative timings" with relative timings substituted by real timings as scheduled in Step 873. 874

↓

Following Step 874, for the food item ordered, the computer system 909 can control the motions of the storage system 560, the transport system 801 and the cooking system 610 (or 610x), schedule the following: (1) the transfer apparatuses 220 move the needed containers out of the storage apparatus 191 and the cap opening apparatus 370 opens the caps of the containers. (2) the container loading apparatus 350 moves the uncapped container to a mini vehicle 790 and the mini vehicle 790 move the uncapped container to a position accessible by the dispensing apparatus 910 (or 910x). (3) the cooking system 610 (or 610x) starts cooking the food item ordered and the dispensing apparatus 910 (or 910x) dispense the food ingredients in the uncapped container into the cookware 101 (or respectively 101x) of the cooking system according to the "list of ingredient contents exclusively needed for the food item and their dispensing timings. 875

Figure 63

SCALABLE AUTOMATED COOKING SYSTEM

This application is a continuation-in-part of U.S. application Ser. No. 16/537,640 filed Aug. 12, 2019, which is a continuation-in-part of U.S. application Ser. No. 15/157,319 filed May 17, 2016, now U.S. patent Ser. No. 10/455,987, which was a continuation of U.S. application Ser. No. 13/770,081 filed Feb. 19, 2013, now abandoned.

The U.S. application Ser. No. 15/157,319 is a continuation-in-part of the U.S. application Ser. No. 16/180,051 filed Nov. 5, 2018, which was a continuation-in-part of the U.S. application Ser. No. 15/921,908 filed Mar. 15, 2018, which was a continuation-in-part of the U.S. application Ser. No. 15/798,357 filed Oct. 30, 2017, which claimed the benefit of U.S. Provisional Application Ser. No. 62/422,022 filed Nov. 14, 2016, Ser No. 62/466,294 filed Mar. 2, 2017, and Ser No. 62/480,334 filed Mar. 31, 2017.

The U.S. application Ser. No. 15/921,908 filed Mar. 15, 2018 claimed the benefit of U.S. Provisional Application Ser. No. 62/597,096 filed Dec. 11, 2017. Entire contents of all the above applications are incorporated herein by reference.

CROSS-REFERENCE TO RELATED APPLICATIONS

U.S. Patent Applications

Ser. No. 16/537,640, Filed: Aug. 12, 2019, Inventor: Zhengxu He
Ser. No. 15/157,319, Filed: May 17, 2016, Inventor: Zhengxu He
Ser. No. 13/770,081, Filed: Feb. 19, 2013, Inventor: Zhengxu He
Ser. No. 13/607,712, Filed: Sep. 8, 2012, Inventor: Zhengxu He
Ser. No. 13/490,523, Filed Jun. 7, 2012, Inventor: Zhengxu He
Ser. No. 16/180,051, Filed Nov. 5, 2018; Inventor: Zhengxu He
Ser. No. 15/921,908, Filed Mar. 15, 2018; Inventor: Zhengxu He
Ser. No. 15798357, Filed Oct. 30, 2017; Inventor: Zhengxu He

U.S. Provisional Patent Applications

Ser. No. 62/597,096; Filed Dec. 12, 2017, Inventor: Zhengxu He
Ser. No. 62/422,022; Filed Nov. 14, 2016, Inventor: Zhengxu He
Ser. No. 62/466,294; Filed Mar. 2, 2017, Inventor: Zhengxu He
Ser. No. 62/480,334; Filed Mar. 31, 2017, Inventor: Zhengxu He

BACKGROUND OF THE INVENTION

The present application relates to cooking system and specifically to cooking method and equipment capable of automatically delivering food ingredients.

Considerable amount of research and experiments have been conducted on automating cooking. A conventional cook apparatus includes a full set of storage containers positioned above each cookware. A drawback of conventional cook apparatus is it requires too many storage containers for each cookware, which takes too much space in a kitchen. For example, a kitchen in a common fast-food restaurant may include dozens of storage containers. The problem becomes even worse when there are multiple cookware in a kitchen; the kitchen must have large space to host such systems with multi-cookware. In addition, subdividing a same ingredient into more than one storage containers disallows sharing by different cookware.

U.S. Pat. No. 4,919,950 teaches an automated cooking system comprising a plurality of cookware and a conveyor means for moving the cookware along a pre-determined path, as to access the dispensers of food ingredients. One disadvantage of this approach is that the cookware and the devices connected with cookware can be big and heavy so moving these can require a lot of space and a lot of power. Also, if the heaters are connected to the cookware, then moving the heaters together can be quite unsafe. Moreover, the technique works best only if all food ingredients may be ordered along the pre-determined path, so that the order of their dispensing into the cookware may not be different for different dishes in the menu. Even with this restriction satisfied, there are times when a cookware may have to idled as to wait for another cookware for the dispensing of food ingredients.

There is therefore a need for an automated cooking system that provides efficient storage of food ingredients and a dependable delivery of food ingredients from storage to the cookware while minimizing space required, minimizing idle time of the cooking apparatus, and reducing labor cost.

SUMMARY OF THE INVENTION

The presently disclosed automated cooking system is capable of automatically delivering multiple food ingredients to cookware during cooking. Some food ingredients are transported and dispensed to cooking apparatus without moving the cooking apparatus to near storage containers and without having a full set of stationary storage containers positioned above cooking apparatus in conventional cooking systems. The deliveries of food ingredients to the cooking apparatus can be scheduled according to the requirements of cooking recipes. The disclosed cooking system is flexible to the types of food ingredients, suitable for simple or complex recipes. The disclosed cooking system can reduce food print and space requirement in a kitchen and reduce labor cost. The space and labor savings are especially significant for kitchens comprising a plurality of cooking apparatus because the food storage can be shared among the cooking apparatus. The disclosed systems and methods are thus especially beneficial to large scale kitchen operations in restaurants, cafeteria for colleges or companies, etc.

In one general aspect, the present invention relates to an automated cooking system, comprising: a computer system that can store a list of recipes; one or more cooking stations each comprising a cookware that can cook food ingredients therein to produce a first cooked food, wherein the computer system can assign and schedule a plurality of dishes to be cooked at the one or more cooking stations; one or more storage stations that can store food ingredients; one or more mini vehicles each carrying one or more containers of food ingredients that can hold the food ingredients, wherein the computer system can control at least some of movements of the mini vehicles in accordance to the recipes; a loading apparatus that can load a container of food ingredients from the one or more storage stations to a mini vehicle; and a dispensing apparatus that can dispense food ingredients from a container to the cookware in one of the one or more cooking stations, wherein the computer system can control the dispensing apparatus in accordance to the recipes.

Implementations of the system may include one or more of the following. The automatic cooking system further includes a cleaning apparatus that can clean the one or more transport containers on the one or more mini vehicles, wherein the computer system controls timing when the cleaning apparatus to clean the one or more transport containers. The computer system can control times for the food ingredients to be transferred to the one or more cooking apparatus in accordance with the recipes. The computer system can control the one or more mini vehicles using wireless communications. A mini vehicle can carry a plurality of containers that each can hold food ingredients, wherein the computer system can control the mini vehicle to stop at two or more positions. The one or more cooking stations can include a first cooking station that can cook part or all of the food ingredients in a recipe to produce semi-cooked food, wherein the one or more cooking stations comprises a second cooking station that can cook the semi-cooked food to produce a second cooked food, wherein the semi-cooked food is transferred from the first cooking station to the first cooking station under the control of the computer system. The automatic cooking system can further include sensors that can detect positions of the one or more vehicles and send associated signals to the computer system, wherein the computer system can determine positions of the one or more vehicles based on the signals. The sensors can include RFID or vision sensors. The automatic cooking system can further include a food preparation apparatus that can conduct one or more of operations to the food ingredient before transferred to the cookware for cooking: cleaning, cutting, grinding, blending, or mixing the food ingredient. The automatic cooking system can further include one or more rail tracks that can connect the one or more cooking apparatus and the one or more storage stations, wherein the one or more mini vehicles that can move along the one or more rail tracks, wherein the computer system can control the movements of the one or more mini vehicles along the one or more rail tracks in accordance to the recipe. The one or more rail tracks comprise two rails or a monorail. The one or more mini vehicles can be positioned on the one or more rail tracks or hanging off the one or more rail tracks. The one or more mini vehicles can be driven by gravity along at least a portion of the one or more rail tracks. The automatic cooking system can further include a track switch in association with two or more of the rail tracks, wherein the computer system can control the track switch to direct the one or more mini vehicles to different route along the one or more rail tracks. The track switch can include a support member; two or more connection tracks that can be mounted on the support member; and a movement mechanism that can slide or rotate the support member among two or more positions. The computer system can track type and quantities of food ingredients in storage stations, containers, and the cookware at cooking stations.

In another general aspect, the present invention relates to an automatic cooking system that includes a computer system that can store a recipe; one or more cooking stations each comprising a cookware that can cook food ingredients therein to produce a first cooked food, wherein the computer system can assign and schedule a plurality of dishes to be cooked at the one or more cooking stations; one or more transport containers that can hold the food ingredients, wherein the computer system can control at least some of movements of the one or more transport containers in accordance to the recipe; a loading apparatus that can load containers to a mini vehicle; and a dispensing apparatus that can dispense food ingredients from a container to the cookware at one of the one or more cooking stations, wherein the computer system can control dispensing of the food ingredients in accordance to the recipe.

Implementations of the system may include one or more of the following. The loading apparatus and the dispensing apparatus can include one or more of a tunnel, a funnel, a clipping device, a robotic arm, or a grabbing device. The loading apparatus can include a first object mounted below a storage container that can enclose a space that can receive the food ingredients contained from the storage container; and a second object that can slide in the first object, under the control of the computer system, which adjusts volume of the space and transfers at least a portion of the food ingredients to the cookware. The one or more cooking stations can include a first cooking station that can cook part or all of the food ingredients in a recipe to produce semi-cooked food, wherein the one or more cooking stations comprises a second cooking station that can cook the semi-cooked food to produce a second cooked food, wherein the semi-cooked food is transferred from the first cooking station to the first cooking station under the control of the computer system. At least one of the food ingredients can be a liquid, the automatic cooking system can further include a liquid dispensing device, wherein the computer system can control the liquid dispensing device to transfer the liquid from the plurality of storage containers to the cookware based on the recipes. The computer system can control the liquid dispensing device to control start, stop, and duration of transfer of the liquid from the plurality of storage containers to the cookware based on the recipe. The loading mechanism can include a liquid metering device in communication with the computer system and configured to measure amount of a food ingredient transferred from the plurality of storage containers to the cookware; wherein the computer system can control the liquid dispensing device in response to a signal received from the liquid metering device. The liquid dispensing device can include a syringe tube and a syringe plunger contained therein configured to pump the liquid to deliver the liquid to the cookware under the control of the computer system.

These and other aspects, their implementations and other features are described in detail in the drawings, the description and the claims.

BRIEF DESCRIPTION OF THE SEVERAL VIEWS OF THE DRAWINGS

FIGS. 8-9B illustrate details of an exemplified rail track compatible with the automated cooking system in accordance with the present invention.

FIGS. 10A-10B illustrate an exemplified transport container compatible with the automated cooking system in accordance with the present invention.

FIGS. 11A-11F illustrate an exemplified unloading mechanism for a transport container on a mini vehicle compatible with the automated cooking system in accordance with the present invention.

FIGS. 12A-12B illustrate an exemplified cooking apparatus by heated liquid compatible with the automated cooking system in accordance with the present invention.

FIGS. 13A-13C illustrate an exemplified storage and loading apparatus compatible with the automated cooking system in accordance with the present invention.

FIGS. 14A-14C illustrate an exemplified storage and loading apparatus compatible with the automated cooking system in accordance with the present invention.

FIG. 62 is a flow chart showing the procedures of the computer system of the kitchen system in preparation of receiving an order for food item.

FIG. 63 is a flow chart showing the procedures of the computer system of the kitchen system for controlling the cooking of a food item, after a food item is ordered.

DETAILED DESCRIPTION OF THE INVENTION

Figure 1:
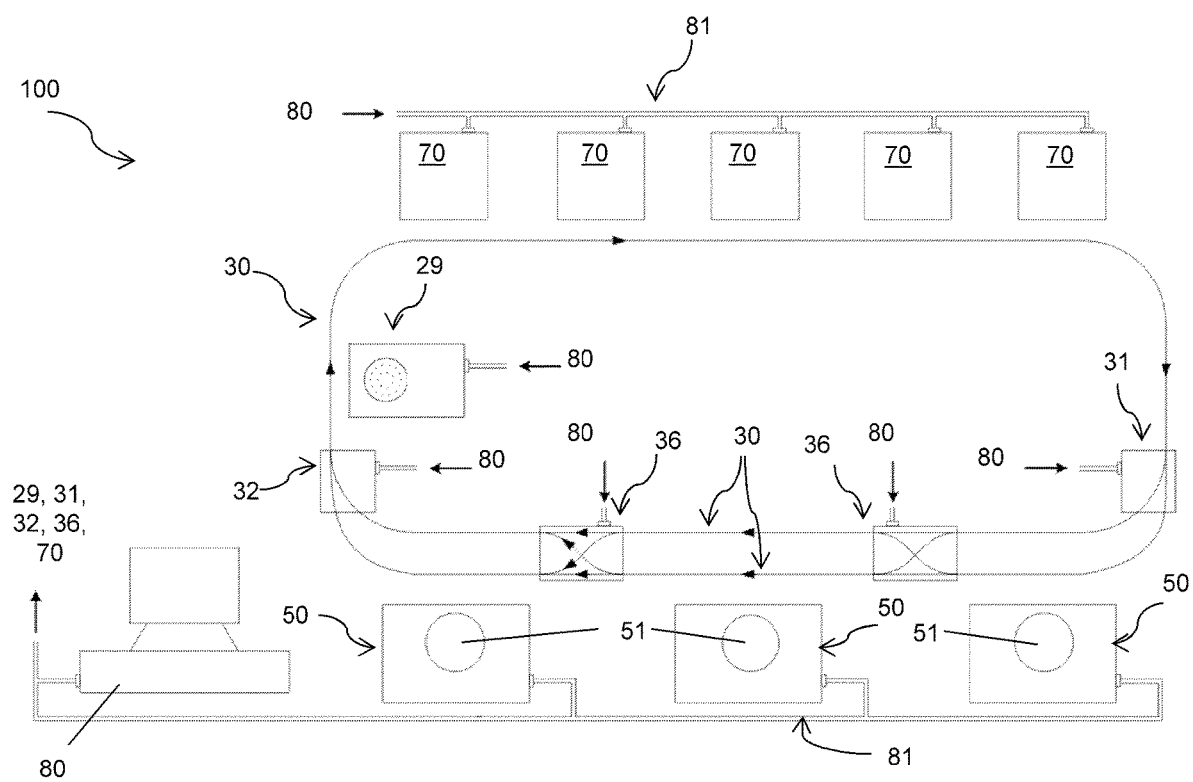
FIG. 1 is a schematic view of an implementation automated cooking system in accordance with the present invention.

In some embodiments, referring to FIG. 1, an automated cooking system 100 includes cooking stations 50, storage stations 70, a cleaning station 29. A network of rail tracks 30 links the storage stations 70, the cooking stations 50 and the cleaning station 29. The rail tracks 30 includes split track switch (i.e., one-to-two track switch) 31, a merging track switch (i.e., two-to-one track switch) 32, and two-to-two track switches 36. A multiple of mini vehicles (not shown in FIG. 1) can move on the rail tracks 30. Each mini vehicle carries one or more transport containers configured to hold food ingredients. Each cooking station 50 includes at least one cooking apparatus with a cookware 51, and a dispensing apparatus to dispense food ingredients from transport containers to the cookware (not shown in FIG. 1).

In the present disclosure, the term "cooking apparatus" refers to the subsystem in the cooking system that is responsible for heating, stirring, flipping, and/or mixing the food ingredients to produce the dish and for transferring cooked food into some holders of cooked food. The term "cooking system" refers to overall system that includes the cooking apparatus, storage systems for food ingredients, and transport systems for delivering the food ingredients. It should also be noted that the term "rail track" can exist in different configurations suitable for the presently disclosed systems and methods. Examples of rail track include monorails, two parallel rails, etc. The mini vehicles can travel on top of the rail tracks or hanging below or on the side of rail tracks. As described below, mechanisms can be configured accordingly for transferring food ingredients into or out of transport containers in the mini vehicles and for transferring cooked food from cookware to the mini vehicles.

Each storage station 70 includes one or more storage containers of food ingredients and an apparatus to load the food ingredients from the storage containers into the transport containers on the mini vehicles. The cleaning station 29 includes a turning apparatus which turns the transport containers on the mini vehicles, and a controlled apparatus that can spray hot water or steam into the inner surface of the transport containers. A computer 80 can be connected via wires 81 to the cooking stations 50, the storage stations 70, the cleaning station 29, and the track switches 31, 32, and 36. The computer 80 can store a list of recipes, and control the movements and stops of the mini vehicle; operations of the track switches 31, 32 and 36; loading of food ingredients from storage containers to the transport containers on the mini vehicles; quantity of food ingredients loaded from storage containers to transport containers; transferring of food ingredients from transport containers to cookware; operation of the cleaning station 29; and operations of the cooking apparatus.

The computer 80 can also control motors to drive the mini vehicles through a one-way (from computer to the mini vehicles) or two-way communications (between the computer and each mini vehicle) through a wired or wireless communication. Here a wireless communication may be established via a radio (e.g., ZigBee), microwave (e.g., Bluetooth, Wi-Fi), light (e.g., infrared), sonic, ultrasonic waves; or via electromagnetic induction short range communication, etc.

An advantage of the disclosed automated cooking system is that the storage stations, the cleaning system, the computer, etc. can be shared among multiple cooking apparatus. In other words, a storage station can supply a common food ingredient to several cooking apparatus. This makes the automated cooking system scalable without having to increasing footprint proportionally as in come conventional systems.

Figure 2:
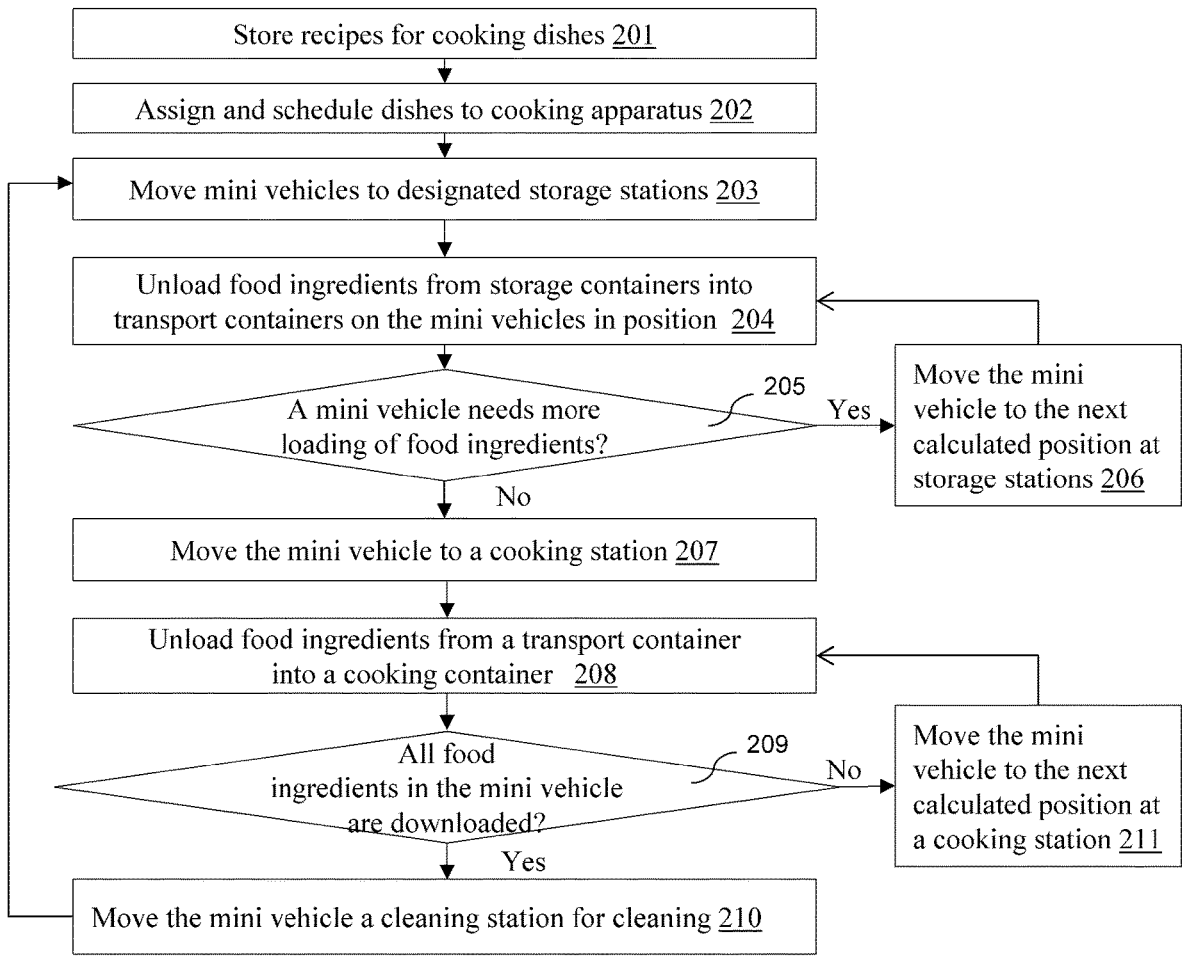
FIG. 2 is a flow chart showing the process of delivering food ingredients in the automated cooking system in accordance with the present invention.

Referring to FIG. 2, the process of the delivery of food ingredients can include one or more of the following steps. A computer stores recipes for cooking dishes in memory (step 201). Upon receiving an order for new dishes, the computer assigns and schedules dishes in the order to be cooked at one or more cooking stations (step 202). Based on the recipes, the computer commands the mini vehicles in waiting to move to some designated positions at the designated storage stations (step 203). Food ingredients are loaded onto the designated transport containers from the designated storage containers (step 204). The amounts of food ingredients loaded are determined by quantities specified in the recipe for the dishes. If a mini vehicle has multiple transport containers (step 205), the mini vehicle can stop at several positions to allow all designated transport containers on the mini vehicle to be loaded with food ingredients (step 206). Then the mini vehicle is sent to a designated position at a designated cooking station (step 207), at which the food ingredients in the transport container is dispensed into the cookware at a designated time in accordance with the recipe (step 208). If all food ingredients on the mini vehicle are dispensed (step 209), the mini vehicle is sent to a cleaning station which cleans the transport containers (step 210). The cleaning can include spray water or spray steam. Then the mini vehicle is in waiting, to be sent to storage stations again. If the mini vehicle includes multiple loaded transport containers, it can be moved to a new position at a designated cooking station to allow next load of food ingredient to be dispensed into the cookware (step 211).

The computer may have logistics software that assigns and schedules the dishes in a new order to different cooking apparatus for cooking. Examples of operations controlled by the computer include:
1) start time of a cooking apparatus for cooking each assigned dish;
2) times for unloading of the food ingredients from transport containers to the cookware;
3) times for the mini vehicles to arrive at designated positions at the cooking stations;
4) times to loading food ingredients from storage containers to transport containers;
5) times for the mini vehicles to arrive at designated positions at storage stations;
6) times for the mini vehicles to arrive at designated positions at the cleaning station.

The logistics software can store and control the following exemplified operation parameters based on the recipes:
(a) time periods required to load the transport containers;
(b) time periods required to load the quantities of food ingredients from storage containers to the transport containers;
(c) time periods required for a mini vehicle to travel from positions to positions;
(d) time periods for the cooking apparatus for finish cooking an assigned dish;
(e) time periods required to clean the transport containers in a mini vehicle;
(f) time periods required to operate the track switches;

(g) the current status of the devices in the apparatus and the unfinished tasks from the older orders, if any. In addition, any pair of (successive) mini vehicles need to keep a certain distance away from each other, so they do not collide with each other.

The logistics software may need to adjust the start times for cooking the dishes at the cooking apparatus, as to avoid conflicts of different mini vehicles on the rail track. In some cases, a cooking apparatus may have to be idled momentarily, waiting for some designated mini vehicles carrying food ingredients to arrive at unloading positions. Once the cooking at a cooking apparatus is started, the food ingredients should arrive prior to the designated unloading times, as waiting for food ingredients in the middle of cooking may not be allowed. Thus, it is sometimes desirable to have all food ingredients required for a dish to be loaded into the transport containers of a single mini vehicle. Moreover, food ingredients from different storage containers may be loaded into the same transport container if according to the recipe, these food ingredients are to be delivered into the cookware at the same time.

The assignment of different dishes in a new order to different cooking apparatus, and the adjustment of start times for cooking the dishes may be done by the computer, using an optimization software which helps minimize the total idle time of the cooking apparatus.

Examples of an automated cooking apparatus are disclosed in pending U.S. patent application Ser. Nos. 13/607,712 and 13/490,523, filed by the same inventor, the content of which is incorporated herein by reference.

Figure 3:
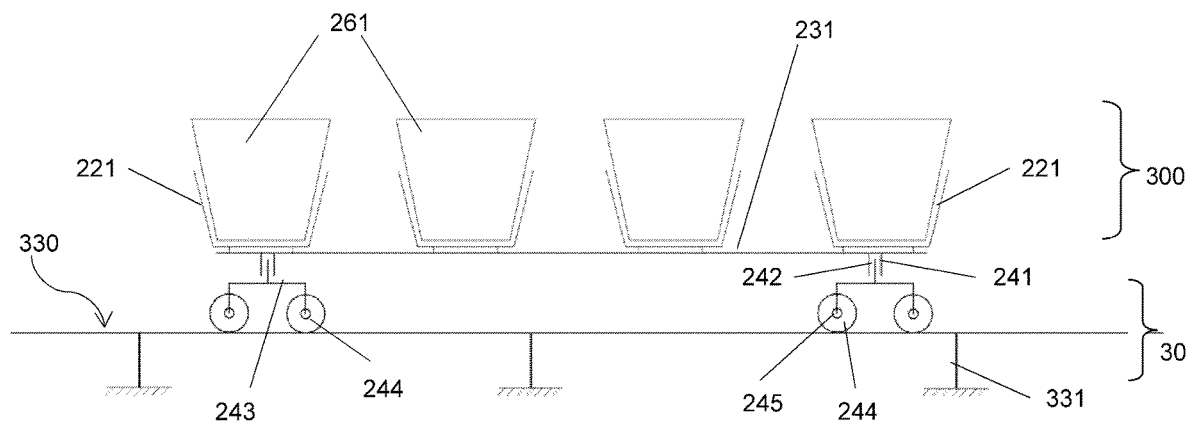
FIG. 3 shows details of a mini vehicle and a rail track compatible with the automated cooking system in accordance with the present invention

In some embodiments, referring to FIG. 3, a mini vehicle 300 includes a main frame 231, two frames 243, and wheels 244 whose shafts are connected to the frames 243 by bearings 245. A motor (not shown in Figure) may drive the rotation of one or more wheels. The wheels 244 are designed to move along a rail track 30 consisting of a pair of rails 330. The rails 330 are mounted on the support frames 331. The main frame 231 is connected with each of the two frames 243 via a vertical hinge joint consisting of a shaft 242 in a sleeve 241. A multiple of basket shaped holders 221 are fixedly connected atop the main frame 231. Each holder 221 holds a transport container 261 which may contain food ingredients. The transport containers 261 may be lifted up and detached from the basket shaped holders 221.

It should be noted that the transport container 261 may be directly connected with the main frame 231 via a properly positioned hinge joint, so that the transport container may be rotated (by a computer-controlled motor) around the hinge joint and be turned as to unload food ingredients container therein. The hinge joint needs to be positioned a proper distance away on a side of the mini vehicle. This may require more space along the rail track for the hinge joint to travel with the mini vehicle.

It should also be noted that the transport containers may also hang onto a frame of a mini vehicle from below, or from a side.

Figure 4A:
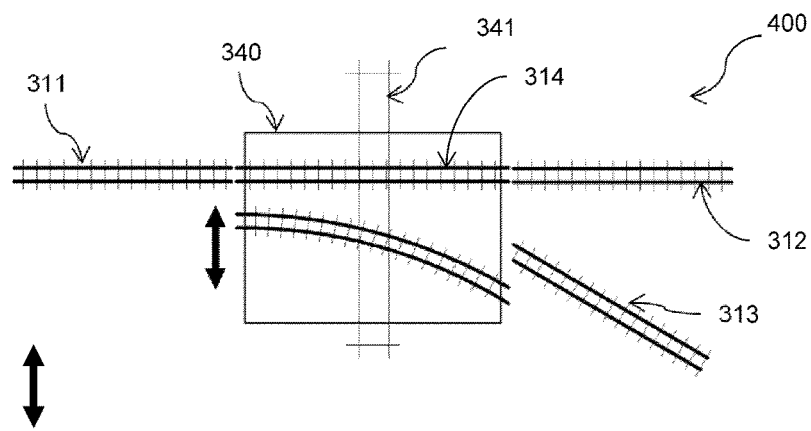
FIGS. 4A-4D illustrate implementations of track switching in a network of rail tracks compatible with the automated cooking system in accordance with the present invention.
Figure 4B:
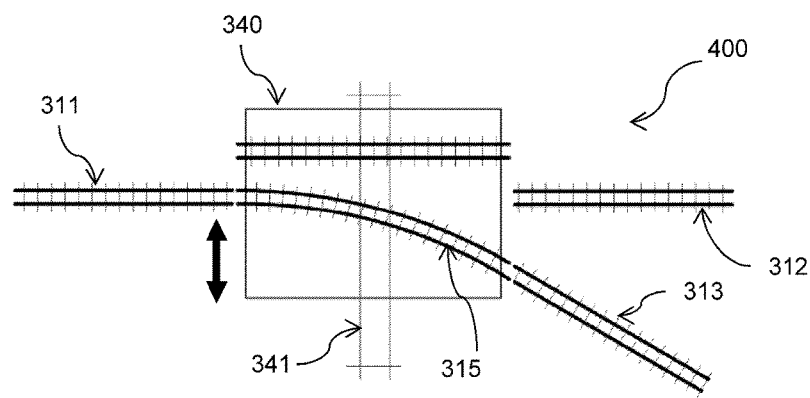
Figure 4C:
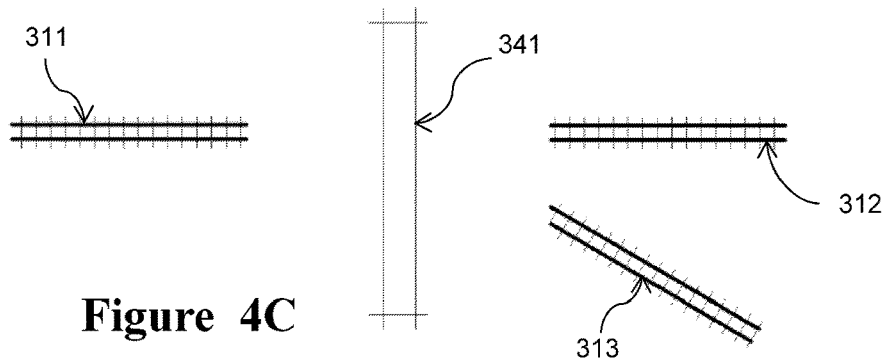
Figure 4D:
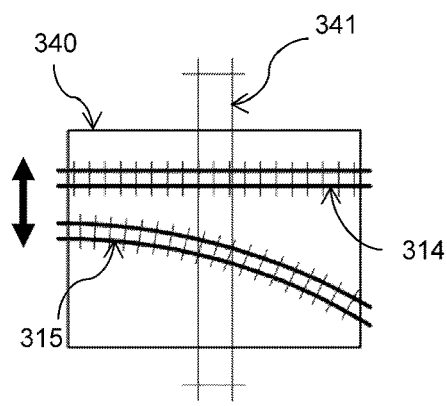

In some embodiments, referring to FIGS. 4A-4D, a track switch 400 includes a rail track 311 on the left, two rail tracks 312 and 313 on the right, and a frame 340 which may slide on a sliding track 341. Each rail track as shown includes a pair of rails, but this is not a requirement. (This also applies to FIGS. 5A-6D.) Two connection rail tracks 314 and 315 are mounted on the frame 340 (FIG. 4D). The frame 340 may slide between two different positions as shown in FIGS. 4A and 4B: in the position as shown in FIG. 4A, the pair of rail tracks 311 and 311 may be connected through the connection rail track 314; in the position as shown in FIG. 4B, the pair of rail tracks 311 and 313 may be connected by the connection rail track 315.

We note that the track switch 400 may be used as a two-to-one track switch if the mini vehicles move from right to left, or as a one-to-two track switch if the mini vehicles move from left to right. A motor (not shown in Figure) may drive the sliding of the frame 340 along the track 341, and a computer (not shown) may control the motor to slide the frame into a designated position at a designated time.

Figure 5A:
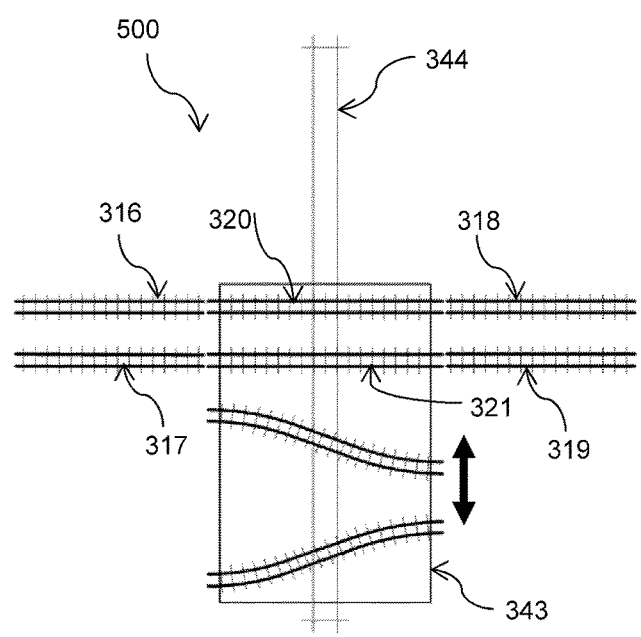
FIGS. 5A-5E illustrate other implementations of track switching in a network of rail tracks compatible with the automated cooking system in accordance with the present invention.
Figure 5B:
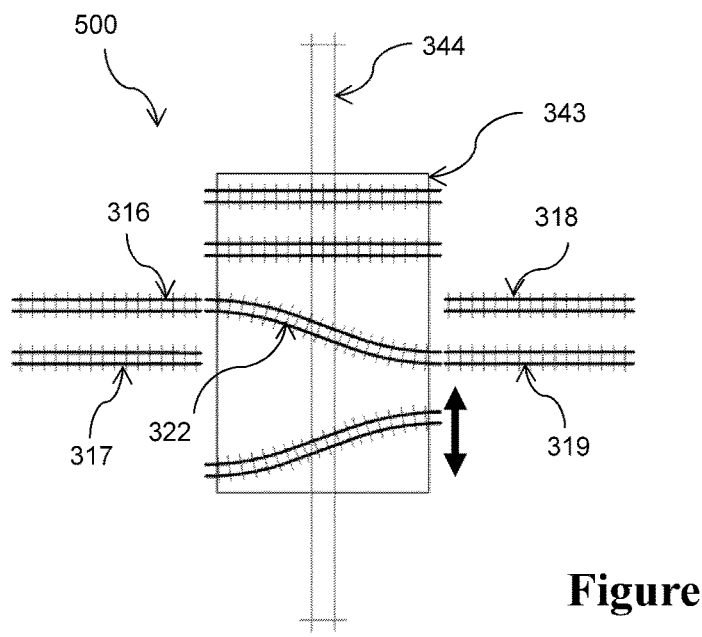
Figure 5C:
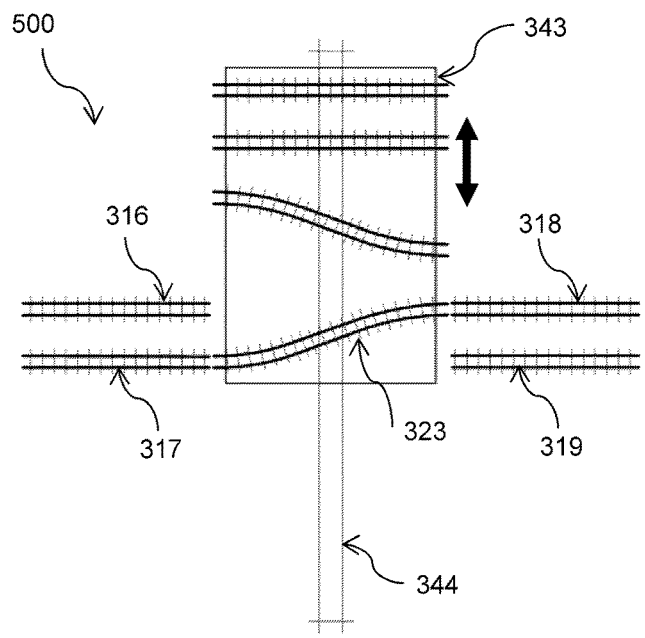
Figure 5D:
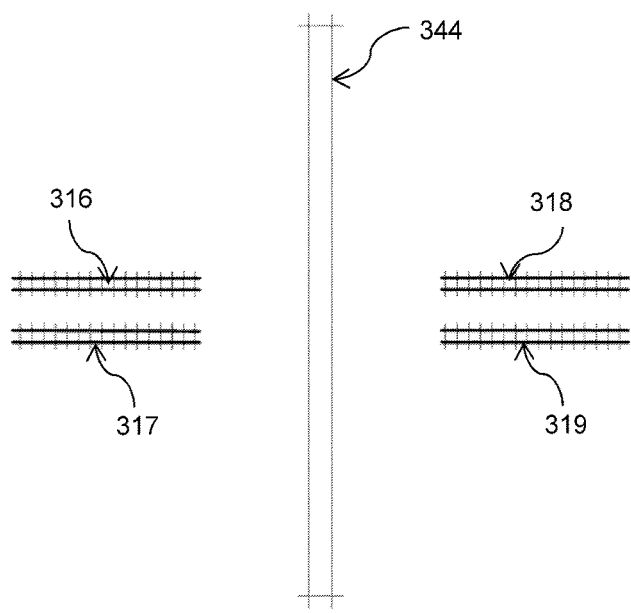
Figure 5E:
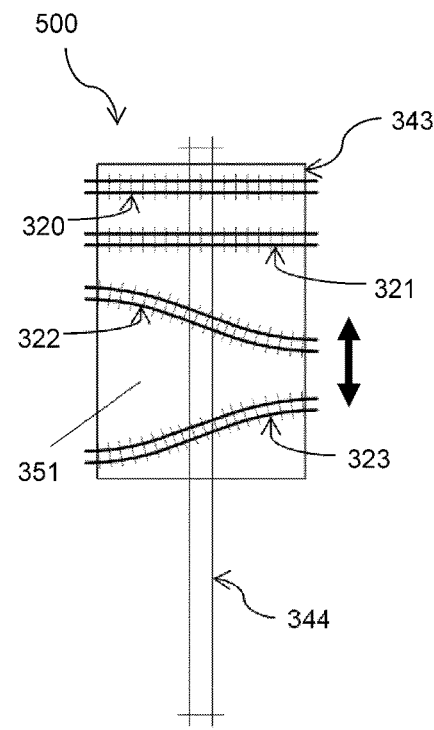

In some embodiments, referring to FIGS. 5A-5E, a two-to-two track switch 500 includes a pair of rail tracks 316 and 317 on the left, a pair of rail tracks 318 and 319 on the right, and a frame 343 which may slide along a sliding track 344. Two connection rail tracks 320 and 321, two curved connection rail tracks 322 and 323 are fixedly installed atop the frame 343 (FIG. 5E). The frame 343 may slide among three different positions as shown in FIGS. 5A-5C: in FIG. 5A, the tracks 316 and 318 are joined by the connection rail track 320 and the tracks 317 and 319 are joined by the connection rail track 321; in FIG. 5B, the tracks 316 and 319 are joined by the connection rail track 322; and in FIG. 5C, the tracks 317 and 318 are joined by the connection rail track 323. A motor (not shown in Figure) may drive the sliding of the frame 343 along 344, and a computer (not shown) may control the motor as to slide the frame into a designated position at a designated time.

The rails tracks 316, 317, 318, 319, 320 and 321 as shown in FIGS. 5A-5E can be substantially parallel to each other, but this is not a requirement.

Figure 6A:
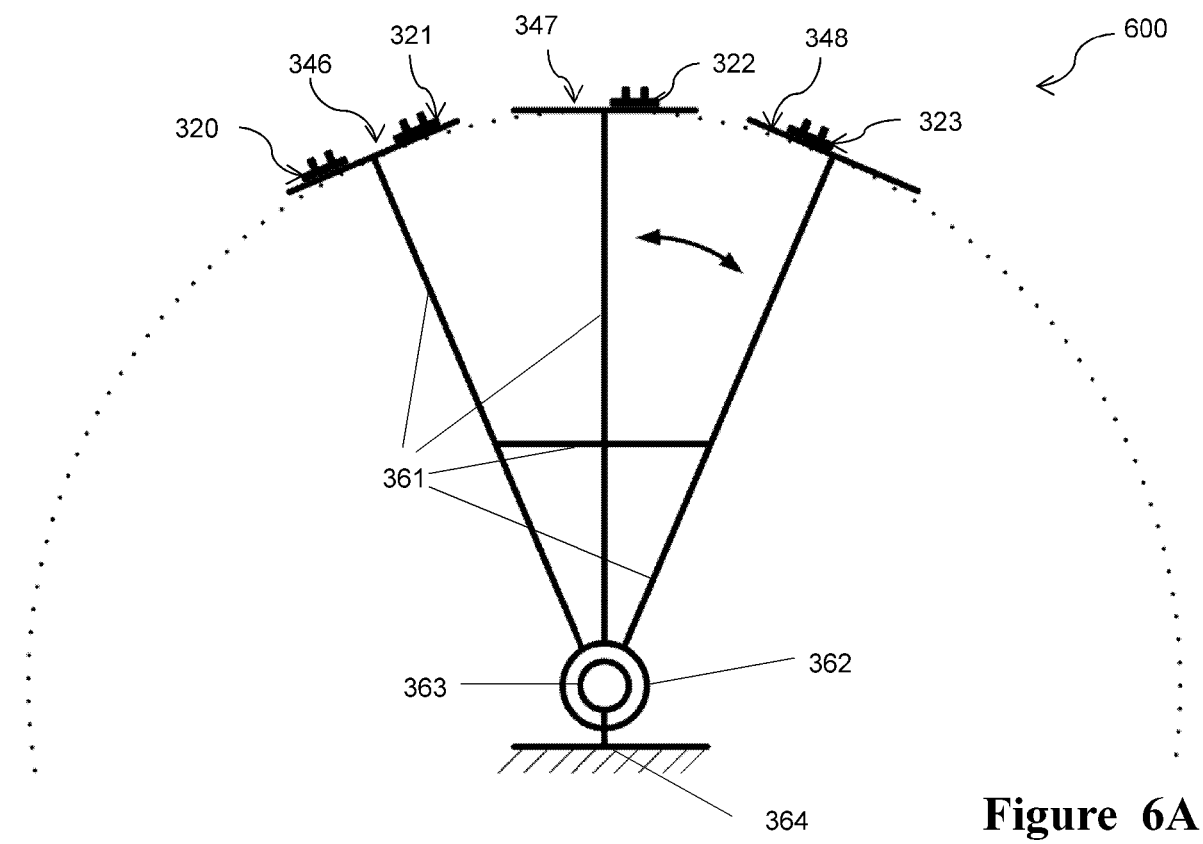
FIGS. 6A-6D illustrate other implementations of track switching in a network of rail tracks compatible with the automated cooking system in accordance with the present invention.
Figure 6B:
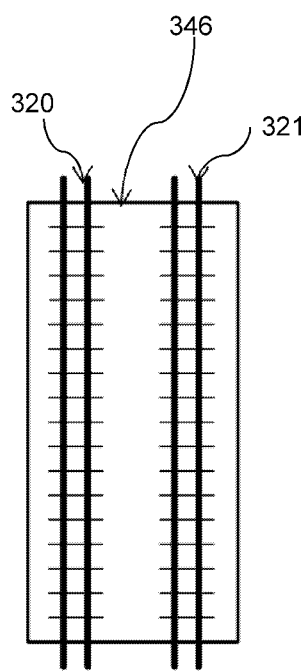
Figure 6C:
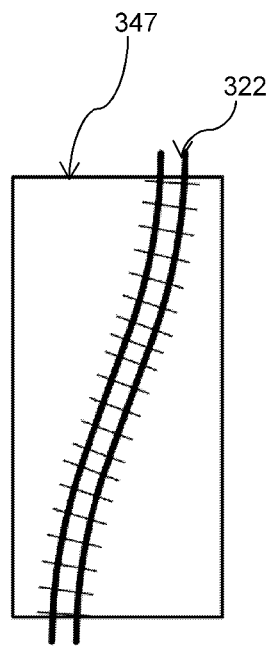
Figure 6D:
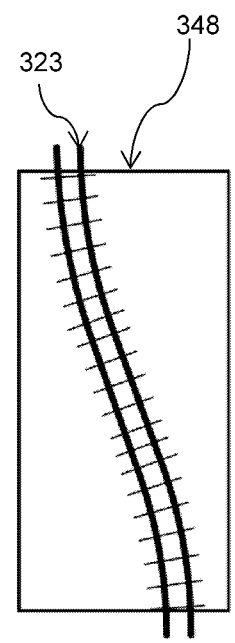

In some embodiments, referring to FIGS. 6A-6D, a two-to-two track switch 600 has a similar function as the track switch 500 and has a rotational mechanism replacing the sliding mechanism. A main frame 361 is fixedly connected to the sleeve 362 of a shaft 363; and the shaft 362 is fixedly joined with a support frame 364. Three frames 346, 347 and 348 are fixedly connected to the main frame 361. Two connection rail tracks 320 and 321 are fixedly installed on the frame 346 (FIG. 6B). A curved connection rail track 322 is fixedly installed on the frame 347 (FIG. 6C). A curved connection rail track 323 is fixedly installed on the frame 348 (FIG. 6D). The three mutually rigidly connected frames 346, 247, 348 may rotate simultaneously around the shaft 363. At a certain first angle, the connection rail tracks 320 and 321 on the frame 346 join the tracks 316 and 318, and respectively the tracks 317 and 319, similarly as in FIG. 5A. At a certain second angle, the connection rail track 322 on the frame 347 joins the rail tracks 316 and 319 similarly as in FIG. 5B. At a certain third angle frame, the connection rail track 323 on the frame 346 joins the rail tracks 317 and 318 similarly as in FIG. 5C. A motor (not shown) may drive the rotation of the sleeve 362 around the shaft 363, and a computer (not shown) may control the motor as to rotate the sleeve into a designated position at a designated time.

Figure 7:
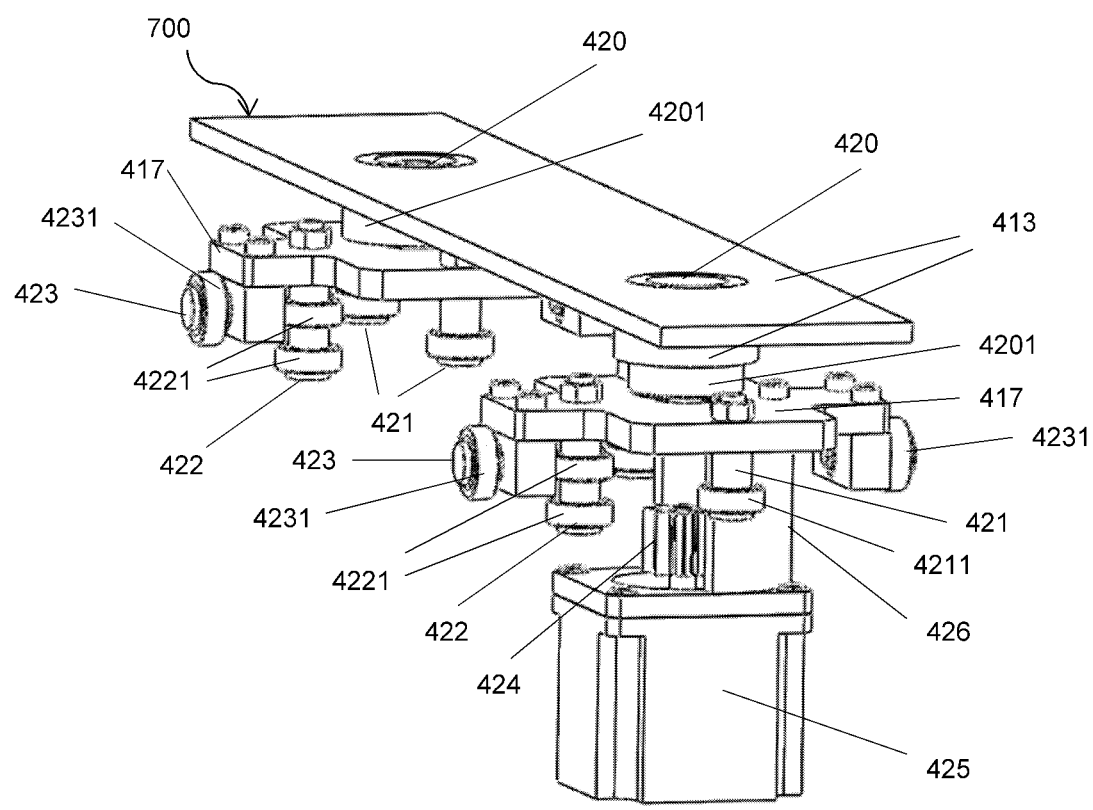
FIG. 7 illustrates an implementation of a mini vehicle suitable for transporting food ingredients in the automated cooking system in accordance with the present invention.

In an exemplified implementation, referring to FIG. 7, a mini vehicle 700 includes a main frame 413 and two frames 417 each of which is joined with the main frame 413 via a hinge joint consisting of a shaft 420 in a sleeve 4201; where the sleeves 4201 are rigidly connected with the main frame 413 and each shaft 420 is rigidly connected with the respective frame 417. Two vertical shafts 421 and a vertical shaft 422 are rigidly mounted below each frame 417; and two horizontal shafts 423 are rigidly mounted each frame 417, one on either side. A wheel 4211 is mounted on each shaft 421 with ball bearings (hidden in the Figure) installed between the shaft 421 and the corresponding wheel 4211. Two wheels 4221 are mounted on each shaft 422, with ball bearings installed between the shaft 422 and the corresponding wheels 4221. A wheel 4231 is mounted on each shaft 423, with ball bearings installed between the shaft 423 and the corresponding wheel 4231. A connector 426 rigidly connects the frame of a motor 425 with one of the frames 417; and a gear 424 is mounted on the shaft of the motor 425. The axis of the gear 424 is the same as the axis of the shaft of the motor 425, and it is vertical. Holders of transport containers (not in Figure) may be mounted atop the main frame 413.

Figure 8:
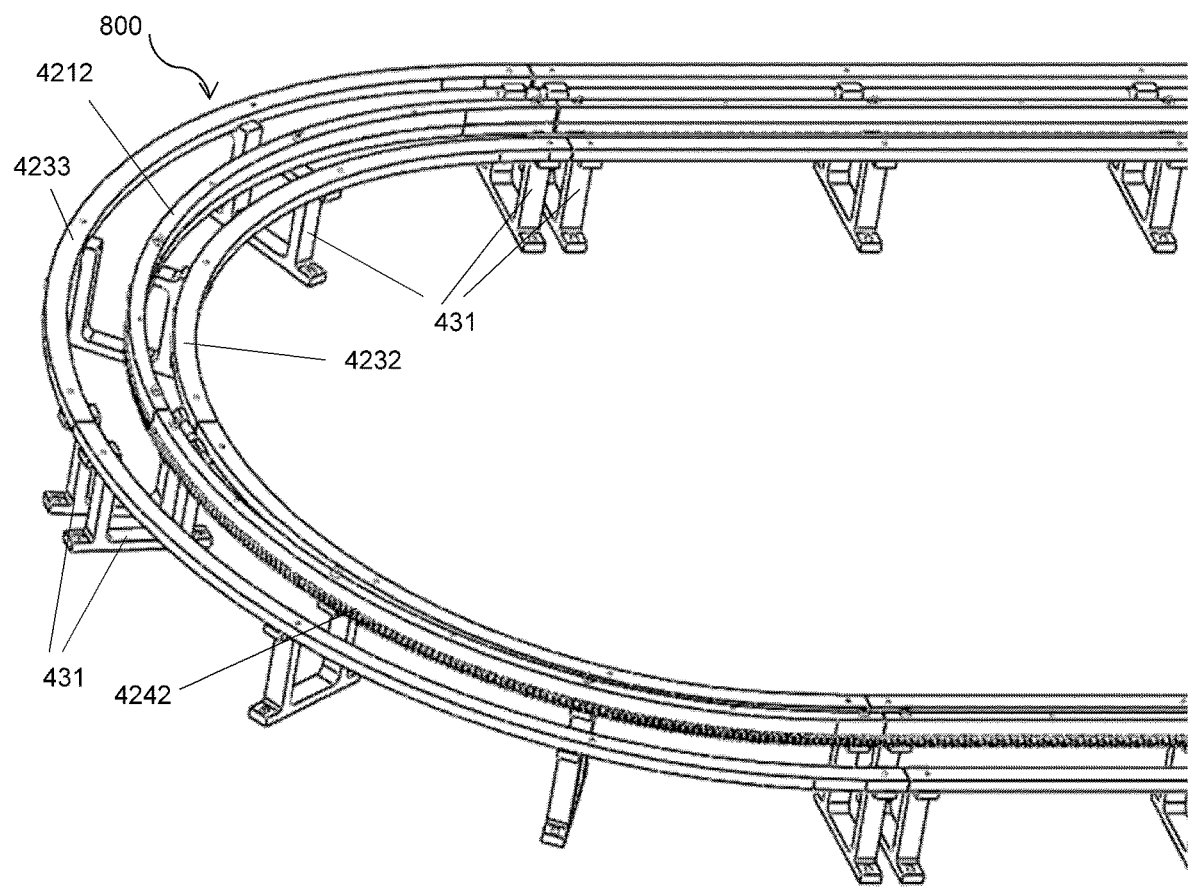

In some embodiments, referring to FIG. 8, a rail track 800 includes a rail 4212 at the center, two rails 4232 and 4233 on either side, and a gear track 4242 below the rail 4212. The rails 4212, 4232, 4233 and the gear track 4242 are fixedly mounted on a multitude of support frames 431. Both vertical sides of the rail 4212 are smooth. The mini vehicle 700 may travel on the rail track 800 as in FIGS. 9A-9B: The wheels 4211 of the mini vehicle 700 touch a vertical side of the rail 4212, and the wheels 4221 touch the other vertical side of the rail 4212. The gear 424 is engaged with the gear track 4242. The wheels 4231 of the mini vehicle 700 touch the top surfaces of the rails 4232 and 4233. The motor 426 drives the rotation of the gear 424, hence moving the mini vehicle 700 along the track 800. A computer (not in Figure) may control the direction and speed of movements and breaking (stops) of the motor 426, as to move the mini vehicle to the designated points at designated times. An encoder may be installed to measure a cumulative angle of rotations in the gear 424, and the information of the encoder may be sent to a computer to determine the position of the mini vehicle. The gear 424 instead of a usual wheel helps with more precise positioning of the mini vehicle.

In some embodiments, referring to FIGS. 10A-10B, a transport container 262 consists of a frame 511 and a box 519 that may hold food ingredients. The box 519 is fixedly or elastically attached to the frame 511. Food ingredients may drop to the box 519 from above. Two holders 517 are attached to the frame 511 from a side; and two bars 521 and 522 are mounted on the holders 517. It should be noted that the frame 511 and the box 519 can be made as a unitary piece. It should also be noted that the inner surface of the box 511 can be made textured or rugged, or be covered by a net, so that the food ingredients contained therein are less sticky to the inner surface of the box.

Figures 11D, 11E, 11F:
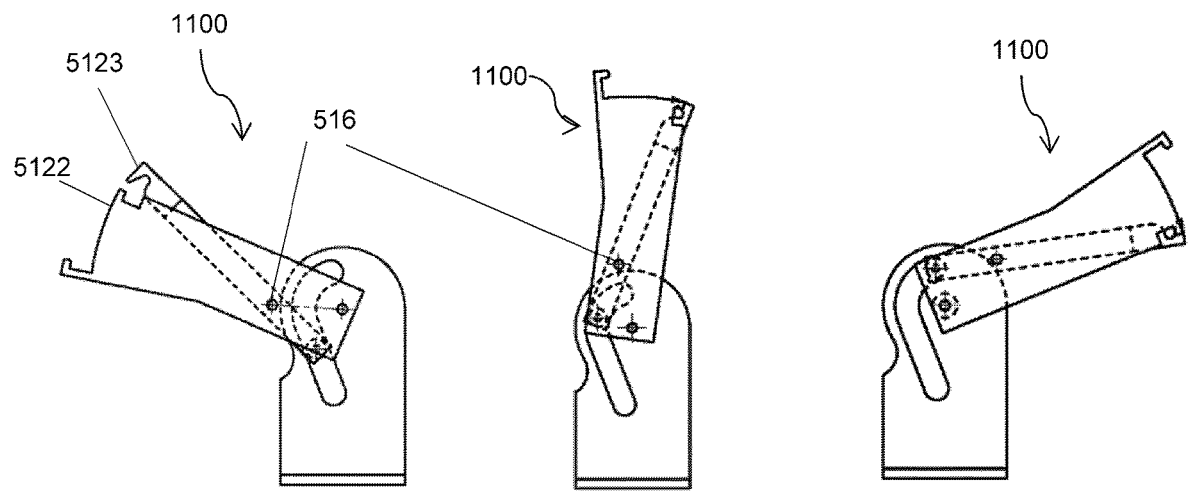

In some embodiments, referring to FIGS. 11A-11D, a cart turning apparatus 1100 consists of a base apparatus 1100A (in FIG. 11B) with a hinge joint 524, and a connector 513 which is connected to the base apparatus 1100A via the hinge joint 524. The base apparatus 1100A consists of a flat board 523 of some thickness that is mounted on a support frame 527; and a curved strip 525 is carved from the board 523, so that a wheel can fit inside and move along the curved strip. Two hooks 5121 and 5122 are mounted on the connector 513 as in FIG. 11A. A second connector 514 is connected to the connector 513 via a hinge joint 516 so the two connectors may rotate around each other. A third hook 5123 is mounted on an end of the connector 514 and a shaft 515 is mounted on the other end of the connector 515. A wheel (obstructed in FIG. 11A) is mounted on the shaft 515 with bearings installed between the wheel and the shaft 515, so that the wheel can freely rotate relative to the shaft 515. The wheel on the shaft 515 can fit in and move along the curved strip 525. The axes of the hinge joints 524 and 516, and that of the shaft 515 are all parallel to each other. The hooks 5121 and 5122 face up, and the hook 5123 faces down. The cart turning apparatus 1100 may be used to grab and turn the transport container 262, as illustrated in FIG. 11C: the hook 5121 may hook the bar 521 from below, the hook 5122 may hook the bar 522 from below, and the hook 5123 may hook the bar 522 from above. A computer-controlled motor (not shown in Figures) may drive the rotation of the connector 513 around the hinge joint 524. When the connector 513 is rotated around the hinge joint 524, the wheel on the shaft 515 may slide in the curved strip 525. Then the relative distance between the hooks 5123 and 5122 may change, thus resulting in closing or loosening of the pair of hooks, as illustrated in FIGS. 11D-11F.

It should be noted that a cleaning station 29 may include a cart turning apparatus 1100 which can grab and turn a transport container 262 by an angle, and a computer-controlled apparatus which may spray heated water or steaming vapors onto the interior surface of transport container 262 when the transport container is turned by the apparatus 1100. The cart turning apparatus 1100 may also be used as a dispensing apparatus to unload food ingredients from a transport container to a cookware; and in this case we may refer the cart turning apparatus 1100 as a dispensing apparatus. It should also be noted that a different dispensing mechanism may include a powered apparatus that grabs a transport container of a matching design, and a rotation mechanism that turns the powered apparatus around the axis of a hinge joint; where the rotation mechanism may be driven by a motor. A benefit of the cart turning apparatus 1100 is that there is no need for any powered device other than the motor which drives the rotation of the connector 513 around the axis of the hinge joint 524.

Figure 12A:
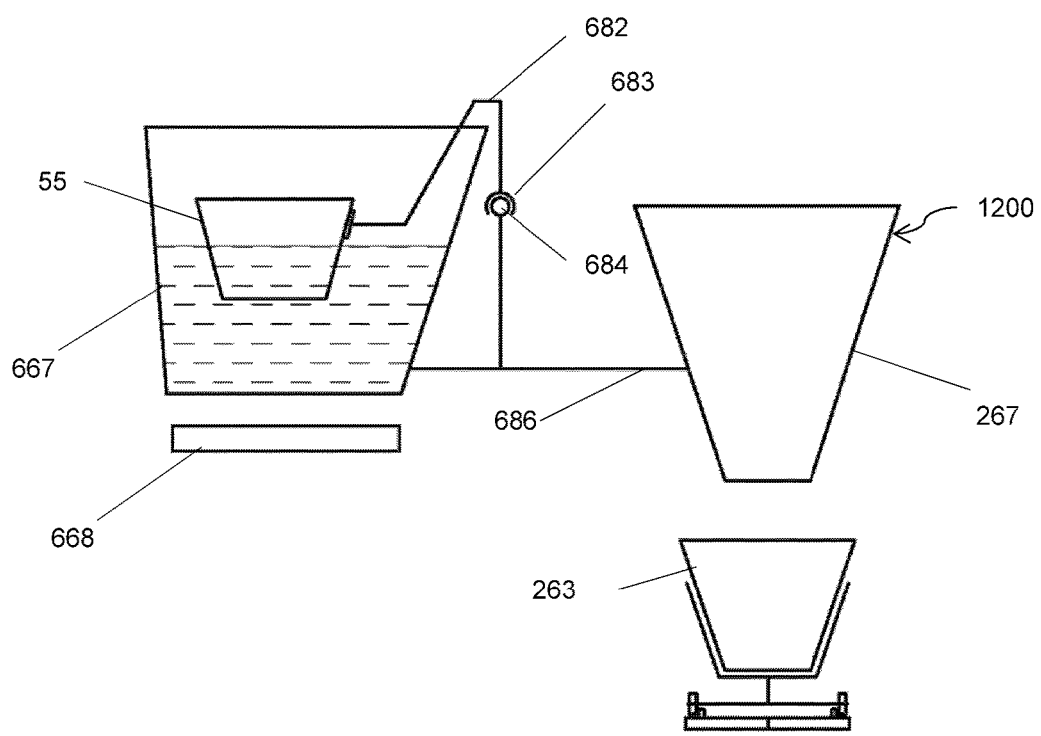

In some embodiments, referring to FIG. 12A, an automated cooking apparatus 1200 consists a container 667 of heated liquid, such as water or oil, a porous basket 55 (e.g., a metal net) which may hold food ingredients, and a connector 682 that is rigidly connected with the basket 55 on one end, and is rigidly connected with the sleeve 683 of a shaft 684. The shaft 684 is fixedly connected to a support frame 686, and a computer-controlled motor (not shown in Figure) may drive the rotation of the sleeve 683 around the shaft 684. When the sleeve 683 and the basket 55 are rotated in a certain direction (clockwise as shown in FIG. 12A), the food ingredients contained in the basket 55 may be turned and then dropped into a transport container 263 through a funnel 267 in the shape of a truncated cone. It should be noted that when the basket 55 is rotated out of fluid level in the container 840, the computer-controlled motor may drive the basket into a rotational vibration as to shake out the liquid in the food ingredients in the basket 55. In addition, the area underneath the path of the basket may be protected by a cover so dripped liquid from the basket may be gathered and drained out. A stove 668 may heat the liquid in the container 667. It should be noted that a temperature sensor may be used to measure the temperature of the liquid in the container 667, and the power of the heater may be adjusted by an algorithm according to the difference between the targeted temperature and the measured temperature.

Referring to FIG. 12B, an automated cooking station 54 includes a cooking apparatus 1200 and a dispensing apparatus 1100 positioned nearby. The food ingredients that need to be heated in the liquid can be transported in a transport container 262 to a certain position next to the dispensing apparatus 1100. The food ingredients in the transport container 262 are turned and dropped into the basket 55 by a cart turning apparatus 1100. By a rotation around the shaft 684, the basket 55 is then lowered into the heated liquid in the container 667. After a duration of time which is calculated based on recipe and/or liquid temperature, the basket 55 is then lifted out of the heated liquid and be vibrated to help drain out the liquid in the food ingredients in the basket 55.

Then the food ingredients are turned with the basket and dropped into the transport container 263 through the funnel 267. The food ingredients cooked by the apparatus 1200 may be transported by the transport container 263 to a cookware of another automated cooking apparatus for further processing. It should be noted that the two containers 262 and 263 could be the same one (that is moved from one side of the automated cooking apparatus 1200 to the other side, while the food ingredients is cooked in the heated liquid), but this is not a requirement.

In some embodiments, referring to FIGS. 13A-13C, a storage and loading apparatus 1300 includes a spiral blade 718 turned around a shaft 7180, enclosed in a hollow cylinder 713. The shaft 7180 is partly enclosed in the hollow cylinder 713, while the spiral blade 718 is fully enclosed in the hollow cylinder 713. The hollow cylinder 713 is connected with a storage container 714 with an opening at the bottom of the storage container 714, so that the food ingredients contained in the storage container 714 may freely drop down into the hollow cylinder 713. The shaft 7180 is a mating part of a hinge joint with sleeve 717 so the shaft 7180 may freely rotate relative to the sleeve 717. A ring-shaped board 719 rigidly connects the sleeve 717 and a boundary of the hollow cylinder 713 (the right boundary as shown in FIG. 13A); the other boundary of the hollow cylinder 713 (the left boundary as shown in FIG. 13A) is open so the food ingredients may pass from inside of the hollow cylinder to the outside. A motor 716 mounted on a support frame 710 may drive the rotation of the shaft 7180. The outer surface of the hollow cylinder 713 is rigidly joined with the support frame 710. As the shaft 7180 is rotated in a certain direction, the food ingredients in the hollow cylinder 713 may be pushed by the spiral blade 718 toward the opening (at the left boundary as shown in FIG. 13A) and be dropped into a transport container underneath (not shown in Figure); and at the same time, more food ingredients from the storage container 714 may be dropped to the hollow cylinder 713. Thus, the rotation of the shaft 7180 results in loading of food ingredients from the storage container into a transport container underneath. A computer (not in Figure) may control speed, time, duration of the rotation of the motor 716 as to control the estimated amount of food ingredients to be loaded, and the time duration required for loading.

It should be noted a weighing device may be installed on a second support frame (not in Figure) as to measure the total weight of the storage and loading apparatus 1300, including the storage container 714, the hollow cylinder 713 and the food ingredients contained in them. The weighing device can measure the weights prior to, and after a load of food ingredients; so as to determine the weight of the food ingredients that has been loaded into a transport container. The information of the weighing device may be sent to a computer. If the weight of total loaded food ingredients is less than a target amount, then the computer may order another load of a calculated duration and speed. The speed or duration of each load may be carefully designed as to make sure that the total amount of food ingredients in the load does not exceed a certain maximum weight. The weighing and loading process may be repeated for a number of times, until the weight of total food ingredients cumulatively loaded into the transport container is in a certain range. Similar notes can be made for the storage and loading apparatus disclosed in FIGS. 14A-21 below.

It should also be noted that the spiral blade 718 turned around a shaft in the storage and loading apparatus 1300 may be replaced by a screw rod or other similar device. Similar notes can be made for the storage and loading apparatus disclosed in FIGS. 14A-18D below.

The hollow cylinder 713 in the storage and loading apparatus 1300 may be substituted by a hollow tunnel of other shape, such as a hollow truncated cone; or a hollow tunnel 7131 in the storage and loading apparatus 1400 as in FIGS. 14A-14C. The cross section of the hollow tunnel 7131 is a contour formed by a circular arc centered at the axis of shaft 7180 and an upside-down U-shaped curve (FIG. 14B). This helps with preserving the shapes of certain food ingredients as they are transferred from the storage container through the hollow tunnel into a transport container underneath.

Figure 15A:
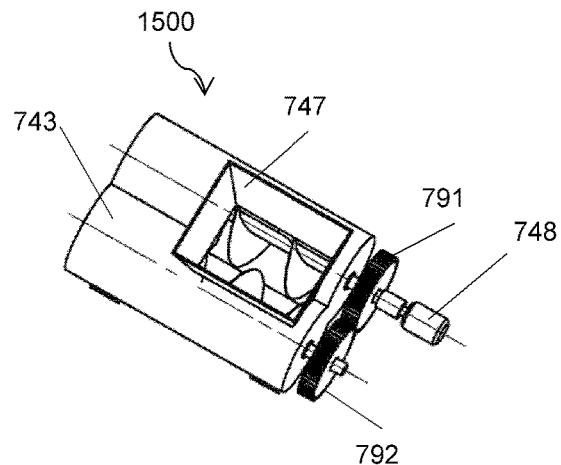
FIGS. 15A-15D illustrate an exemplified storage and loading apparatus compatible with the automated cooking system in accordance with the present invention.
Figure 15B:
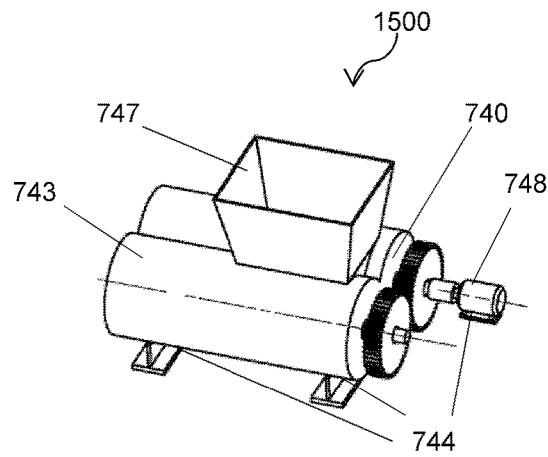
Figure 15C:
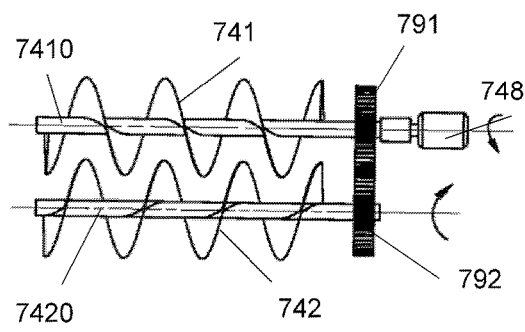
Figure 15D:
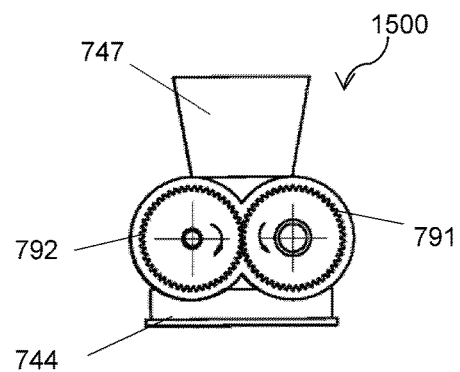

In some embodiments, referring to FIGS. 15A-15D, a storage and loading apparatus 1500 includes a pair of spiral blades 741 and 742 respectively turned around shafts 7410 and 7420, enclosed in a hollow tunnel 743. The spiral blades 741 and 742 are fully enclosed in the hollow tunnel 743 and the shafts 7410 and 7420 are partly enclosed in the hollow tunnel 743. The hollow tunnel 743 has the topology of a cylinder and each cross section of the hollow tunnel 743 is a contour formed by two circular arcs centered at the axes of the shafts 7410 and 7420 respectively. Two hinge joints connect the shafts 7410 and 7420 with a board 740 that is rigidly connected with a boundary of the hollow tunnel 743 (the right side boundary as shown in FIG. 15A or 15B); so each shaft, 7410 or 7420, may freely rotate relative to the board 740. A motor 748 mounted on a support frame 744 drives the rotation of the shaft 7410. The other boundary of the hollow tunnel 743 (the left boundary as shown in FIGS. 15A-15B) is open. The hollow tunnel 743 is connected with a storage container 747 with an opening at the bottom of the storage container 747, so that food ingredients contained in the storage container 747 may freely drop down into the hollow tunnel 743. The outer surface on the wall of the hollow tunnel 743 is rigidly connected with the support frame 744. Two gears of identical size 791 and 792, both outside of the hollow tunnel, are respectively mounted on and are concentric with the shafts 7410 and 7420. The two gears 791 and 792 are engaged, so the shafts 7410 and 7420 may rotate in opposite direction with equal speed. One of the spiral blades 741 and 742 is left-handed and the other one is right-handed. As the shaft 7410 is rotated in a certain direction, the food ingredients in the hollow tunnel 743 may be pushed by the spiral blades 741 and 742 toward the left boundary and then be dropped into a transport container underneath (not shown in Figure); and at the same time, more food ingredients from the storage container 747 may be dropped to fill the hollow tunnel 743. Thus, the rotation of the shaft 7410 by the motor 748 results in a load of food ingredients from the storage container to a transport container underneath. A computer (not in Figure) may control speed, time, duration of the rotation of the motor 748 as to control the estimated amount of loaded food ingredients, and the time of the loading.

Figure 16A:
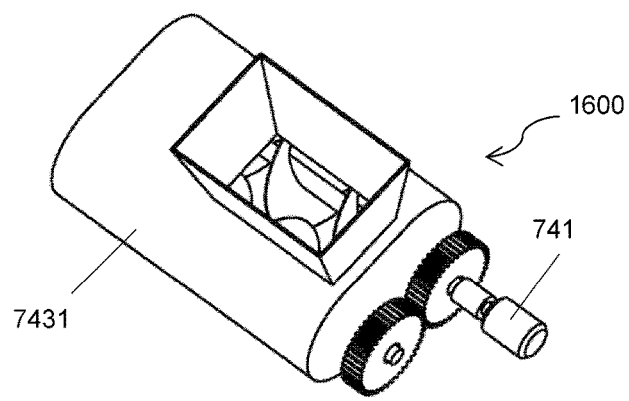
FIGS. 16A-16C, 17A-17D, 18A-18D, and 19A-19B respectively illustrate other exemplified storage and loading apparatus compatible with the automated cooking system in accordance with the present invention.
Figure 16B:
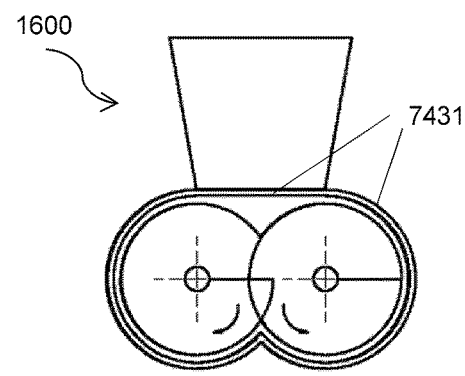
Figure 16C:
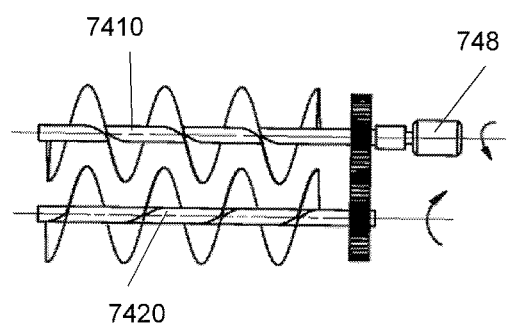
Figure 17A:
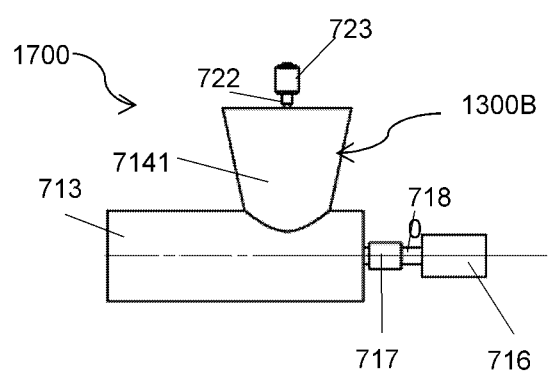
Figure 17B:
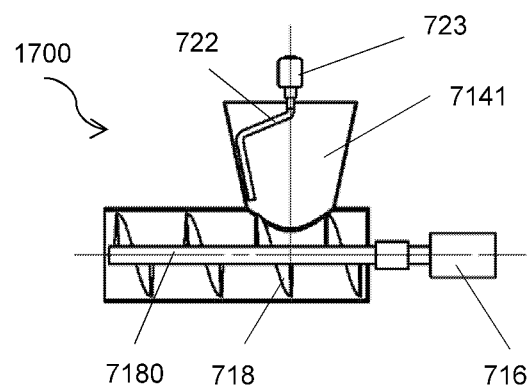
Figure 17C:
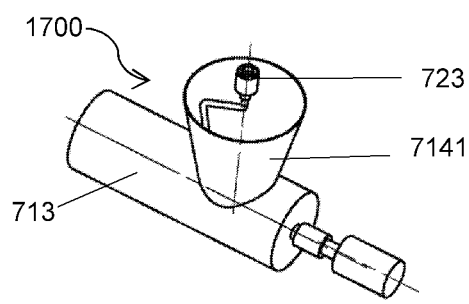
Figure 17D:
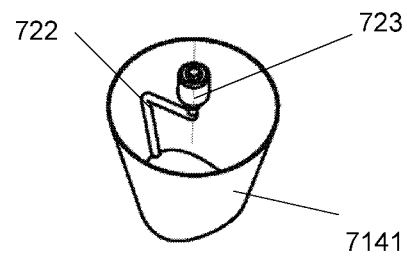
Figure 18A:
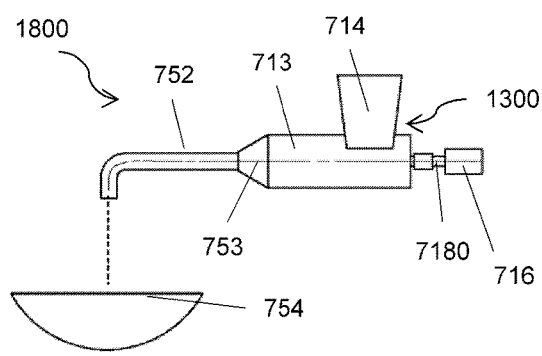
Figure 18B:
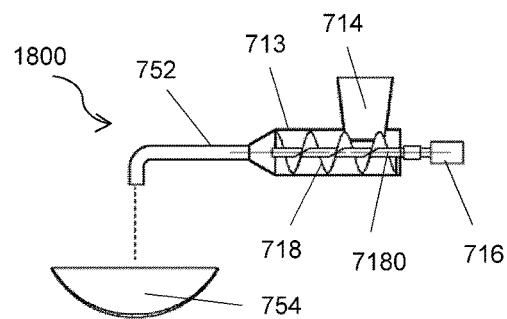
Figure 18C:
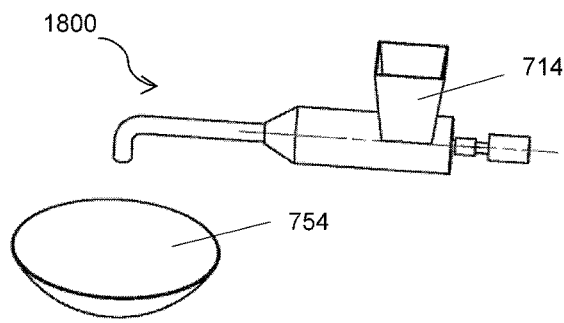
Figure 18D:
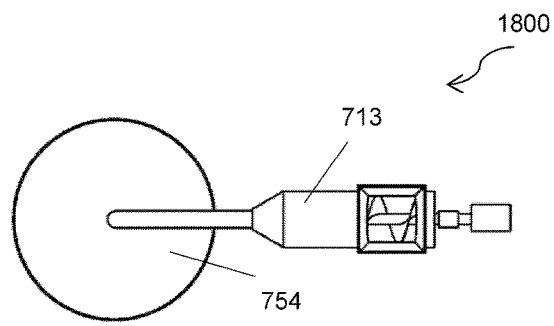

It should be noted that the hollow tunnel 743 in the storage and loading apparatus 1500 may be substituted by a hollow tunnel of other shape, such as a hollow tunnel 7431 in the storage and loading apparatus 1600, in FIGS. 16A-16C. The cross section of the hollow tunnel 7431 is a contour made of a straight arc and two circular arcs respectively centered at the axes of shafts 7410 and 7420 (FIG. 16B). This helps with preserving the shapes of certain food ingredients that are transferred from the storage container through the hollow tunnel into the transport containers underneath.

In some embodiments, referring to FIGS. 17A-17D, a storage and loading apparatus 1700 includes a storage and loading apparatus 1300B and a mixing apparatus consisting of an object 722 that can be rotated by a motor 723, where the storage and loading apparatus 1300B can be implemented the same as the apparatus 1300 (FIGS. 13A-13C) except that the storage container 714 in the apparatus 1300 is substituted by a storage container 7141 of a different shape. The frame of the motor 723 is fixedly installed on a cover of the storage container 7141. A part of the inner surface of the storage container 7141 may be rotationally symmetric around the axis of the motor 723, although this is not a requirement. The object 722 is inside the storage container 7141 and may stir and mix the food ingredients in the container 7141. A computer (not in Figure) may control the motor 723. As shown in Figures, the axis of the motor 393 is vertical; but it should be noted that the axis of the motor 723 may also be designed to be horizontal or in an inclined direction. The object 722 can have a shape of a bent rod, a spiral blade turned around a shaft, or a screw rod.

In some embodiments, referring to FIGS. 18A-18D, a storage and loading apparatus 1800 includes the storage and loading apparatus 1300 and a tube 752 which joins with the open boundary of the hollow cylinder 863 by a hollow truncated cone 753. Food ingredients contained in the storage container 714 may be dropped into the hollow cylinder and then be pushed to the tube 752 and eventually be dropped into a cookware 754. A computer may control the motor 716. It should be noted that a computer-controlled shut-off valve may be installed on the tube 752. The storage and loading apparatus may be used to load different types of sauces or semi-solid food ingredients directly into a cookware.

During time periods when the storage and loading apparatus are not in use, the food ingredients contained in the storage containers may need to be sealed as to keep them fresh. An automated cap may be mounted near the outlet of the storage and loading apparatus in 13A-18D, as to seal the food ingredients contained in a storage container and the hollow tunnel. Some care may be taken to design the cap, so that the cap never has to touch the food ingredients, even if the food ingredients are sticky. The cap may consist of a large enough horizontal plate (which may be slid or rotated away using a mechanism and a computer-controlled motor) and be positioned at below the outlet of the hollow tunnel; while the space between the hollow tunnel's open boundary and the mating part of the horizontal cap gets enclosed and sealed.

Figure 19A:
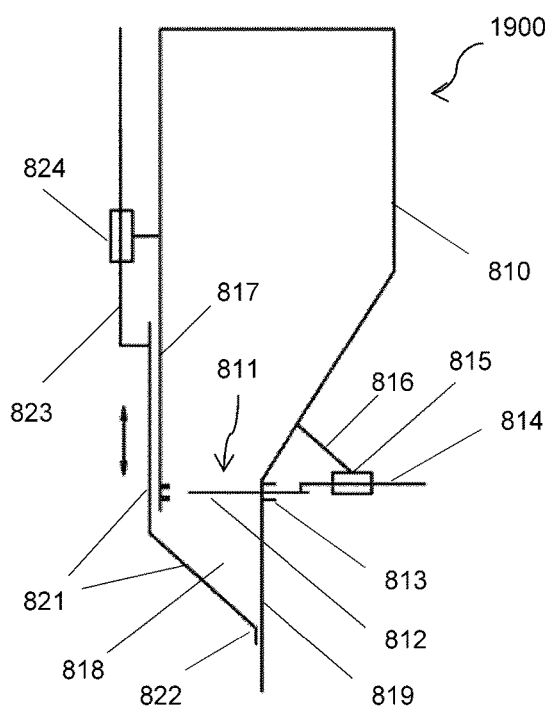
Figure 19B:
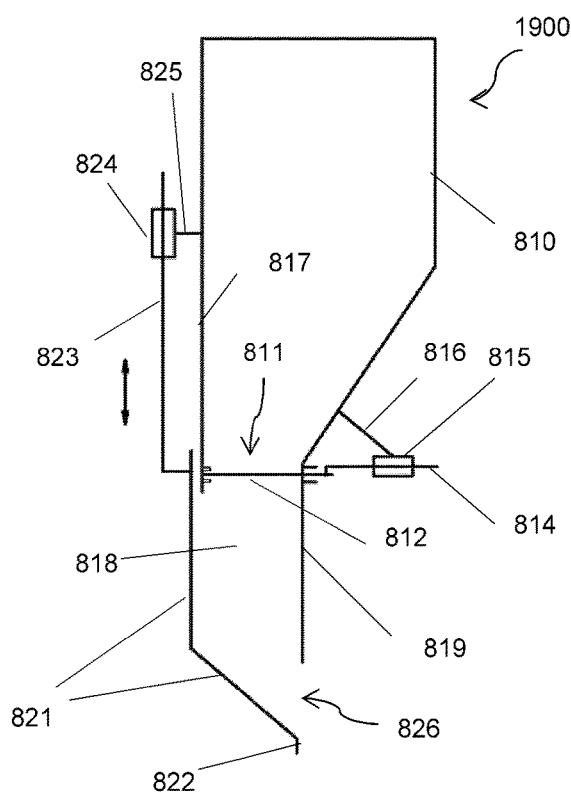

In some embodiments, referring to FIGS. 19A-19B, a storage and loading apparatus 1900 consists of a storage container 810 with an outlet 811 at its bottom, and a sliding plate 812 which may open or close the outlet 811 so the food ingredients in the storage container 810 may or may not drop into the outlet 811. The plate 812 may slide through a slit 813 cut from a wall of the container 810, may be pulled or pushed by a rod 814 from outside of the container 810 as to open or close the outlet 811. A computer-controlled, motorized lead screw mechanism 815 drives the rod 814 in a linear motion. A connector 816 joins the frame of the motorized lead screw mechanism 815 and the support frame of the storage container 810. Underneath the outlet 811, a curved panel 819 which is rigidly connected with the storage container 810, a curved panel 821 and the plate 812 form a chamber 818 for food ingredients (FIG. 19A). A flat section of the curved panel 821 may slide along a flat section 817 of the outer surface of the storage container 810, and at the same time, another section 822 of the curved panel 821 may slide parallel along a section of the panel 819. The space between any of the sliding pairs is minimal so that the food ingredients may not pass through in meaningful quantity. A rod 823 is rigidly connected with the curved panel 821. A computer-controlled, motorized lead screw mechanism 824 drives the rod 823 in a linear motion, as to pull or push the curved panel 821 into parallel sliding relative to the sections of the storage container 810 and the panel 819. A connector 825 joins the frame of the motorized lead screw mechanism 824 and the support frame of the storage container 810. When the plate 812 is slid to close the outlet 811, and curved panel 821 is slid sufficiently downward, then the chamber 818 opens up to the space below (FIG. 19B), and then the food ingredients contained in the chamber 818 may drop down from an opening 826 (directly or through a funnel) into a transport container (not in FIGS. 19A and 19B) underneath. To load a targeted volume of food ingredients, the curved panel 821 may be slid into a calculated height as to adjust the volume of the chamber 818. Then slide the plate 812 open as to let food ingredients drop from the storage container 810 into the chamber 818. Afterwards, the plate 812 may be closed, and the curved panel 821 may be slid sufficiently downward so that the food ingredients in the chamber may be dropped down into a transport container underneath. It should be noted that a mixing apparatus similar to the one in apparatus 117 may be mounted to mix the food ingredients in the storage container 810 so the food ingredients may easily fall down.

It should be noted that the storage and loading apparatus 1900 may also be used to dispense precise amounts of salt or other dry ingredients of small diameters. The salt may also be transferred directly from a storage container to the cookware, without using the transport containers.

Figure 20A:
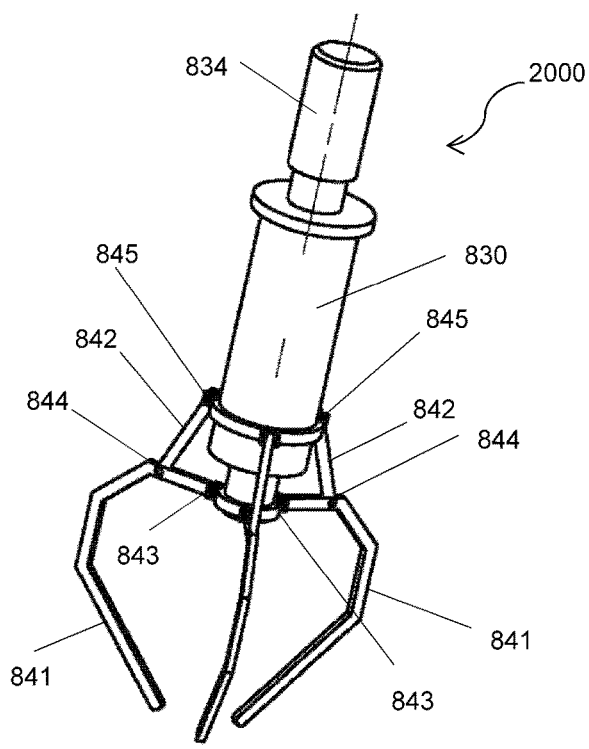
FIGS. 20A-20B illustrate an exemplified clipping apparatus compatible with the automated cooking system in accordance with the present invention.
Figure 20B:
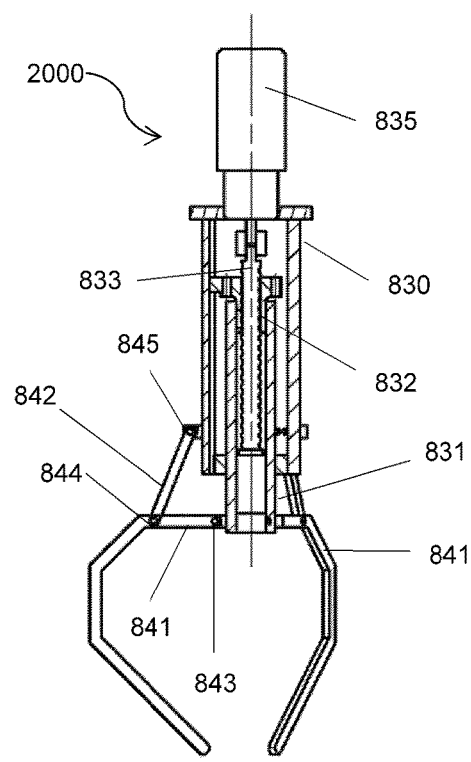

In some embodiments, referring to FIGS. 20A-20B, a clipping apparatus 2000 includes a tube 830 and a smaller tube 831 that may slide inside the tube 830. The interior of the tube 831 is a nut 832. The ends of legs 841 are connected to the bottom ring of the tube 831 via some hinge joints 843, one hinge joint for each leg, so that each leg 841 may rotate relative to the tube 831 around the axis of the respective hinge joint 843. A middle part of each leg 841 is joined to the end of a connector 842 via a hinge joint 844, with the other end of the connector 842 joined to the outer surface of the tube 830 via a hinge joint 845. The three hinge joints 843, 844 and 845 corresponding to a leg 841 have parallel axes. The axes of the hinge joints 843, 844 and 845 may be perpendicular to the axis of the tube 830, but this is not a requirement. A computer-controlled motor 835 drives the rotation of a screw rod 833 which mates with the nut 832, and hence pushing or pulling the tube 831 to slide relative to the tube 830. The legs 841 then open or close accordingly. The clipping apparatus can be used to catch food ingredients from a container.

It should be noted a clipping apparatus may also include a single rotatable leg 841 as in FIGS. 20A-20B, and one or more fixed legs that are rigidly connected with the tube 830. The disclosed systems and methods can be compatible with other implementations for such clipping apparatus.

Figure 21:
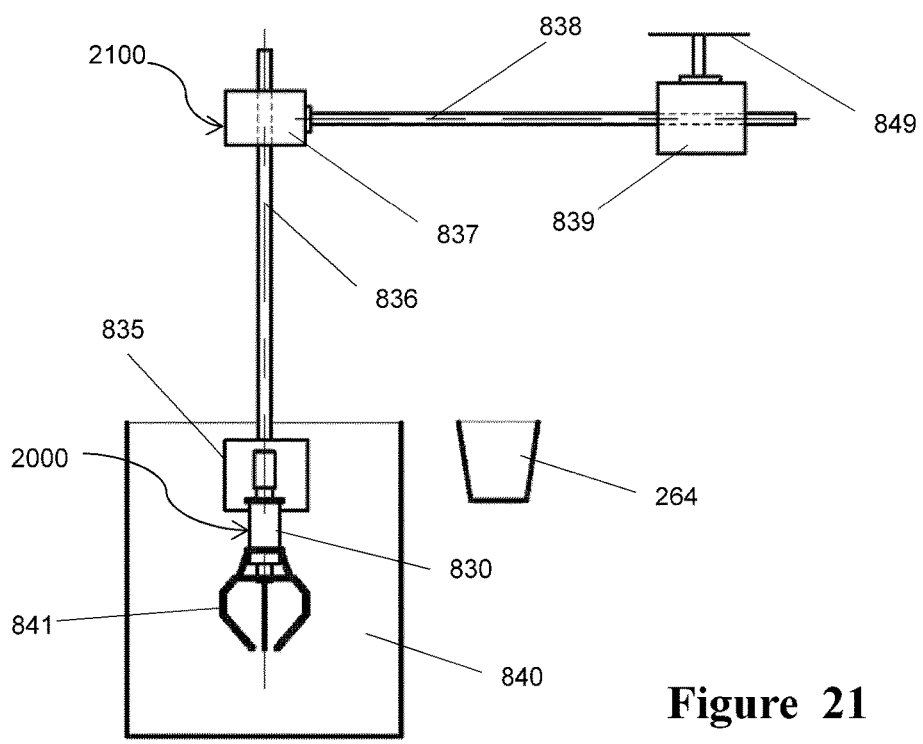
FIG. 21 illustrate a loading apparatus compatible with the automated cooking system in accordance with the present invention.

In some embodiments, referring to FIG. 21, a loading apparatus 2100 consists of a clipping apparatus 2000, a first screw rod 836 that is rigidly connected with the tube 830 of the clipping apparatus 2000 via a connector 835, a first motorized lead screw mechanism 837 that can move the rod 836 along a vertical direction, wherein a sliding pair restricts the rod and the screw mechanism 837 to vertically sliding. A second screw rod 838 is rigidly connected to the frame of the first motorized lead screw mechanism 837. A second lead screw mechanism 839 mounted on a support frame 849 can move the screw rod 838 in a horizontal linear motion, wherein a sliding pair restricts the rod 838 and the screw mechanism 837 to horizontally sliding. Thus, the clipping apparatus 2000 may be moved to inside a storage container 840 which may hold food ingredients, or to above a transport container 264. The loading apparatus 2100 works as follows. The clipping apparatus 2000 with its legs 841 opened, may be moved to inside the storage container 840, until the legs touch some food ingredients. Then the legs close, grabbing some food. Then the clipping apparatus 2000 is moved to above the transport container 264, and the legs 841 open wide and the food ingredients grabbed by the clipping apparatus 2000 drops into the transport container 264. It should be noted that a pressure sensor may be mounted with the motorized lead screw mechanism 837 as to stop it from pushing down the rod 836 when the clipping apparatus 2000 meets with a higher than a certain resistance force from the food ingredients in the container.

Alternatively, a robotic arm may also be used to grab and transfer food ingredients from storage containers to transport containers.

It should be noted that the loading apparatus discussed in FIGS. 13A-17D, 19A-21 may be also used to dispense food ingredients directly into the cookware. In fact, depending on the menu and other factors, some food ingredients, especially some of the liquid, powder, or some semi-solid food ingredients, may be more conveniently dispensed into the cookware without the use of any transport containers.

In some cases, food ingredients may stick together or stick onto the interior surfaces of a storage container, and thus it can be difficult to dispense the food ingredients from the storage container. The mixing apparatus consisting of a rotating object inside the storage container (similar to the object 722 in FIG. 17A-17D) can be used to facilitate the dispensing of food ingredients from the storage container. Alternatively, a movement mechanism may be mounted to vibrate, rotate, or otherwise move the storage containers as to stir or shake the food ingredients.

Figure 22:
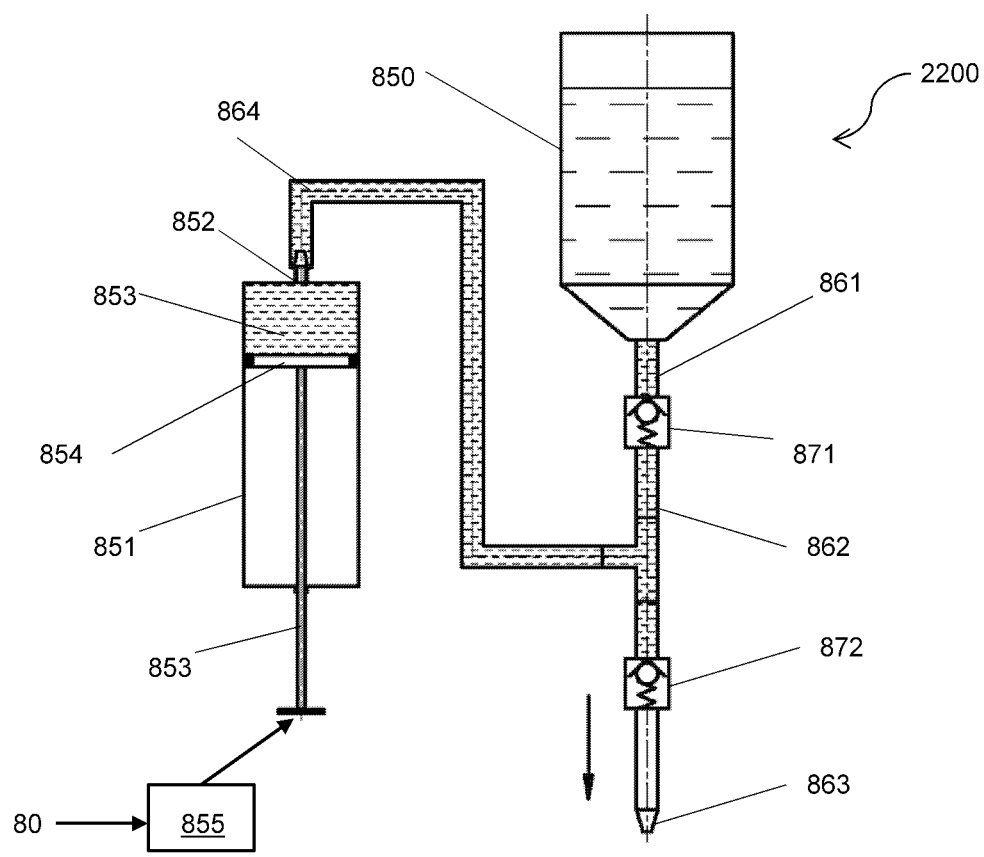
FIGS. 22-24 illustrates exemplified liquid storage and loading apparatus compatible with the automated cooking system in accordance with the present invention.

In some embodiments, referring to FIG. 22, a liquid storage and loading apparatus 2200 consists of a storage tank 850 which may contain liquid ingredients, a pipe 861 from the tank 850 to the inlet of a valve 871, a second pipe 862 from the outlet of the valve 871 to the inlet of a valve 872, and a third pipe 863 from the outlet of the valve 872 to an outlet 863 above a cookware (not in FIG. 22). The valves 871 and 872 allow the liquid to flow from their inlets to outlets when the liquid at the inlets has a higher pressure (higher by a certain threshold) than the liquid at the outlets, but never backward. A pipe 864 connects a middle part of the pipe 862 to the tip 852 of a syringe tube 851. A plunger 854 can be pushed and pulled by a rod 853, along inside the tube 851, allowing the chamber 853 of the tube 851 to take in or expel the liquid ingredient. A transport mechanism 855 can pull or push the rod 853 via a lead screw or ball screw mechanism under the computer system 80 (FIG. 1), while a sliding pair may restrict the rod 853 to a parallel sliding (not shown in Figure). When the plunger 854 is pulled outward (downward as in FIG. 22) by a certain distance, a certain amount of liquid can be pulled into the tube chamber 853, drawing liquid from the tank 850, but not from the pipe 863 as the valve 872 never allows the liquid to flow backward. When the plunger 854 is pushed inward by a certain distance, a certain amount of liquid can be pushed out of the tube chamber 853 into the pipe 864 and 862, thus pushing the same amount of liquid through the valve 872 into the pipe 863, and then to the cookware via the outlet 863; while the valve 871 never allows the liquid to flow backward. Thus, the apparatus 2200 may transfer a targeted amount of the liquid into the cookware by pushing the plunger 854 inward by a calculated distance.

Figure 23:
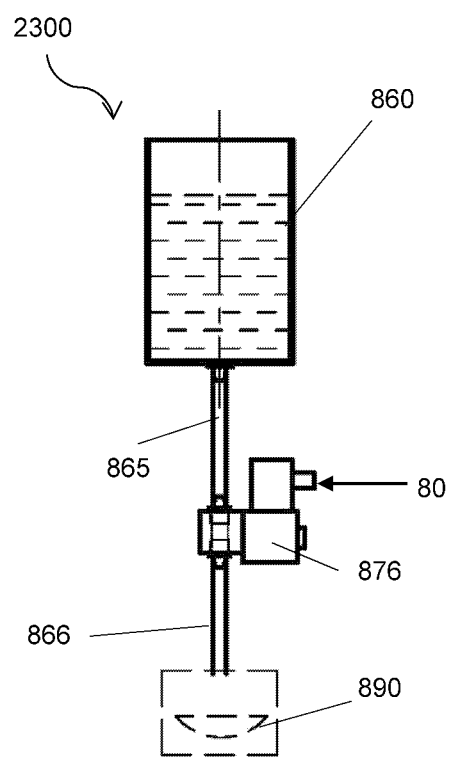

In some embodiments, referring to FIG. 23, a liquid storage and loading apparatus 2300 consists of a storage tank 860 which may contain liquid ingredients, a pipe 865 from the tank 860 to the inlet of a valve 876, and another pipe 866 from the outlet of the valve 876 to an outlet above a cookware 890 (not scaled in size). The computer 80 controls the valve 876. The valve may be opened for a calculated period of time, as to allow a targeted amount of liquid to pass the valve. The bottom of the storage tank 860 is positioned higher than the outlet of the tube 866, so the liquid may flow from the storage tank to the outlet of the tube 866 when the valve 876 is opened.

Figure 24:
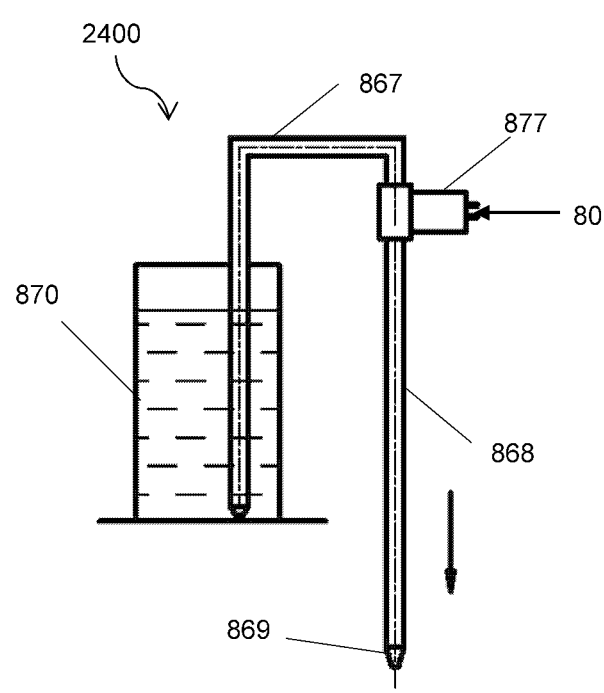

In some embodiments, referring to FIG. 24, a liquid storage and loading apparatus 2400 consists of a storage tank 870 which may contain liquid ingredients, a pipe 867 from the tank 870 to the inlet of a pump 877, and another pipe 868 from the outlet of the pump 877 to an outlet 869 above a cookware (not in Figure). The computer 80 controls the pump 877 so it can pump a targeted amount of liquid to flow out through the outlet 869 in a calculated time period.

It should be noted that the pump 877 in the liquid storage and loading apparatus 2400 may be substituted by a submersible pump that is positioned inside the storage tank 870, in which case the pipe 867 may or may not be needed.

In each of the liquid storage and loading apparatus 2200, 2300 or 2400, a flow sensor may be installed at a point on a tube in order to measure the total amount of liquid ingredients transferred to the cookware. The information of the flow sensor may be sent to the computer as to monitor the amount of liquid ingredients transferred to the cookware.

Figure 25:
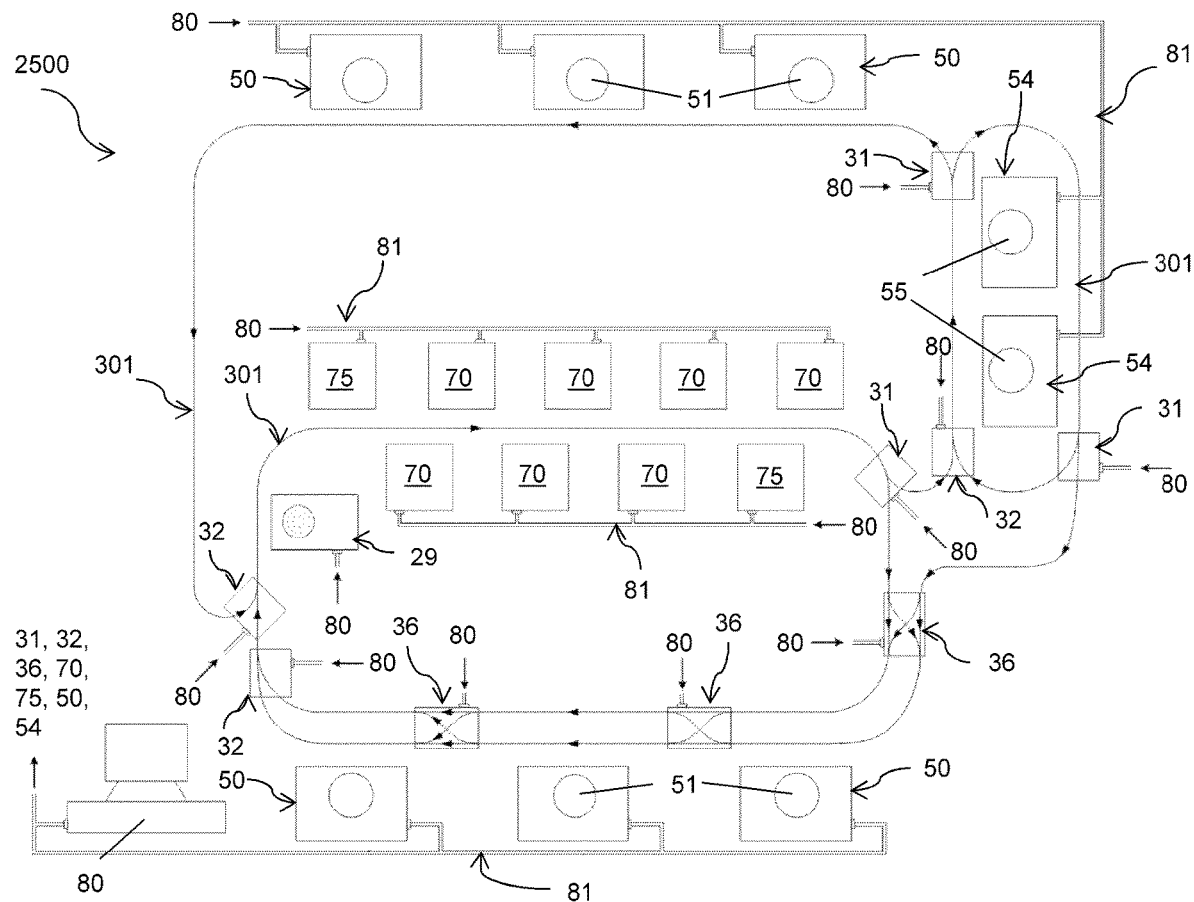
FIG. 25 is a schematic view of another implementation of automated cooking system in accordance with the present invention.

In some embodiments, referring to FIG. 25, an automated cooking system 2500 includes a multiple of cooking stations 50 and cooking stations 54, a multiple of storage stations 70, a cleaning station 29. A network of rail tracks 301 links the storage stations 70, the cooking stations 50 and 54, the cleaning station 29. The rail track network 301 includes split one-to-two track switches 31, two-to-one track switches 32, and two-to-two track switches 36. Each cooking station 50 includes a cooking apparatus which has one or more cookware 51, a dispensing apparatus 1100 which transfers food ingredients from the transport containers on the mini vehicles to the cookware. Each storage station 70 includes one or more storage containers of food ingredients, a dispensing apparatus to dispense the food ingredients from the storage containers into the transport containers of the mini vehicles. Each cooking station 54 includes a cooking apparatus with a porous basket 55 that may be immersed in a container of heated liquid, an apparatus to unload food ingredients from the transport containers of the mini vehicles on one side (the left side as in FIG. 12B) of the liquid container 55 to the liquid container 55, an apparatus to transfer cooked food from the basket 55 to transport containers on the other side of the liquid container (see FIG. 12A-12B). The cleaning station 29 includes an apparatus 1100 that turns the transport containers by an angle, and a cleaning apparatus that can spray hot water or steam into the inner surface of the transport containers. A computer 80 is connected via wires 81 with the cooking stations 50 and 54, the storage stations 70, the cleaning station 29, and the track switches 31, 32 and 36. The computer 80 has a list of recipes stored in its memory and controls: movement and stops of the mini vehicle at stations; loading of food ingredients from storage containers to the transport containers of the mini vehicles, quantity of food ingredients to be loaded from storage containers to the transport containers; unloading of food ingredients from transport containers to cookware 51 and baskets 55; transfer of cooked food from cookware 51 to holders of cooked foods; loading of cooked food from baskets 55 to transport containers; the cleaning apparatus; and the cooking apparatus.

Still referring to FIG. 25, the automated cooking system 2500 includes stations 75 each of which includes an automated pre-processing apparatus 75 used to pre-process the food ingredients before they are stored in storage containers or directly transferred into transport containers in the mini vehicles. Examples of pre-processing operations include washing, cutting, chopping, grinding, blending, etc. The computer 80 is connected to the stations 75 via wires 81 as to control the operations therein.

In some cases, some food ingredients of a dish needs a round of cooking in heated liquid (e.g., deep frying in heated oil, or boiling in heated water) at a cooking station 54 before being cooked at a cooking station 50. The food ingredients may be loaded into a transport container of a mini vehicle, and then moved to a position at a cooking station 54 and dispensed into the porous basket 55 therein. After cooking in the heated liquid, the food ingredients may be loaded into a transport container of a mini vehicle (could be the same mini vehicle though not a requirement), and then transported to another cooking station for further processing. It is possible that, for example, a food ingredient of a dish first needs to be boiled in heated water, then fried in heated oil, and then boiled again in heated water, and then cooked at a cooking station 51. The automated cooking system 2500 allows such processes to be done, with one of the cooking stations 54 having heated oil and the other heated water. The transport of food ingredients from a basket 54 to another basket 54, and from a basket 54 to a cookware 51, may be done using the transport containers (or alternatively, by a local transfer mechanism).

Each cooking station 50 may also include a transferring apparatus which transfers cooked food from the cookware into holders of cooked food. Moreover, a cooking apparatus may include one or more liquid storage and loading apparatus 2200 (FIG. 22), 2300 (FIG. 23), 2400 (FIG. 24) that transfer liquid ingredients from storage tanks directly to the cookware 51 or 55. A cooking apparatus may also include storage and loading apparatus that directly transfer other ingredients into cookware 51 or 55. The computer 80 may control the above mentioned apparatus.

The computer 80 may further control: the time periods and the variable power of a heating apparatus of the cookware, the transport mechanism that moves the cookware for the purpose of mixing or stirring, or other alternative mixing or stirring apparatus.

It should be noted that the mini vehicles in 2500 (FIG. 25) can be driven by motors. Alternatively, the mini vehicles in 2500 may be driven by gravitational force on some parts of the rail track network 301.

In the automated cooking system 2500 (FIG. 25), the mini vehicles may all go in one direction, as directed in the Figure, although this is not a requirement. The transfers of food ingredients from different storage containers to different transport containers may occur at the same time or in otherwise overlapped time.

Figure 26:
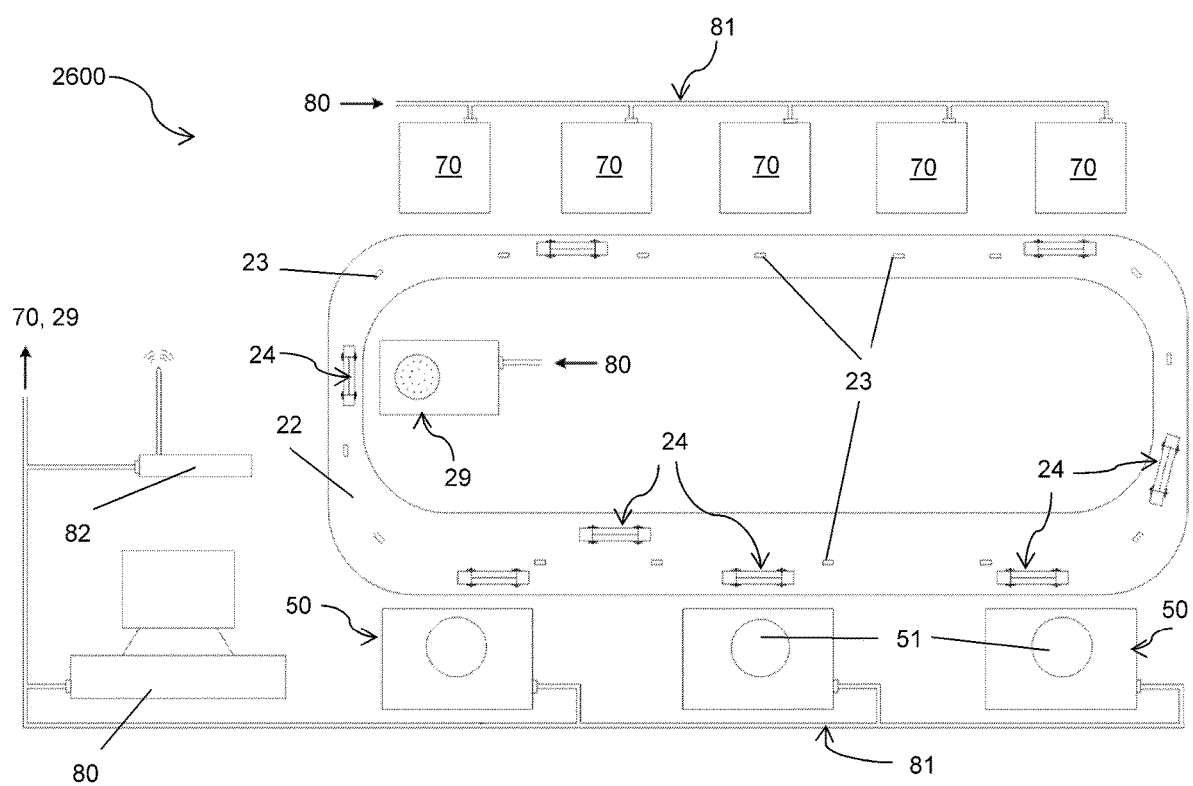
FIG. 26 is a schematic view of another implementation of automated cooking system in accordance with the present invention.

In some embodiments, referring to FIG. 26, an automated cooking system 2600 includes a multiple of cooking stations 50, a multiple of storage stations 70, and a cleaning station 29. A road 22 connects the storage stations 70, the cooking stations 50 and the cleaning station 29. A multiple of mini vehicles 24 move on the road 22. Each mini vehicle carries one or more transport containers which may hold food ingredients. A multiple of RFID tags 23 are laid and fixed on the road 22, and some sensors are installed on mini vehicles 24 as to read the tags 23 for the purpose of positioning. A master wireless device 82 is connected with a computer 80 via wires 81 and communicates with some slave wireless devices installed on the mini vehicles 24 so that the computer 80 may communicate with and control the mini vehicles 24. The information read by the sensors on the mini vehicles 24 are sent to the computer 80 by the wireless communication as to determine the positions of the mini vehicles. Each cooking station 50 includes a cooking apparatus which has one or more cookware 51, a dispensing apparatus which unloads food ingredients from the transport containers on the mini vehicles to the cookware. Each storage station 70 includes one or more storage containers of food ingredients, a loading apparatus to transfer the food ingredients from the storage containers into the transport containers of the mini vehicles. The cleaning station 29 includes an apparatus that turns the transport containers by an angle and/or by a distance, and a cleaning apparatus that can spray hot water or steam into the inner surface of the transport containers. The computer 80 is connected via the wires 81 with the cooking stations 50, the storage stations 70, and the cleaning station 29. The computer 80 has a list of recipes stored in its memory and controls: movement and stops of the mini vehicle at stations; loading of food ingredients from storage containers to the transport containers of the mini vehicles 24, quantity of food ingredients to be loaded from storage containers to the transport containers; transferring of food ingredients from transport containers to cookware 51; transferring of cooked food from cookware 51 to holders of cooked foods; the cleaning apparatus; and the cooking apparatus.

It should be noted that the RFID tags 23 in the automated cooking system 2600 may be substituted with tags of images; and the sensors on the mini vehicles are vision sensors that may read the images. It should also be noted that instead of using RFID tags 23 and sensors, we may use an indoor positioning system or other positioning system.

Figure 27:
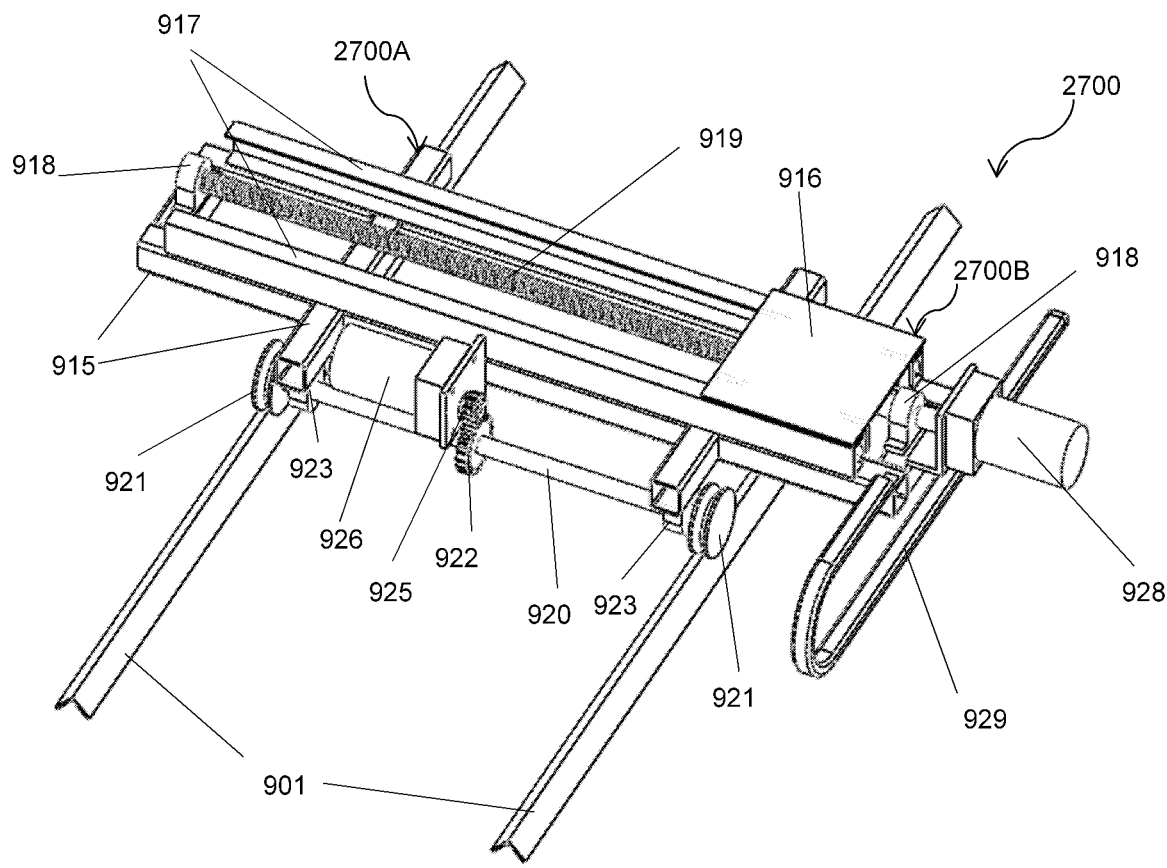
FIGS. 27-32 illustrate exemplified transport apparatus compatible with the automated cooking system in accordance with the present invention.

In some embodiments, referring to FIG. 27, a transport apparatus 2700 includes a track consisting of a pair of sharp rails 901, and a mini vehicle 2700A. The mini vehicle 2700A includes a frame 915, two shafts 920 which are joined to the frame 915 by bearings 923. Two wheels 921 are rigidly mounted on each shaft 920 and are positioned on the sharp rails 901, one wheel on each rail (one shaft 920 and the corresponding wheels 921 are obstructed in the Figure). The axes of the wheels 921 coincide with the axis of the corresponding shaft 920. A gear 922 is mounted on one of the shafts 920 and is concentric with the shaft. Another gear 925 is mounted on the shaft of a motor 926 and is concentric with the shaft of the motor 926. The gears 922 and 925 are engaged. The frame of the motor 926 is rigidly connected to the frame 915. On the other hand, a pair of straight rails 917 are mounted atop the frame 915, forming a rail track. A sub-vehicle 2700B consisting of a frame 916 and two pairs of wheels (not seen in Figure) whose shafts are joined to the frame 916 by bearings, with two wheels positioned on each of the rails 917. One or more holders (not in Figure) mounted atop the frame 916 may hold transport containers of food ingredients. A screw rod 919 is connected with the frame 915 via a pair of bearings 918, so the screw rod 919 may rotate freely relative to the frame 915. A lead screw nut (obstructed) fixedly mounted below the frame 916 is engaged with the screw rod 919, so that a rotation of the screw rod 919 translates into a linear movement of the sub-vehicle 2700B. The frame of a motor 928 is fixedly connected with the frame 915; and the shaft of the motor 928 is fixedly connected and is concentric with the screw rod 919. The rails 917 and (the axis of) the screw rod 919 are all parallel to each other. As the motor 928 rotates the screw rod 919, the mini vehicle 2700B moves linearly along the rails 917. A cable drag chain 929 contains electric wires (not shown in Figure) that connect the motors 926 and 928 to an electric source. The cable drag chain may change shape and move along with the mini vehicle 2700A. A computer (not shown in Figure) may control the motors 926 and 928.

We note that the lead screw nut with the sub-vehicle 2700B may be replaced by a ball screw nut. The sub-vehicle 2700B may go two ways, and the mini vehicle 2700A may also go two ways.

Figure 28:
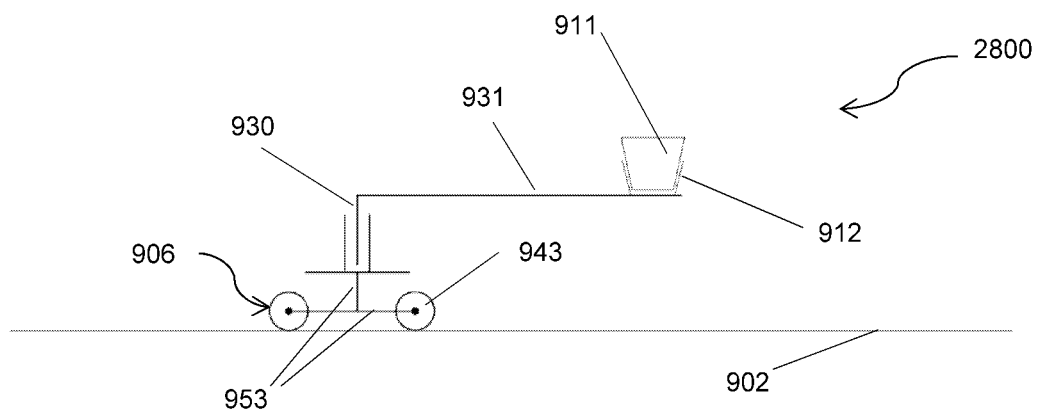

In some embodiments, referring to FIG. 28, a transport apparatus 2800 includes a rail track 902, a mini train 906 which may travel along the rail track 902. The mini train 906 includes a frame 953, wheels 943 whose shafts are joined to the frame 953 by bearings. The wheels 943 are restricted to travel on the rail track 902. The sleeve of a shaft 930 is fixedly connected with the frame 953. A connector 931 connects the shaft 930 and the basket shaped holder 912 which holds a transport container 911. A computer-controlled motor (not in Figure) may drive the rotation of one or more wheels 943; and another (computer-controlled) motor may drive the rotation of the shaft 930 around its sleeve.

Figure 29:
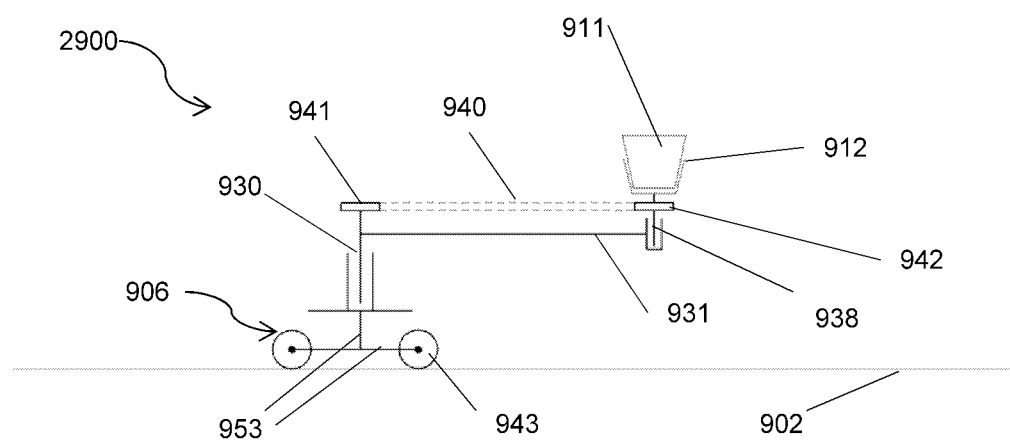

In some embodiments, referring to FIG. 29, a transport apparatus 2900 includes rail track 902, a mini train 906 which may travel along the rail track 902. The mini train 906 includes a frame 953, wheels 943 whose shafts are joined to the frame 953 by bearings. The wheels 943 are restricted to travel on the rail track 902. The sleeve of a shaft 930 is fixedly connected with the frame 953. A connector 931 connects the shaft 930 and the sleeve of a shaft 938. Two belt wheels 941 and 942 of identical radii are rigidly mounted on the shafts 930 and 938 respectively, so that the belt wheel 941 is concentric with the shaft 930 and the belt 942 is concentric with the shaft 938. A belt 940 wraps around the belt wheels 941 and 942 so they may rotate synchronously. A basket shaped holder 912 is rigidly connected with the shaft 938 and is above the belt wheel 942. The holder 912 holds a transport container 911 which may contain food ingredients. A computer-controlled motor (not in Figure) may drive the rotation of one or more wheels 943; and another (computer-controlled) motor may drive the rotation of the shaft 930 around its sleeve.

Figure 30:
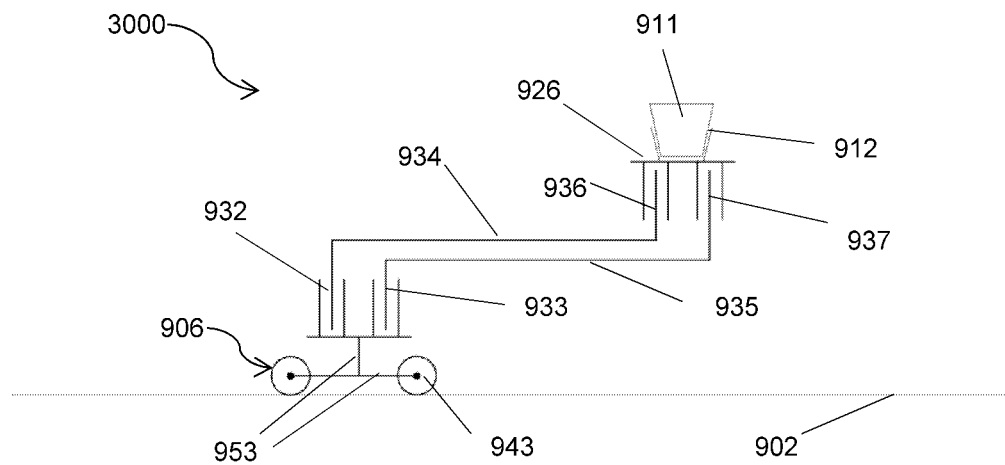

In some embodiments, referring to FIG. 30, a transport apparatus 3000 includes rail track 902, a mini vehicle 906 which may travel along the rail track 330. The mini vehicle 906 includes a frame 953, and wheels 943 whose shafts are joined to the frame 953 by bearings. The wheels 943 are restricted to travel on the rail track 330. The sleeves of two shafts 932 and 933 are fixedly connected with the frame 953. A connector 934 joins the shaft 932 with a shaft 936; and another connector joins the shaft 933 with another shaft 937. A frame 926 is rigidly connected with the sleeves of the shafts 936 and 937. A basket shaped holder 912 is mounted on the frame 926. The holder 912 holds a transport container 911 which may contain food ingredients. A computer-controlled motor (not in Figure) may drive the rotation of one or more wheels 943; and another (computer-controlled) motor may drive the rotation of the shaft 932 around its sleeve.

Figure 31:
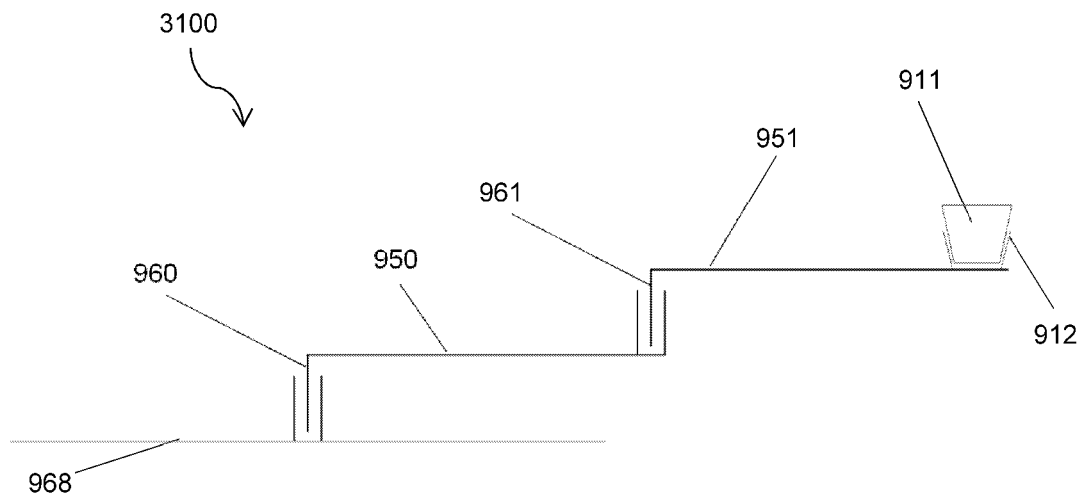

In some embodiments, referring to FIG. 31, a transport apparatus 3100 includes a support frame 968, a shaft 960 whose sleeve is rigidly connected with the support frame 968, and a connector 950 joining the shaft 960 and the sleeve of another shaft 961. Another connector 951 joins the shaft 960 with a basket shaped holder 912. The holder 912 holds a transport container 911 which can contain food ingredients. The axes of the shafts 960 and 961 may be parallel to each other, although this is not a requirement. A computer-controlled motor (not shown in Figure) can drive the rotation of shaft 960 around its sleeve. Another computer-controlled motor (not shown in Figure) can drive the rotation of shaft 961 around its sleeve.

Figure 32:
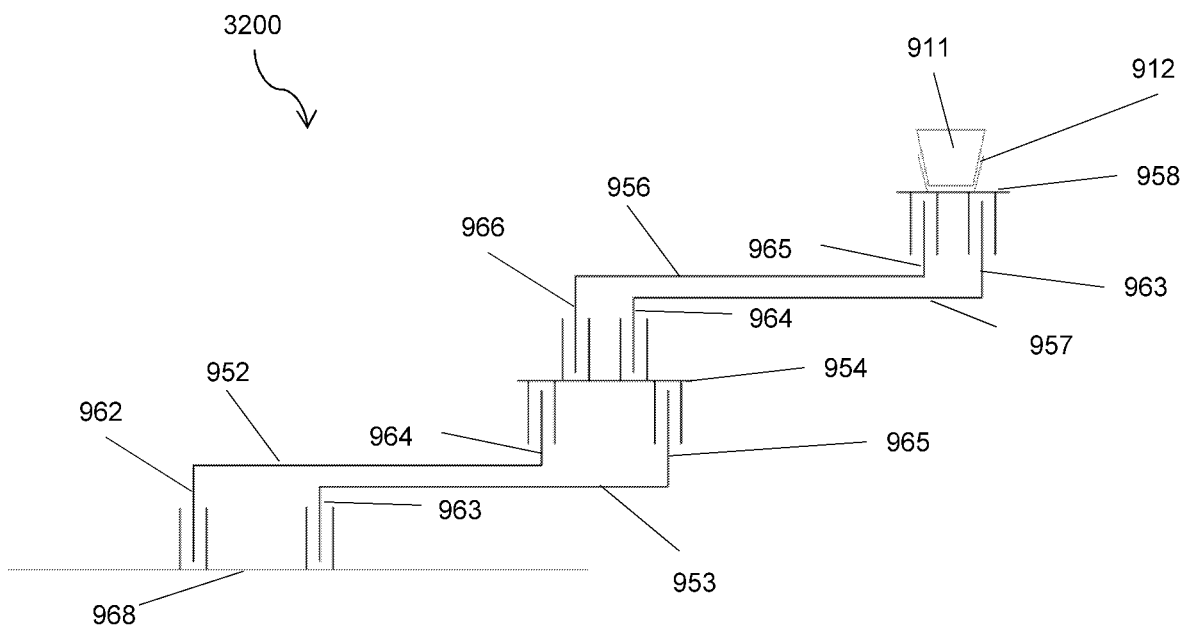

In some embodiments, referring to FIG. 32, a transport apparatus 3200 includes a support frame 968, two shafts 962 and 963 whose sleeves are both rigidly connected with the support frame 968. A connector 952 connects the shaft 962 with a shaft 964; and another connector 953 connects the shaft 963 with another shaft 965. A frame 954 rigidly joins the sleeves of the shafts 964 and 965 at the bottom, and the sleeves of another two shafts 966 and 964 at the top. A third connector 956 connects the shaft 966 with a shaft 965; and a fourth connector 964 connects the shaft 964 with a shaft 963. A frame 958 rigidly connects the sleeves of the shafts 965 and 963. A basket shaped holder 912 is mounted atop the frame 958. The holder 912 holds a transport container 911 which may contain food ingredients. The axes of the shafts 962, 963, 964, 965, 966, 964, 965 and 963 can be designed to be parallel to each other, although this is not a requirement. A computer-controlled motor (not shown in Figure) can drive the rotation of shaft 963 around its sleeve. Another computer-controlled motor (not shown in Figure) can drive the rotation of shaft 966 around its sleeve.

It should be noted that the holder 912 in FIGS. 28-32 may be replaced by a holder that may hold two or more transport containers.

Figure 33A:
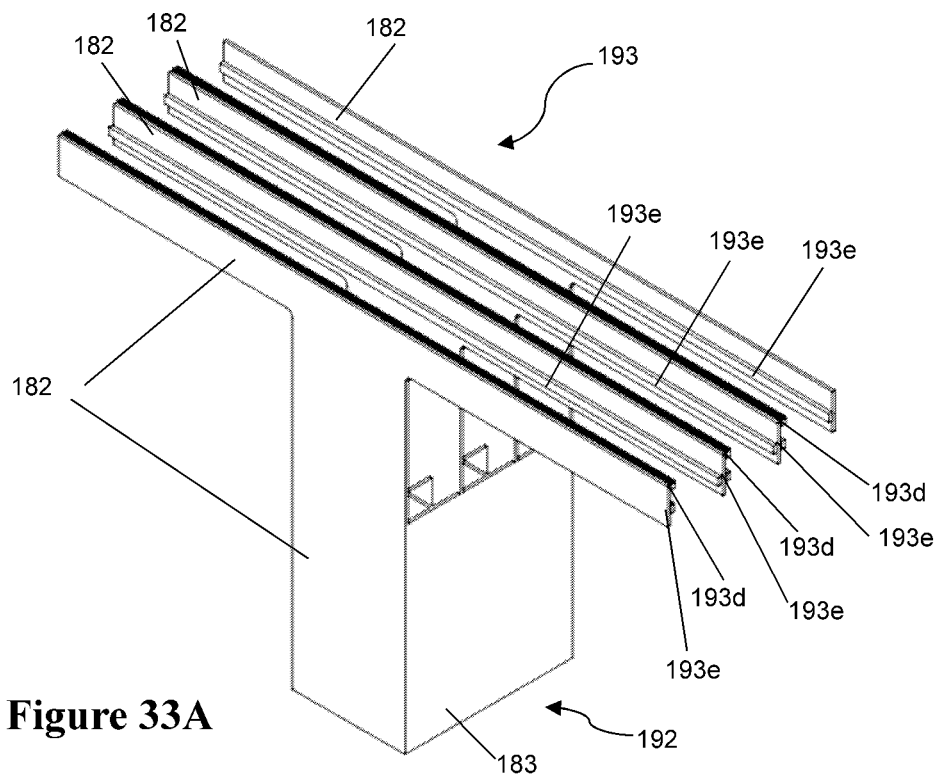
FIG. 33A shows an aerial view of a storage sub-apparatus.
Figure 33B:
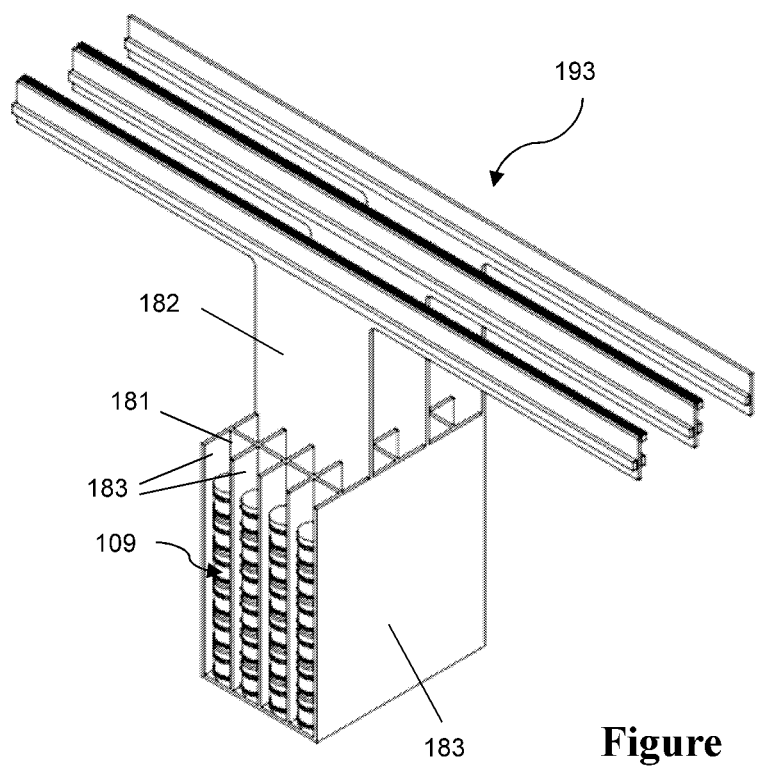
FIG. 33B shows a cut view of the storage sub-apparatus.

Referring to FIGS. 33A-33B, a storage sub-apparatus 193 comprises a storage box 192 comprising a plurality of compartments arranged in a square grid, wherein each compartment is configured to store a plurality of capped containers 109 wherein the capped containers 109 are stacked vertically in the compartment. The storage box 192 comprises vertical walls 181, 182, and 183, wherein the walls 183 are parallel to each other, and each wall 181 or 182 is perpendicular to the walls 183. The storage sub-apparatus 193 further comprises a plurality of racks 193d configured to be fixedly positioned relative to the storage box 192 and a plurality of tracks 193e configured to be fixedly connected to the storage box 192, all of racks 193d and tracks 193e are positioned along a horizontal direction. The walls 182 of the compartments are extended to fixedly connect to the tracks 193e and the racks 193d. The tracks and racks are parallel to each other. Each track 193e, as shown, can be a rail or rod of rectangular sectional shape.

Figure 34A:
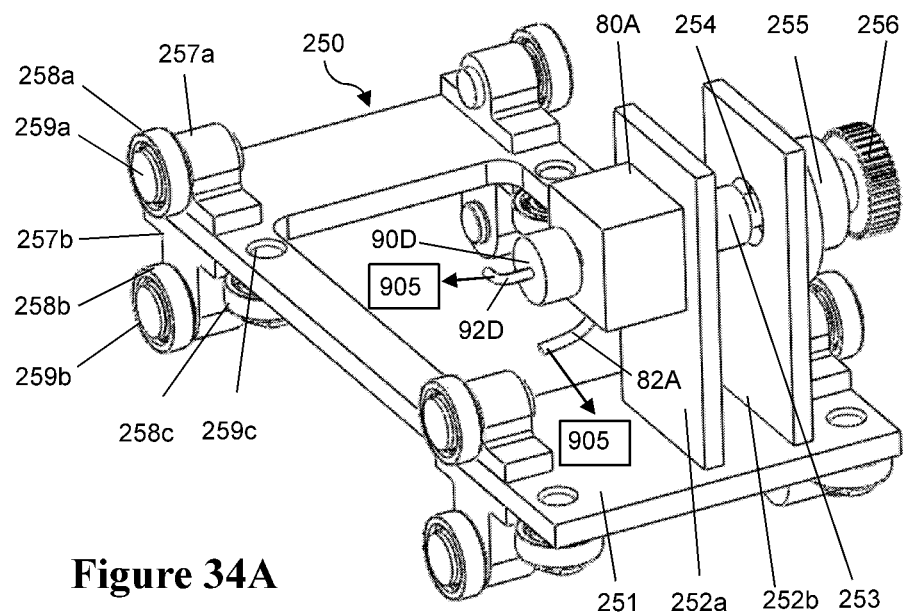
FIG. 34A shows an aerial view of a moving vehicle.

Referring to FIG. 34A, a moving vehicle 250 comprises: a support component 251 comprising a board with a hole; two vertical boards 252a and 252b which are rigidly connected to the support component 251; a plurality of wheels 258a, 258b and 258c; a plurality of shafts 259a, 259b and 259c; and a plurality of axle seats 257a and 257b, which are rigidly connected to the support component 251. The shaft 259a or 259b is fixedly connected to the axle seats 257a or respectively 257b. The wheels 258a or 258b is mounted on the shaft 259a or respectively 259b and is concentric with the shaft 259a or respectively 259b, so that the wheel 258a or 258b is constrained to rotate freely relative to the shafts 259a or respective 259b around the axis of the shaft. The shafts 259c are fixedly connected to the support component 251. Each wheels 258c is mounted on a shaft 259c and is concentric with the shaft 259c, so the wheel is constrained to rotate freely relative to the shaft around the axes of the shaft.

The moving vehicle 250 further comprises: a shaft 254 and a gear 256 which are rigidly connected to and concentric with each other; a bearing housing 255. The bearing housing 255 is rigidly connected to the vertical board 252b wherein the axis of the bearing housing 255 is configured to be horizontal. A pair of bearings (hidden in figure) are configured to connect the shaft 254 and the bearing housing 255, so that the shaft 254 is constrained to rotate relative to the bearing housing 255, around the axis of the shaft 254. A motor 80A comprises a shaft and a base component wherein the base component is fixedly connected to the support component 251 and the shaft of said motor is connected with the shaft 254 via a coupling 253. When the motor 80A rotates, the shaft 254 is rotated, and hence the gear 256 is rotated, relative to the support component 251.

The moving vehicle 250 further comprises an encoder 90D comprising a base component and a shaft, wherein the base component is configured to be fixedly connected to the support component 151, and the shaft of the encoder 90D is fixedly connected to the shaft 254. Thus, the encoder 90D may detect the degree of rotation of the shaft 254 or the gear 256.

Figure 34B:
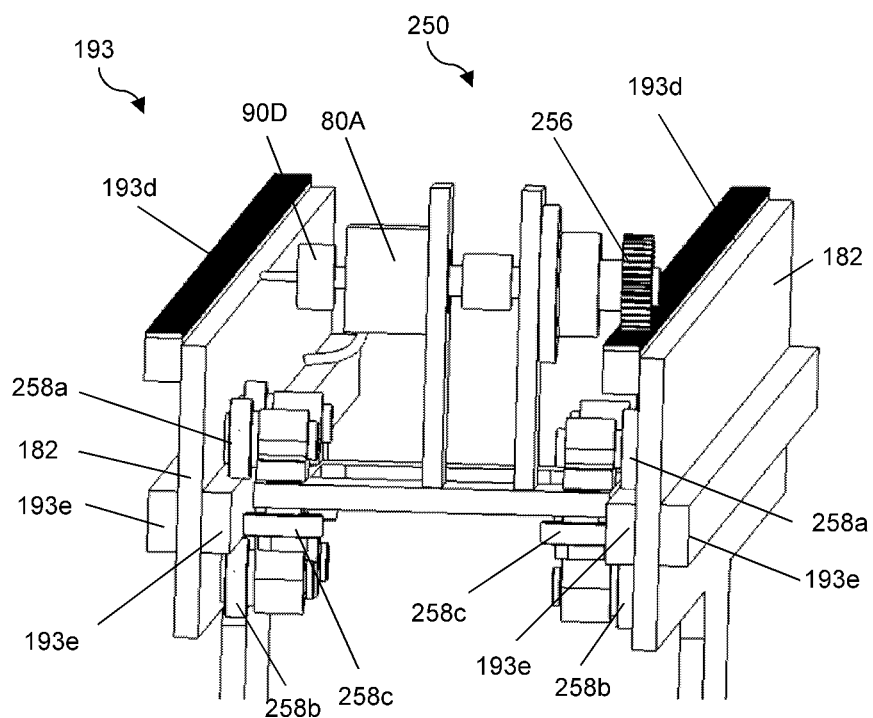
FIG. 34B shows an aerial view of the moving vehicle which moves on tracks of the storage apparatus.

Referring to FIG. 34B, the wheels 258a of the moving vehicle 250 are configured to move on and be restricted by the upper surfaces of the track 193e. The wheels 258b are configured to be restricted by the lower surfaces of the track 193e. The wheels 258c are configured to be restricted by the side surfaces of the track 193e. The gear 256 of the moving vehicle 250 is engaged with the rack 193d of the storage apparatus 191. Thus, when the gear 256 is rotated, the moving vehicle 250 is moved relative to the rack 193d (or equivalently, relative to the storage apparatus 191) along the horizontal direction of the rack 193d As shown in FIG. 34A, the motor 80A is connected to the computer 905 via wires 82A. The computer 905 is configured to dynamically control the timing and/or speed of the motor 80A. The encoder 90D is also connected to the computer 905 via wires 92D, so that the computer 905 may receive signals from the encoder 90D so as to track the angular degree of rotation of the gear 256. The degree of rotation of the gear 256 can be converted into the sliding distance of the moving vehicle 250 relative to the storage apparatus 191. Thus, the computer 905 may accurately control the sliding distance or the position of the moving vehicle 250 relative to the storage apparatus 191.

It should be noted that the range of motion of the moving vehicle 250 in the horizontal direction may be limited by means of physical barriers.

Figure 35A:
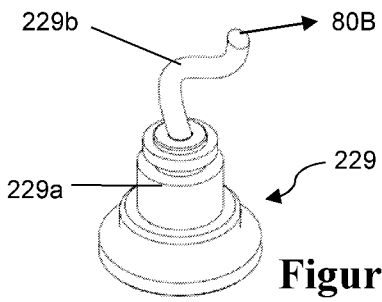
FIG. 35A shows an aerial view of a vacuum chuck.
Figure 35B:
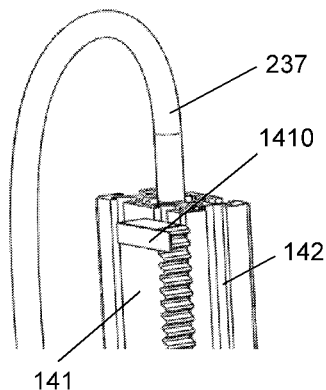
FIG. 35B shows an aerial view of parts of a vertical transfer mechanism.
Figure 35C:
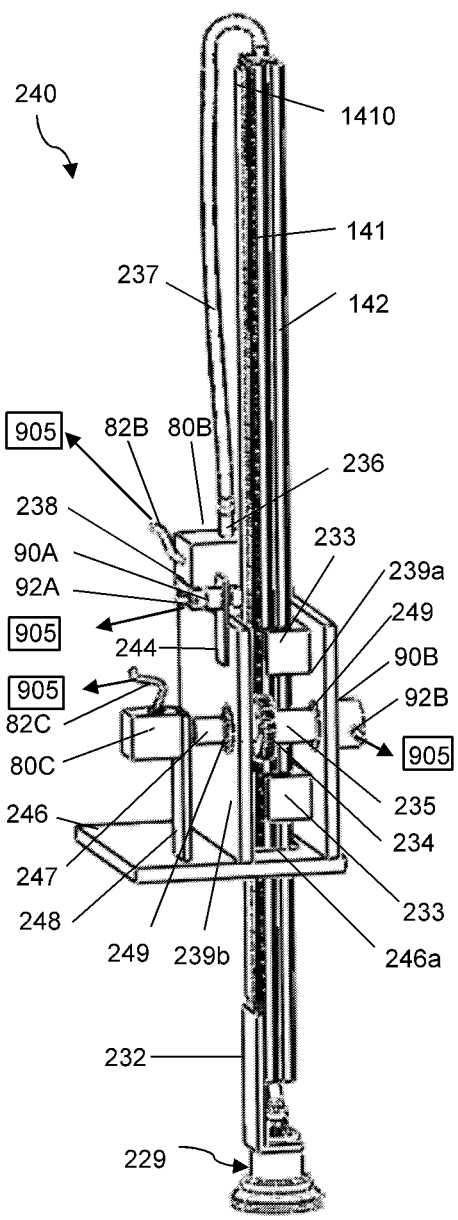
FIG. 35C shows an aerial view of the vertical transfer mechanism comprising the vacuum chuck.

Referring to FIGS. 35A-35C, a vertical transfer mechanism 240 comprises: a support component 246 comprising a flat board with a hole 246a in the middle; three vertical boards 239a, 239b and 248 and a horizontal board 238 which are all rigidly connected to the support component 246; two sliding device 233 which are rigidly connected to the vertical board 239a and thus rigidly connected to the support component 246; a rack 141 configured to be positioned vertically; an aluminum profiles 142 configured to be engaged with the sliding devices 233 as to be constrained to move vertically relative to the sliding devices 233 and thus relative to the support component 246; a gear 234 with a horizontal axis and a shaft 235 which is fixedly connected to and concentric with the gear 234. Each of the vertical boards 239a and 239b comprises a bearing housing with a same horizontal axis. A bearing 249 is configured to connect the shaft 235 and the bearing housing of the vertical board 239a, and another bearing 249 is configured to connect the shaft 235 and the bearing housing of the vertical board 265, so that the shaft 235 and the gear 234 are constrained to rotate relative to the vertical boards 239a, 239b and the support component 246 around the axis of the gear 234. The aluminum profiles 142 and the rack 141 are configured to be positioned through the hole 246a of the support component 246, and the rack 141 is configured to be fixedly connected to the aluminum profiles 142. The gear 234 is engaged with the rack 141. When the gear 238 is rotated, the rack 141 and the aluminum profiles 142 are moved vertically relative to the sliding devices 233, or equivalently, relative to the support component 246.

The vertical transfer mechanism 240 further comprises: a vacuum chuck 229 which is mounted on a connector 232, wherein the connector 232 is rigidly connected to the aluminum profiles 142; and a vacuum generator 80B which is mounted on the board 238. The vacuum chuck 229 comprises a base component 229a and a tube 229b (see FIG. 35A). The vacuum generator 80B comprises a tube 236. A tube 237 connects the tube 229b of the vacuum chuck to the tube 236 of the vacuum generator 80B. A part of the tube 237 is positioned in a hole of the aluminum profiles 142 (see FIGS. 35B-35C). The vacuum check 229 may grip a cap 108 of a capped container 109 when a lower surface of the vacuum chuck 229 attracts a top surface of the cap 108 by sucking out the air in between the two surfaces (see FIG. 35D). The axis of the vacuum chuck 229 may be positioned to be concentric (or nearly concentric) with the axis of the capped container 109 during the sucking process. The vacuum generator 80B is connected to the computer 905 via wires 82B (see FIG. 35C). The computer 905 is configured to control the timing for the vacuum generator 80B to create a vacuum in the tube 237.

The vertical transfer mechanism 240 further comprises: a motor 80C comprising a shaft and a base component, wherein the base component is fixedly connected to the vertical board 248, and the shaft of the motor 80C is connected to the shaft 235 via a coupling 247. When the motor 80C rotates, the shaft 235 and the gear 234 are rotated relative to the support component 246. Since the gear 234 is engaged with the rack 141, the rack 141 can thus be moved vertically relative to the support component 246.

The vertical transfer mechanism 240 further comprises an encoder 90B comprising a base component and a shaft, wherein the base component is rigidly connected to the vertical board 239a, and the shaft of the encoder 90B is connected to the shaft 235 via a coupling. The encoder 90B is used to detect the degree of rotation of the gear 234. A proximity switch 90A with a horizontal axis is connected to the components 239b and 246. The proximity switch 90A is configured to sense a certain target 1410 of the rack 141 when the target is moved vertically to a certain range, wherein the target 1410 is a part made of a metal.

The motor 80C is connected to the computer 905 via wires 82C (see FIG. 35C). The computer 905 is configured to dynamically control the timing and/or speed of the motor 80C. The encoder 90B is also connected to the computer 905 via wires 92B, so that the computer 905 may receive signals from the encoder 90B as to track the degree of rotation of the gear 234. The degree of rotation of the gear 234 can be converted into the sliding distance of the rack 141 relative to the support component 246. The proximity switch 90A is connected to the computer 905 via wires 92A, so that the computer 905 may receive signals from the proximity switch 90A. When the rack 141 is vertically moved to a position where the target 1410 is in or out of the sensing range of the proximity switch 90A, the signals are sent to the computer 905 so that the computer 905 can know the position information of the aluminum profiles 142 at that precise moment. Using the information sent by the proximity switch 90A and the encoder 90B, the computer 905 may accurately control the motion of the rack 141.

It should be noted that the aluminum profiles 142 may be substituted by a hollow rod, a tube in square shape or other shape, etc., of a material such as, metal, plastic, etc.

Figure 35D:
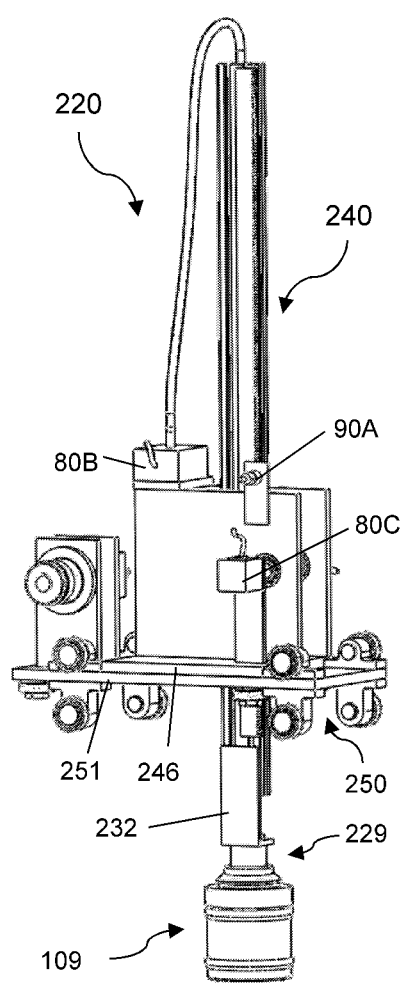
FIG. 35D shows an aerial view of a transfer apparatus comprising the vertical transfer mechanism and the moving vehicle wherein the vacuum chuck of the vertical transfer mechanism grips a capped container.

Referring to FIG. 35D, a transfer apparatus 220 comprises a vertical transfer mechanism 240 and a moving vehicle 250. The support component 246 of the vertical transfer mechanism 240 is configured to be rigidly connected to the support component 251 of the moving vehicle 250. The transfer apparatus 220 can move a capped container 109 in the vertical direction and then in the horizontal direction. When the moving vehicle 250 is properly positioned relatively to the storage box 192 or transport box 195 of a transport cart, the vacuum chuck 229 of the vertical transfer mechanism 240 can be moved to a position inside a square compartment of said box. At that position, the vacuum chuck 229 may suck and grip a capped container 109 therein. Then, the vertical transfer mechanism 240 may lift the capped container 109 together with the vacuum chuck and aluminum profiles 142 upward. Then, the moving vehicle 250 can move with the gripped capped container 109 to another position where the vacuum chuck 229 together with the aluminum profiles 142 can be moved downward and then release the capped container.

Figure 36:
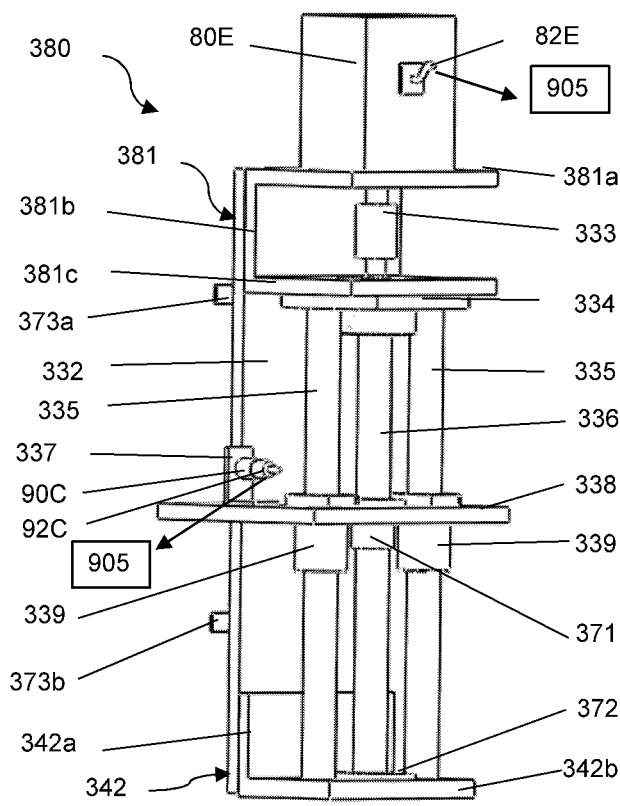
FIG. 36 shows an aerial view of a vertical motion mechanism.

Referring to FIG. 36, a vertical motion mechanism 380 comprises: a support component 338 comprising a flat board with a hole; an L-shaped rigid component 342 comprising a horizontal board 342b and a vertical board 342a, wherein the horizontal board 342b comprises a bearing housing 372; a U-shaped rigid component 381 comprising two horizontal boards 355a and 355c and a vertical board 355b; a support component 332 configured to rigidly connect the vertical board 342a of the L-shaped rigid component 342 and the vertical board 355b of the U-shaped rigid component 381; and a pair of shafts 335. Each shaft 335 is configured to be fixedly connected to the horizontal boards 381c and 342b, wherein the axes of the pair of shafts 335 are configured to be vertical.

The vertical motion mechanism 380 further comprises: a bearing housing 334 which is rigidly connected to the horizontal board 355c of the U-shaped rigid component 381; a pair of linear motion bearings 339; a screw shaft 336 comprising a vertical axis; and a screw nut 371 with a vertical axis. Bearings and accessories (hidden in figure) are configured to connect the bearing housings 372 and 334 with the screw shaft 336, so that the screw shaft 336 is constrained to rotate relative to the U-shaped rigid component 381 and the support component 332 around the axis of the screw shaft 336. The screw shaft 336 is configured to be engaged with the screw nut 371. Each linear motion bearing 339 is configured to be engaged with a corresponding shaft 335 so that the shaft 335 is constrained to move vertically relative to the linear motion bearing 339. The support component 338 is configured to be fixedly connected to some outer shells of the linear motion bearings 399 and the screw nut 371, so that the rotation of the screw shaft 336 induce a vertical movement of the support component 332 relative to the support component 338.

The vertical motion mechanism 380 further comprises a motor 80E comprising a base component and a shaft, wherein the base component is configured to be fixedly connected to the rigid component 381, and the shaft of the motor 80E is connected to the screw shaft 336 by a coupling 333. The motor 80E can drive a rotation of the screw shaft 336 relative to the support component 332 around the axis of the screw shaft 336, and thus a vertical motion in the support component 332 relative to the support component 338.

The vertical motion mechanism 380 further comprises: a proximity switch 90C which is fixedly connected to the support component 338 via a connector 337; and two targets 373a and 373b which are fixedly connected to the support component 332, wherein the target 373a is positioned higher than the target 373b. The proximity switch 90C may sense the targets 373a and 373b when the targets 373a and 373b are moved with the support component 332. The motor 80E is connected to the computer 905 via wire 82E. The computer 905 is configured to dynamically control the timing and/or speed of the motor 80E. The proximity switch 90C is connected to the computer 905 via wires 92C, so that the computer 905 may receive signals from the proximity switch 90C. When the support component 332 is moved upward to a first position where the proximity switch 90C senses the target 373a, the signals of the proximity switch 90C are sent to the computer 905. The computer 905 can figure out the position of the support component 332. Similarly, when the support component 332 is moved downward to a second position where the proximity switch 90C senses the target 373b, the signals of the proximity switch 90C are sent to the computer 905. The computer 905 can figure out the position of the position of the support component 332. With the position information, the computer may control the motor as to move the support component to accurately arrive at a specific position.

The support component 338 is referred to as the support component of the vertical motion mechanism 380.

Figure 37:
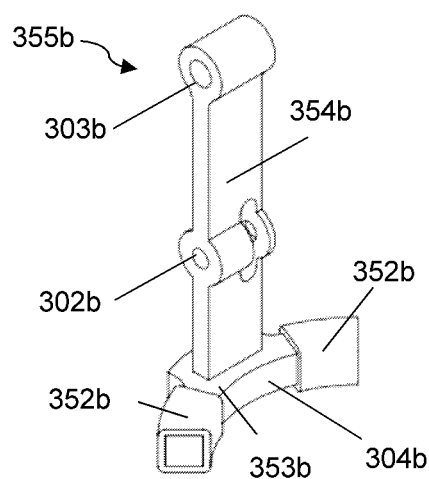
FIG. 37 shows an aerial view of a gripping device.

Referring to FIG. 37, a gripping device 355b is a rigid component comprising: round holes 303b and 302b; an arm 354b; and a gripper 353b comprising a cylindrical surface 304b; rubbers (or silicon gels) 352b which are attached to the gripper 353b.

Figure 38:
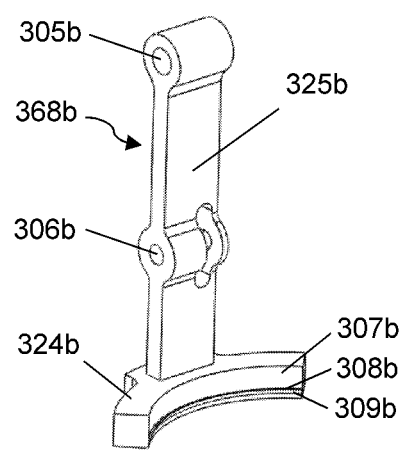
FIG. 38 shows an aerial view of a gripping device.

Referring to FIG. 38, a gripping device 368b is a rigid component comprising: round holes 305b and 306b; an arm 325b; and a gripper 324b comprising a cylindrical surface 307b, a cone surface 309b, and a flat surface 308b.

Figure 39:
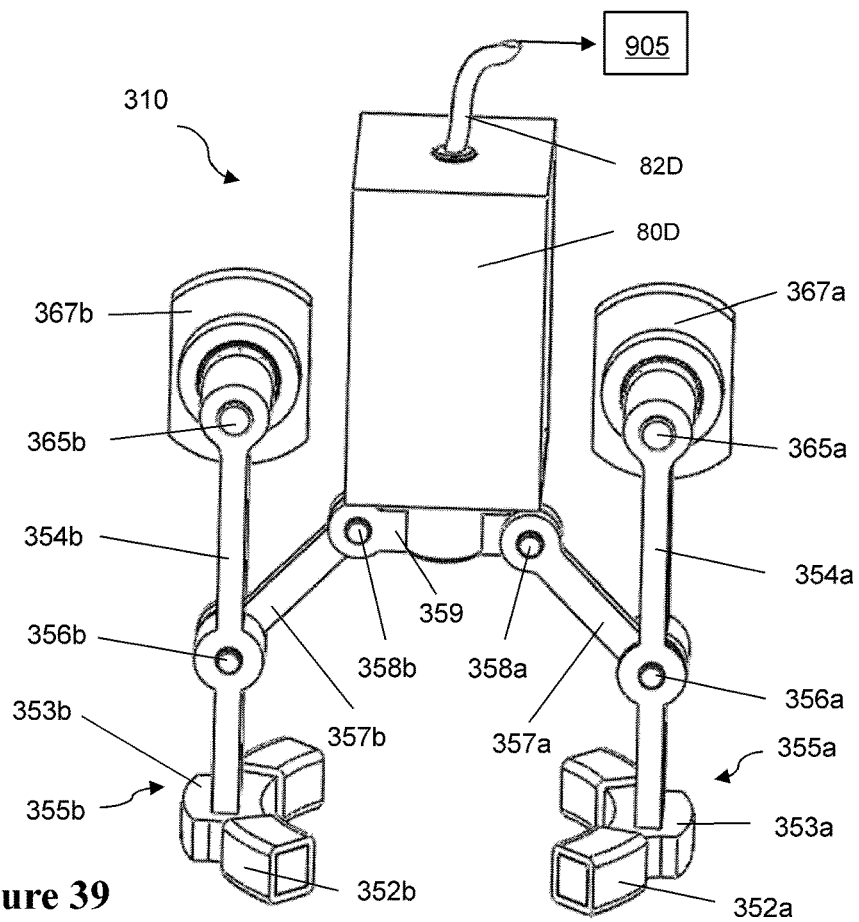
FIG. 39 shows an aerial view of a container gripping mechanism comprising a pair of gripping devices.

Referring to FIG. 39, a container gripping mechanism 310 comprise: bearing housings 367a and 367b; gripping devices 355a and 355b wherein the gripping device 355a is a mirror image of 355b; a rigid component 359; shafts 358a and 358b; links 357a and 357b; shafts 356a and 356b; and shafts 365a and 365b. The axes of the shafts 356a, 356b, 358a, 358b, 365a and 365b are configured to be horizontal and parallel to each other. Wherein the shaft 358a is configured to connect the link 357a to the rigid component 359 so that the link 357a is rotatable relative to the rigid component 359 around the axis of the shaft. The shaft 358b is configured to connect the link 357b to the rigid component 359 so that the link 357b is rotatable relative to the rigid component 359 around the axis of the shaft. The shaft 356a is configured to connect the link 357a to the arm 354a of the gripping device 355a so that the gripping device 355a is rotatable relative to the link 357a. The shaft 356b is configured to connect the link 357b to the arm 354b of the gripping device 355b so that the gripping device 355b is rotatable relative to the link 357b. The shaft 358a and the shaft 358b are configured to be mirror images olf each other on a vertical plane; and the shafts 356a and 356b are mirror images of each other on said vertical plane. The gripping device 355a (or respectively 355b) is connected to the shaft 365a (or respectively 365b), so the gripping device 355a (or respectively 355b) is constrained to rotate relative to the shaft 365a (or respectively 365b) around the axis of the shaft 365a (or respectively 365b). The shaft 365a (or respectively 365b) is connected to the bearing housing 367a (or respectively 367b) via bearings and accessories, so the shaft 365a (or respectively 365b) is configured to be constrained to rotate relative to the shaft 365a (or respectively 365b) around the axis of the shaft 365a. Thus, the linear movement in a vertical direction of the rigid component 359 may induce a rotation in the gripping device 355a around the axis of the shaft 365a. and the linear movement in a vertical direction of the rigid component 359 may induce a rotation in the gripping device 355b around the axis of the shaft 365b.

The container gripping mechanism 310 further comprises a push-pull electromagnet 80D, the push-pull electromagnet 80D comprises a shaft and a base component. The push-pull electromagnet 80D can drive the shaft of the push-pull electromagnet 80D to slide along the axis of the shaft relative to the base component of the push-pull electromagnet 80D. The bearing housings 367a and 367b and the base component of the push-pull electromagnet 80D are configured to be fixedly connected to a support component (the support component is not shown in FIG. 39, but later in FIG. 40), and the shaft of the push-pull electromagnet 80D is rigidly connected to the rigid component 359. When the push-pull electromagnet 80D produces a vertical movement of the rigid component 359 in the upward (or, downward) direction relative to a support component, the gripping devices 355a and 355b are simultaneously rotated toward (or respectively, away from) a vertical axis as to grip (or respectively, release) a container 107 whose axis coincides with said vertical axis; wherein said vertical axis is referred to as the central axis of the container gripping mechanism 310. When the electromagnet 80D forces the rigid component 359 to move to an end-position, the electromagnet 80D is automatically braked, e.g., by a permanent magnet of relatively smaller force. The electromagnet 80D is connected to the computer 905 via wires 82D. The computer 905 is configured to dynamically control the operation of the electromagnet 80D.

Figure 40:
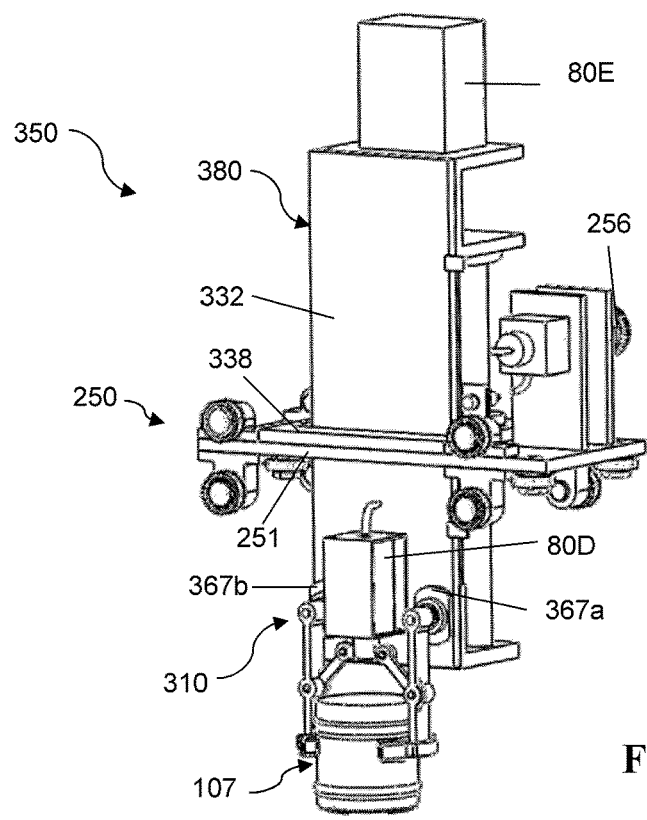
FIG. 40 shows an aerial view of an aerial view of a container transfer apparatus comprising a vertical motion mechanism, a moving vehicle and a container gripping mechanism which grips a container.

Referring to FIG. 40, a container loading apparatus 350 comprises the vertical motion mechanism 380, the moving vehicle 250, and the container gripping mechanism 310. The support component 338 of the vertical motion mechanism 380 is rigidly connected to the support component 251 of the moving vehicle 250; and the bearing housings 367a and 367b and the base component of the push-pull electromagnet 80D of the container gripping mechanism 310 are configured to be rigidly connected to the support component 332 of the vertical motion mechanism 380. The container loading apparatus 350 may be controlled by the computer 905 to grip a container 107, and then move the container vertically, and then horizontally, and then release the container 107 at a different position.

Figure 41:
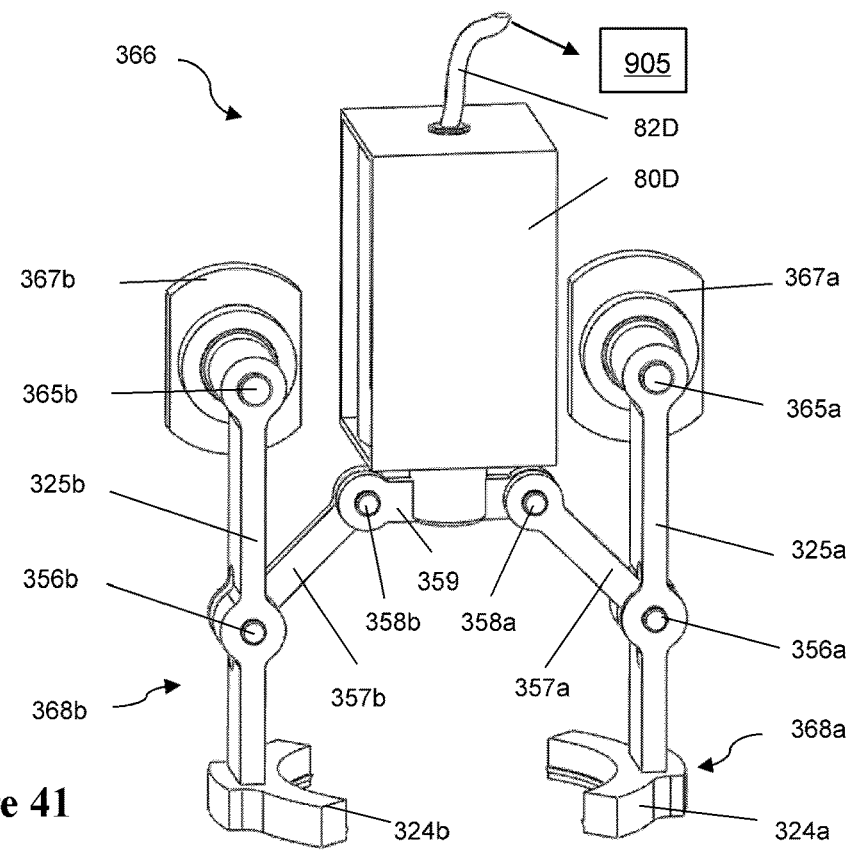
FIG. 41 shows an aerial view of a cap gripping mechanism comprising a pair of gripping devices.

Referring to FIG. 41, a cap gripping mechanism 366 is constructed the same way as the container gripping mechanism 310, except that the pair of gripping devices 355a and 355b are substituted by a pair of gripping devices 368a and 368b. In particular, the cap gripping mechanism 366 comprises identical components as the container gripping mechanism 310 except the difference in gripping devices. Therefore, the cap gripping mechanism 366 comprises a pair of gripping devices 368a and 368b, a push-pull electromagnet 80D, wherein the vertical movement of the shaft of the push-pull electromagnet 80D is configured to rotate the gripping devices 368a and 368b simultaneously toward or away from a vertical axis, referred to as the central axis of the cap gripping mechanism 366, as to grip or release a cap 108. The push-pull electromagnet 80D is connected to the computer 905 via wires 82D, and the computer 905 is configured to dynamically control the movement of the push-pull electromagnet 80D, as in the container gripping mechanism 310.

Figure 42:
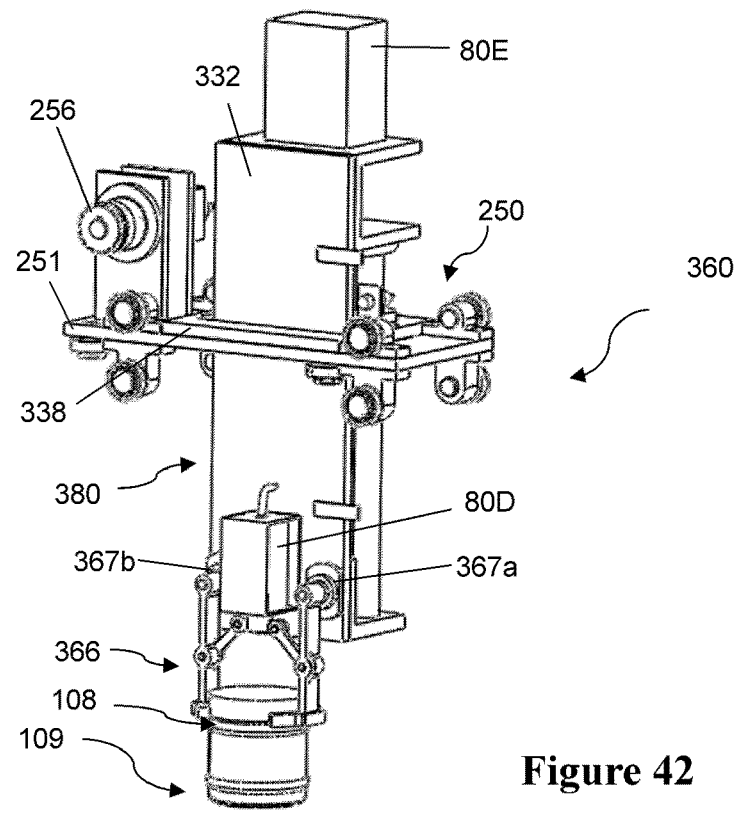
FIG. 42 shows an aerial view of a cap opening sub-apparatus comprising a vertical motion mechanism, a moving vehicle and a cap gripping mechanism which grips a cap of a container.

Referring to FIG. 42, a cap opening sub-apparatus 360 comprising a vertical motion mechanism 380, a moving vehicle 250, and a cap gripping mechanism 366. The support component 338 of the vertical motion mechanism 380 is configured to be rigidly connected to the support component 251 of the moving vehicle 250; and the bearing housings 367a and 367b and the base component of the push-pull electromagnet 80D of the cap gripping mechanism 366 are configured to be rigidly connected to the support component 332 of the vertical motion mechanism 380. When the push-pull electromagnet 80D of the cap gripping mechanism 366 pulls the rigid component 359 upward, a simultaneous rotations of the gripping devices 368a and 368b of the cap gripping mechanism 366 toward the central axis of the cap gripping mechanism 366 as to grip a cap 108 of a capped container 109. When the motor 80E produces a rotation of the screw shaft 336 in a first rotational direction, the support component 332 is moved vertically upward relative to the support component 251 of the moving vehicle 250. When the motor 80A of the moving vehicle 250 drives the rotation of the gear 256, the support component 251 is moved horizontally along the tracks 193e relative to the storage apparatus 191. Thus, the cap opening sub-apparatus 360 may be controlled by the computer 905 to grip a cap 108, and remove the cap 108 from the container 107 when the cap is moved upward with the support component 332 and when the container 107 is fixed, and then horizontally, and then the cap opening sub-apparatus 360 may release the cap 108 at a different position when the electromagnet 80D pushes the rigid component 359 vertically downward.

The computer 905 be configured to dynamically control the rotations and/or speed of the motors in the cap opening sub-apparatus 360 according to the signals of the proximity sensors 90C and the encoders 90D in the cap opening sub-apparatus 360.

Figure 43A:
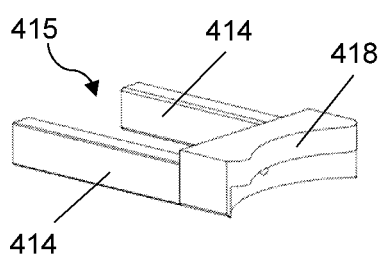
FIGS. 43A-43B show aerial views of parts of a gripping mechanism.
Figure 43B:
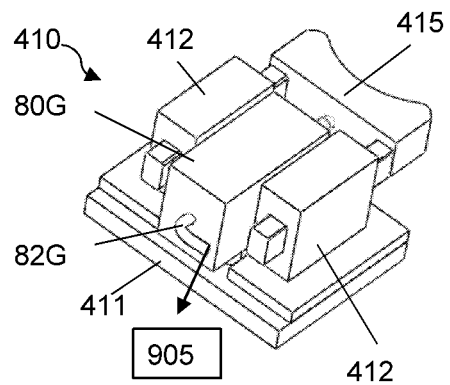

Referring to FIGS. 43A-43B, a gripping sub-mechanism 410 comprises a gripping device 415 which is a rigid component comprising: a gripper 418 whose surface comprises a partial cylindrical surface 418; and sliding bars 414 (see FIG. 43A). The gripping sub-mechanism 410 further comprises sliding tracks 412 which are rigidly connected to a support component 411. Each sliding bar 414 of the gripping device 415 is connected with a sliding track 412 so that the gripping device 415 is constrained to slide relative to the support component 411 along a horizontal direction. The gripping sub-mechanism 410 further comprises a push-pull electromagnet 80G comprising a shaft and a base component, wherein the base component is fixedly connected to the support component 411, and the shaft is fixedly connected to the gripping device 415. The push-pull electromagnet 80G can force the gripping device 415 to slide along a horizontal direction, which equals to the direction of the axis of the shaft of the push-pull electromagnet 80G.

Figure 43C:
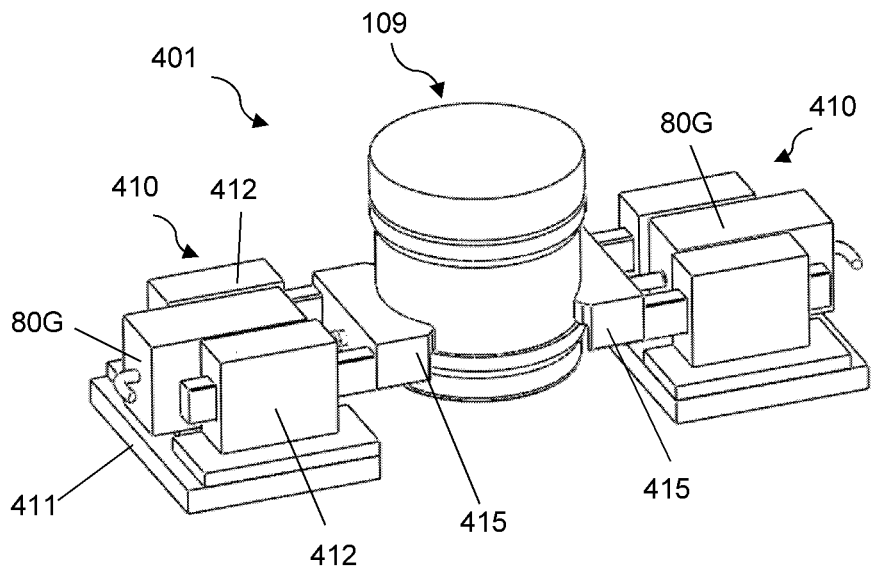
FIG. 43C shows an aerial view of a container gripping mechanism which grips a container.

Referring to FIG. 43C, a container gripping mechanism 401 comprises two gripping sub-mechanisms 410 which are positioned as mirror images of each other on a horizontal plane. The gripping devices 415 of the gripping sub-mechanisms 410 are simultaneously moved toward (or away) a vertical axis as to grip (or respectively, release) a container 107 whose axis coincides with said vertical axis; wherein said vertical axis is referred to as the central axis of the container gripping mechanism 401. The electromagnets 80G are connected to the computer 905 via wires 82G (also see FIG. 43B). The computer 905 is configured to control the operations of the electromagnets 80G so that the electromagnets 80G may be moved simultaneously.

Figure 44:
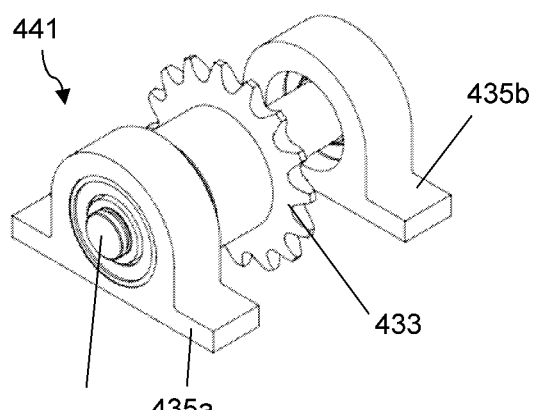
FIG. 44 shows an aerial views of a chain wheel mechanism.

Referring to FIG. 44, a chain wheel mechanism 441 comprises two bearing housings 435a and 435b which are configured to be relatively fixed, a shaft 432, and a chain wheel 433. A bearing and accessories are configured to connect the shaft 432 and the bearing housing 435a, and another bearing and accessories are configured to connect the shaft 432 and the bearing housing 435b, so that the shaft 432 is constrained to rotate relative to the bearing housings 435a and 435b, around the axis of the shaft 432. The chain wheel 433 is configured to be fixedly connected to and concentric with the shaft 432, so the chain wheel 433 is constrained to rotate relative to the bearing housings 435a and 435b.

Figure 45A:
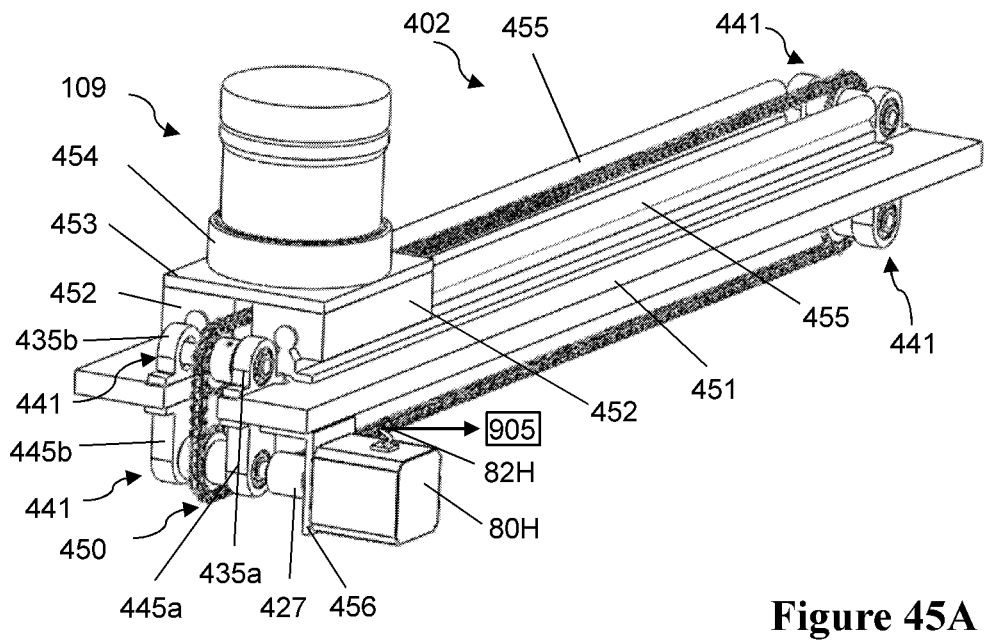
FIG. 45A shows an aerial view of a horizontal motion mechanism.

Referring to FIG. 45A, a horizontal transport mechanism 402 comprises: four chain wheel mechanisms 441; a roller chain 450 comprising two ends; linear tracks 455 and linear sliders 452 which are constrained to move on the linear tracks 455; a horizontal board 453 which is rigidly connected to the linear slider; and a container holder 454 which is fixedly connected to the board 453. The container holder 454 is a cup with cylinder shape comprising a vertical axis, wherein said cup may position and hold a container 107 and restrict the movement of the container 107 when the container holder 454 is moved. The bearing housings 435a and 435b of the chain wheel mechanisms 441 are all rigidly connected to a support component 451. The horizontal board 453 is configured to be fixedly attached to the ends of the roller chain 450. The roller chain 450 is configured to be engaged with the chain wheels 433 of the chain wheel mechanisms 441.

The horizontal transport mechanism 402 further comprises a motor 80H comprising a shaft and a base component, wherein the base component is fixedly connected to the support component 451 by a connector 456, and the shaft of the motor is fixedly connected to the shaft 432 of a first chain wheel mechanism (of the 4 chain wheel mechanisms) 441 via a coupling 427. Thus, the motor 80H may drive rotations of the shaft 432 and the chain wheel 433 of the first chain wheel mechanism 441 relative to the support component 451, and thus a motion in the roller chains 450, and hence a linear motions of the sliders 452 and the container holder 454 relative to the support component 451 along a horizontal direction.

The motor 80H is connected to the computer 905 via wires 82H. The computer 905 is configured to dynamically control the timing and/or speed of the motor 80H. The container holder 454 may be moved to and stopped at specific positions under the control of the computer 905.

Figure 45B:
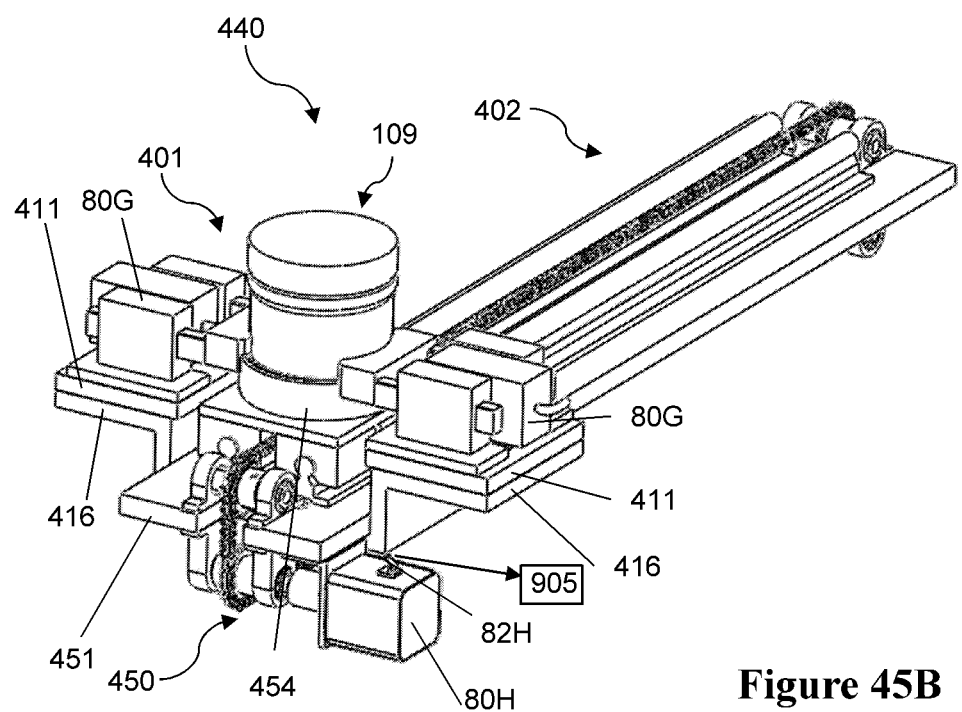
FIG. 45B shows an aerial view of a sub-apparatus comprising the horizontal motion mechanism and the gripping mechanism.
Figure 46A:
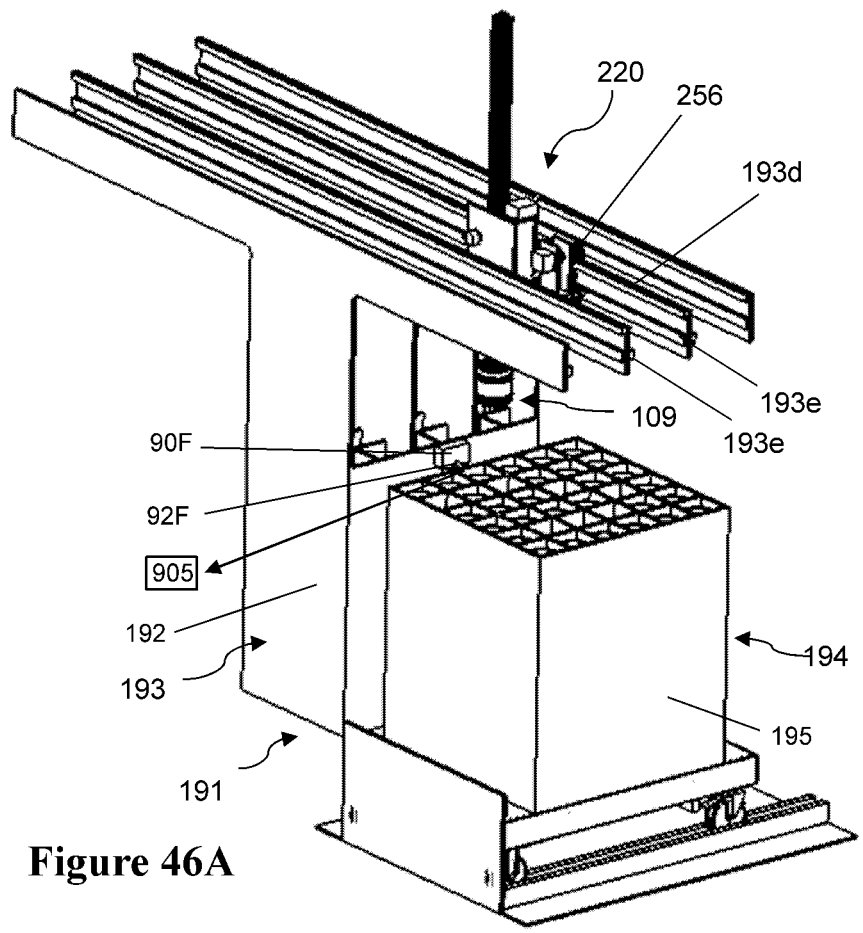
FIGS. 46A-48 show aerial views of parts of a storage system.
Figure 46B:
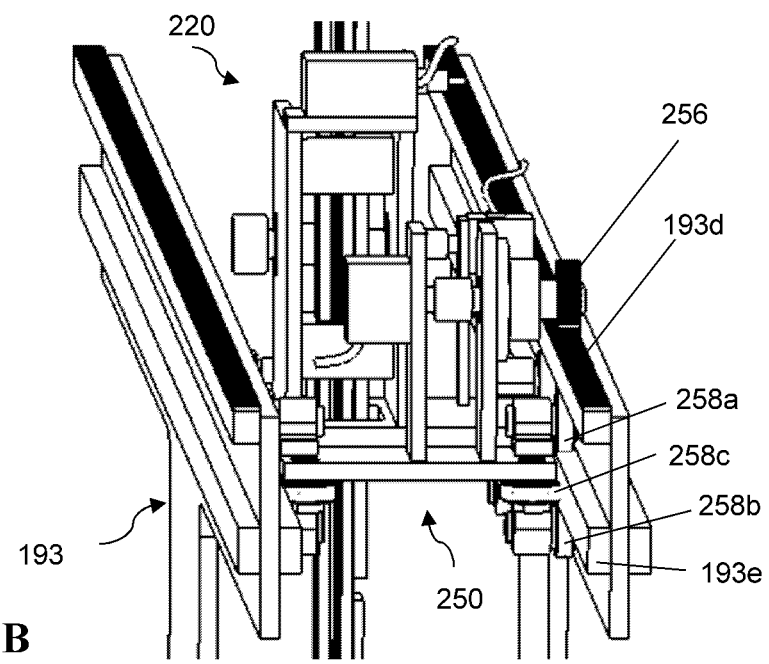
Figure 47C:
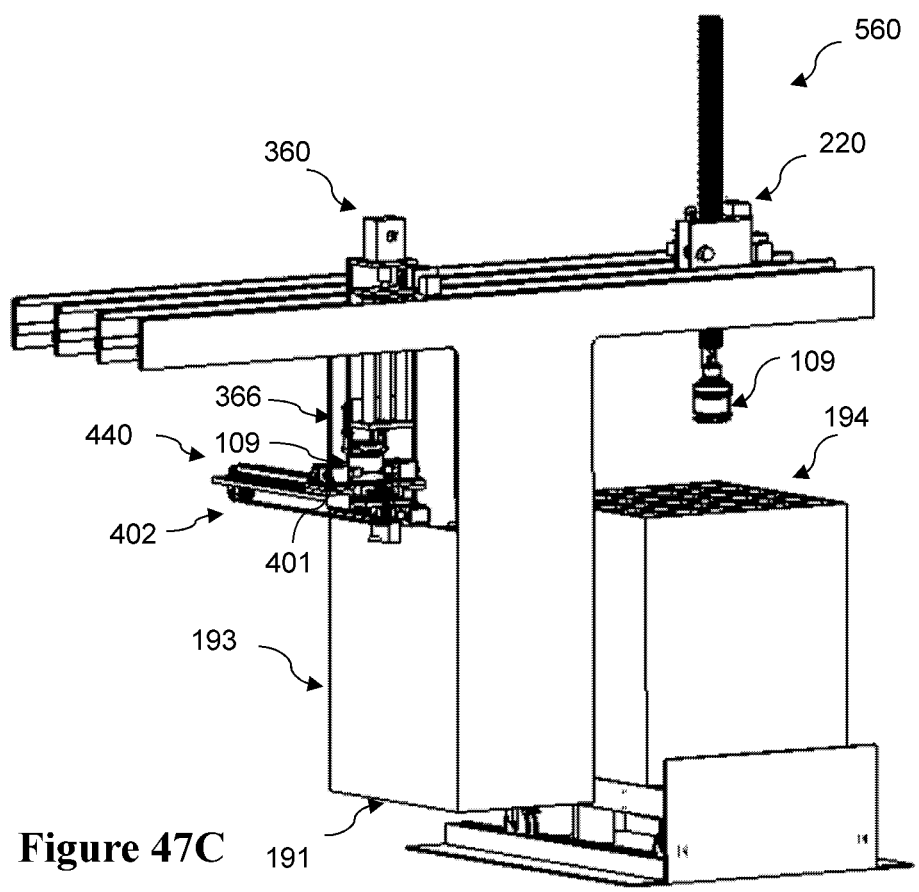

Referring to FIG. 45B, a sub-apparatus 440 comprises a horizontal transport mechanism 402 and the container gripping mechanism 401, wherein the support components 411 of the container gripping mechanism 401 is rigidly connected to the support component 451 of the horizontal transport mechanism 402 by connectors 416. A capped container 109 can be placed on the container holder 454 and can be moved to a certain position so that the container gripping mechanism 401 can grip the container 107 of the capped container 109.

Referring to FIGS. 46A-48, a storage system 560 comprises: a storage apparatus 191; transfer apparatuses 220; container loading apparatus 350; a cap opening apparatus 370 comprising a sub-apparatus 440 and a cap opening sub-apparatus 360. A cap 108 may slide into the box 512 along the sliding path 511. The support component 451 of the sub-apparatus 440, the storage apparatus 191, and the cap collection apparatus 510 may be configured to be rigidly or fixedly connected to the ground, by known techniques, so that their positions are fixed with respect to each other.

The storage system 560 further comprises two scanners 90E and 90F, both of which are fixedly mounted on the storage apparatus 191 (see FIGS. 46A-47A). The scanners 90E and 90F are connected to the computer 905 by wires 92E and 92F, so that the computer 905 may receive information from the scanners 90E and 90F. When a capped container 109 passes through a position above the scanner 90F or 90E, the scanner 90F or 90E can capture a digital image of the QR code or barcode of the container 107, and then send the information to the computer 905 that decodes the QR code or barcode. The QR code or barcode information of the capped container 109 are recorded by the computer 905. The QR code or barcode on each container is configured to be unique to the container. The identities and the codes of the containers 107 can be recorded by the computer 905.

It should be noted that the scanner 90E or 90F may comprise a microcomputer configured to decode the QR code or barcode on a container 109

A transport cart 194 may be positioned at a certain location in the storage apparatus 191, being restrained by the limiting devices 198 and 199. Under the control of the computer 905, the transfer apparatus 220 can transfer a capped container 109 out of the storage box 192 of the storage apparatus 191, as follows. At step 1, the vacuum chuck 229 of the transfer apparatus 220 may be moved horizontally and then vertically down to a position as to grip a capped container 109 in a square compartment of the storage box. At step 2, the vacuum chuck 229, together with the gripped capped container 109, may be moved vertically up, so that the gripped capped container 109 is totally outside of the storage apparatus 191. At step 3, the vacuum chuck 229, together with the gripped capped container 109, may be moved horizontally, and then vertically down, to a position so that the QR code or barcode on the bottom of the gripped capped container 109 may be read by the scanner 90E (see FIG. 47A). At step 4, the vacuum chuck 229 of the transfer apparatus 220 may be moved horizontally, and then vertically down to a position as to release the capped container 109 to the container holder 454 of the horizontal transport mechanism 402, wherein the container holder 454 needed to move to the receiving position in advance. At step 5, the vacuum chuck 229 of the transfer apparatus 220 is moved vertically up and can be used for the next task. Similarly, the transfer apparatus 220 may transfer a container from one into the other among the compartments of the storage box and transport box.

As explained before, each time a capped container 109 is put in or taken away from the storage apparatus 191, the QR code or barcode of the capped container 109 is decoded by the scanner 90E or 90F. The signals of the scanners 90E and 90F are sent to the computer 905, so that the data of the capped containers 109 in the storage apparatus 191 are stored and dealt by the computer 905.

Two containers of food ingredients are said to have the same 'container content type,' if they contain the same types of food ingredients, and the weight of the food ingredient of each type is the same for both containers. Although this is not strictly necessary, a single compartment in the storage apparatus 191 may be configured to store containers of the same container content type.

It should also be noted that the transfer apparatus 220 may move a capped container 109 from one compartment to another.

Figure 48:
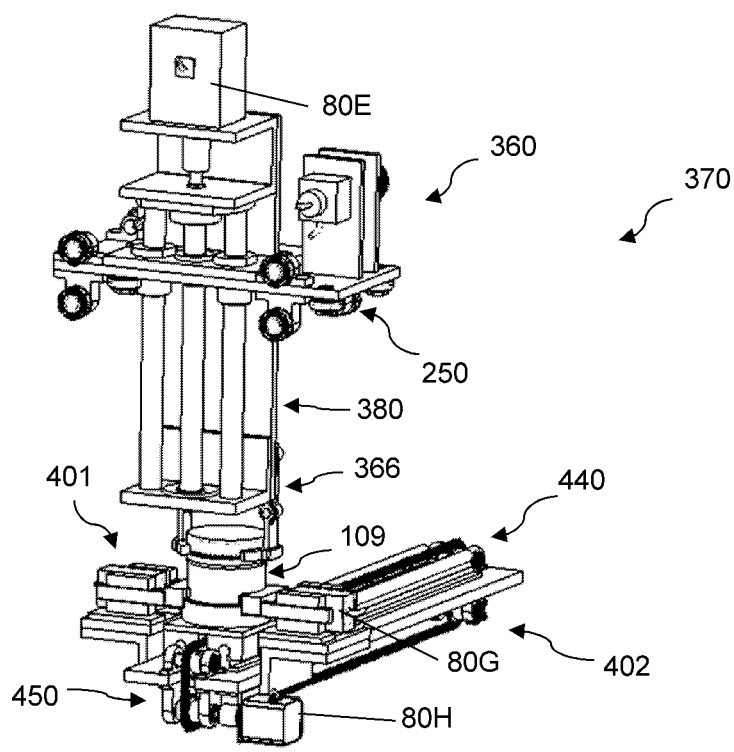

When a capped container 109 is placed on the container holder 454 and moved to the position so that the container 107 of the capped container 109 is gripped by the container gripping mechanism 401 (of the sub-apparatus 440), the cap opening sub-apparatus 360 may be used to grip the cap 108 of the capped container 109 and then to move the cap 108 vertically upward (see FIG. 48). The cap 108 is thus removed from the container 107. The cap 108 may be then moved horizontally by the moving vehicle 250 of the cap opening sub-apparatus 360 and be released and unloaded to the sliding path of the cap collection apparatus 510. The above procedures involve the following detailed steps (see FIGS. 47C and 48). At step 1, the transport mechanism 402 (of the sub-apparatus 440) may move the container holder 454 with said capped container 109 to a position where the axis of the capped container 109 coincides with the central axis of the container gripping mechanism 401 of the sub-apparatus 440. At step 2, the container gripping mechanism 401 of the sub-apparatus 440 grips the container 107 of the capped container 109. At step 3, the cap gripping mechanism 366 of the cap opening sub-apparatus 360 is moved horizontally and then vertically downward, and then grip the cap 108 of said capped container 109. At step 4, the cap gripping mechanism 366 together with the gripped cap 108, are moved vertically upward, thus remove the cap 108 from the container 107. At step 5, the cap gripping mechanism 366 of the cap opening sub-apparatus 360 may be moved horizontally, and then vertically down, to a position as to release the cap 108 into the sliding path of the cap collection apparatus 510. At step 6, the cap gripping mechanism 366 is moved vertically up. Meanwhile, the container gripping mechanism 401 of the sub-apparatus 440 may release the container 107, and then the container 107 and the container holder 454 may be moved to another position as to be gripped and moved by a loading apparatus 350 as follows. The container gripping mechanism 310 of the container loading apparatus 350 may be moved horizontally and then vertically down, and then may grip the container 107 placed on the container holder 454. Then the container gripping mechanism 310 together with the gripped container 107 are moved vertically upward, and then horizontally by the moving vehicle (of the apparatus 350). Then, the container gripping mechanism 310 may be moved vertically down to a position as to release the container 107 to be placed on a container holder of a vehicle in the transport system (to be described later).

Figure 49A:
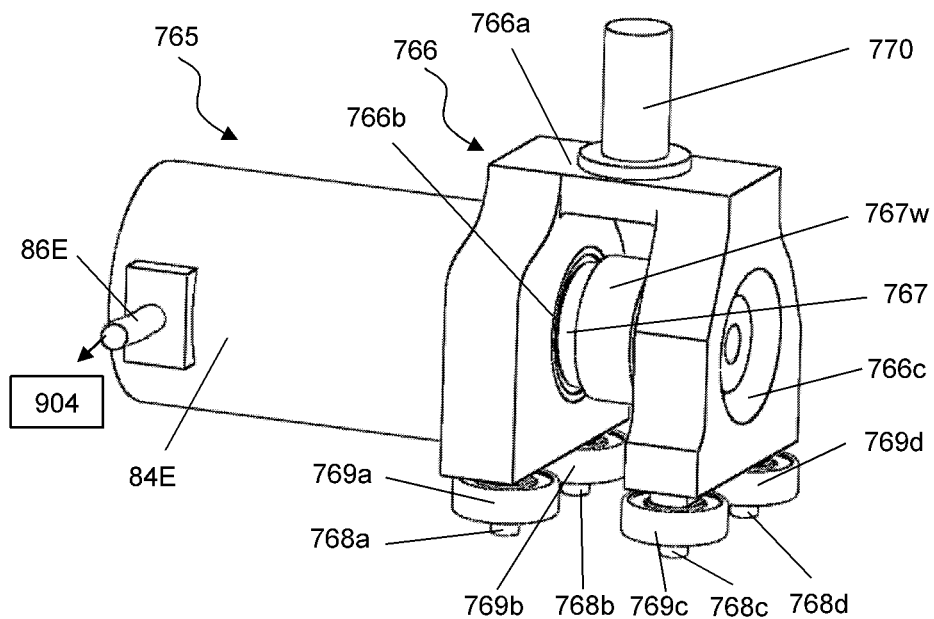
FIG. 49A shows an aerial view of a driving wheel mechanism.

Referring to FIG. 49A, a driving wheel mechanism 765 comprises: a support component 766; a shaft 767 comprising a horizontal axis, and a wheel 767w which is rigidly connected to and concentric with the shaft 767; shafts 770, 768a, 768b, 768c and 768d, each comprising a vertical axis; and wheels 769a, 769b, 769c and 769d. The support component 766 comprises a pair of bearing housings 766b and 766c which have a same horizontal axis. The shaft 770 is rigidly connected to a top part 766a of the support component 766. The shaft 767 is configured to be connected to the bearing housings 766b and 766c by bearings and accessories, so that the shaft 767 is constrained to rotate relative to the support component 766 around the axis of the shaft 767. The shafts 768a, 768b, 768c and 768d are configured to be rigidly connected to (some bottom parts of) the support component 766. The wheels 769a, 769b, 769c and 769d are respectively mounted on the shafts 768a, 768b, 768c and 768d, so that each wheel is constrained to rotate relative to the support component 766 around the axis of the respective shaft.

The driving wheel mechanism 765 further comprises a motor 84E comprising a shaft and a base component. The base component of the motor 84E is fixedly connected to the bearing housing 766b. The shaft of the motor 84E is fixedly connected to the shaft 767, so that the motor 84E can drive a rotation in the shaft 767 and hence in the wheel 767w relative to the support component 766 around the axis of the shaft 767. As shown in FIG. 49A, the motor 84E is connected to a computer 904 via wires 86E, the computer 904 is configured to send signals to the motor 84E as to control the timing and the degree of rotation of the motor 84E.

Figure 49B:
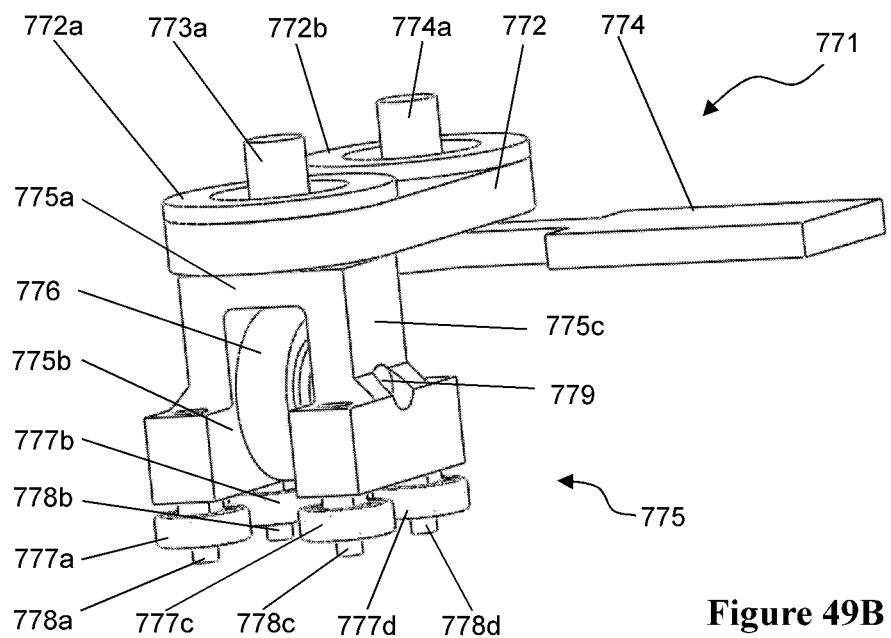
FIG. 49B shows an aerial view of a universal wheel mechanism.

Referring to FIG. 49B, a universal wheel mechanism 771 comprises: a support component 775; a connector 772 comprising two bearing housings 772a and 772b as parts; a connecting component 774 comprise a vertical shaft 774a; a shaft 779 comprising a horizontal axis; shafts 773a, 778a, 778b, 778c and 778d, each comprising a vertical axis; and wheels 776, 777a, 777b, 777c and 777d. The shaft 773a is rigidly connected to a top part 775a of the support component 775. The shaft 773a is configured to be connected to the bearing housing 772a by bearings and accessories, so that the support component 775 and the shaft 773a are constrained to rotate relative to the bearing housing 772a (or equivalently, relative to the connector 772) around the axis of the shaft 773a. The shaft 774a of the connecting component 774 is configured to be connected to the bearing housing 772b by bearings and accessories, so that the connecting component 774 is constrained to rotate relative to the bearing housing 772b (or equivalently, relative to the connector 772) around the axis of the shaft 774a. The shaft 779 is configured to be fixedly connected to the support component 775. The wheel 776 is mounted on the shaft 779, so that the wheel 776 is constrained to rotate relative to the shaft 779 (and hence relative to the support component 775) around the axis of the shaft 779. The shafts 778a, 778b, 778c and 778d are configured to be rigidly connected to (some bottom parts of) the support component 775. The wheels 777a, 777b, 777c and 777d are respectively mounted on the shafts 768a, 768b, 768c and 768d, so that each wheel is constrained to rotate relative to the support component 775 around the axis of the respective shaft.

Figure 49C:
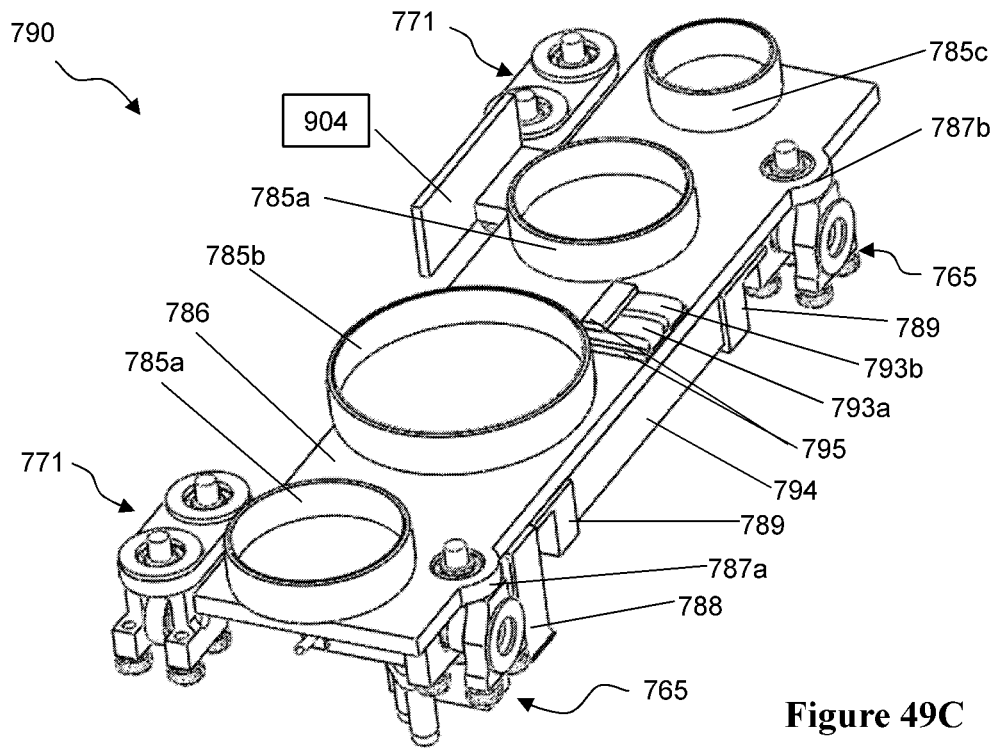
FIG. 49C shows an aerial view of a vehicle which may move on rail tracks.
Figure 49D:
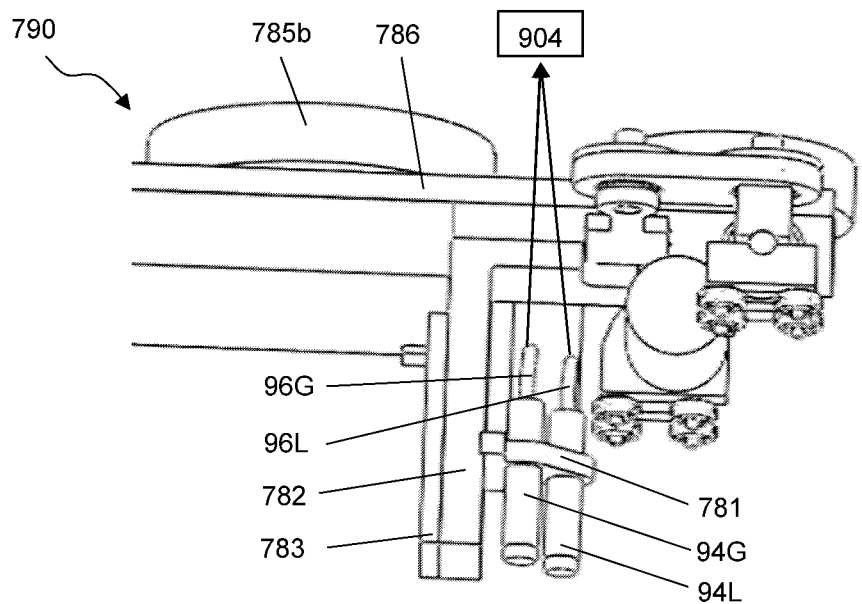
FIG. 49D shows an aerial view of parts of the vehicle.

Referring to FIGS. 49C-49D, a vehicle 790 comprises: a support component 786 comprising two bearing housings 787a and 787b as parts; a computer 904 which is fixedly connected to the support component 786 by connectors; a target 788 rigidly connected to the support component 786; two driving wheel mechanisms 765; two universal wheel mechanisms 771. The bearing housing 787a or 787b is connected to the shaft 770 of one of the driving wheel mechanisms 765 by bearings and accessories, so that the shaft 770 is constrained to rotate relative to the support component 786 around the axis of the shaft 770. The connecting components 774 of the universal wheel mechanisms 771 are rigidly connected to the support component 786.

The computer 904 comprises a plurality of input ports and a plurality of output ports. The input ports of the computer 904 may be connected (either via wires or via wireless communication devices) to sensors, which can be encoders, pressure sensors, proximity switches, micro switches, infrared sensors, temperature sensors, etc. The output ports of the computer 904 may be connected to electrical or electronic devices which can be several types of motors, stoves, refrigeration apparatus, etc. The signals of the sensors may be sent to the computer 904. The computer 904 may control the operations of the electrical or electronic devices by sending signals to the electrical or electronic device. The computer 904 is configured to communicate with the computer 905 via wireless communication devices.

The vehicle 790 further comprises: a plurality of round holding cups 785a, 785b and 785c wherein each holding cup 785a, 785b or 785c comprises a vertical axis; a rechargeable battery 794 configured to power electrical or electronic devices on the vehicles; a plurality of mounting devices 789 configured to fixedly connect the rechargeable battery 794 to the support component 786; an insulation component 795 made of plastic or other electric insulating material; and a pair of electrical inlets 793a and 793b connected to the rechargeable battery 794 by wires. The electrical inlets 793a and 793b and the insulation component 795 are all fixedly connected to the support component 786. The holding cups 785a, 785b and 785c are fixedly connected to the support component 786. Each holding cup, 785a, 785b or 785c, is configured to hold an ingredient container 107 of a specific diametrical size.

The holding cups 785a, 785b and 785c are also referred to as container holders. It should be noted that the holding cups 785a, 785b and 785c in the vehicle 790 may be substituted by other types of container holders.

The vehicle 790 further comprises: an L-shaped support component 782 comprising a vertical board and horizontal board; a magnet 783 configured to fixedly mounted on the vertical board of the L-shaped support component 782; a connector 781 configured to fixedly connected to the vertical board of the L-shaped support component 782; and two proximity switches 94L and 94G connected to the connector 781 (see FIG. 49D). The horizontal board of the L-shaped support component 782 is rigidly connected to the support component 786. The proximity switches 94L and 94G are connected to the computer 904 via wires 96L and 96G, so that the computer 904 may receive signals from the proximity switches 94L and 94G.

Each holding cup 785a on a vehicle 790 may hold an ingredient container 107 so that the movement of said ingredient container may be restricted or limited when the vehicle is moving. Similarly, each holding cup 785b on each vehicle 790 is configured to hold an ingredient container 107b wherein said ingredient container 107b is similarly configured as an ingredient container 107 except the size.

The vehicle 790 may comprise an electromagnet controlled by the computer 904. The computer 904 is configured to monitor the rechargeable battery 794. If the rechargeable battery is running low, the computer 904 is configured to turn on the electromagnet; otherwise the computer turns off the electromagnet. The electro-magnetic signal may be sensed by a sensor mounted next to a rail track, wherein said senor is connected to the computer system 909. The computer system can then automatically control the motion of the vehicle 790 so the vehicle can arrive at a charging station, so that the rechargeable battery gets charged.

Figure 49E:
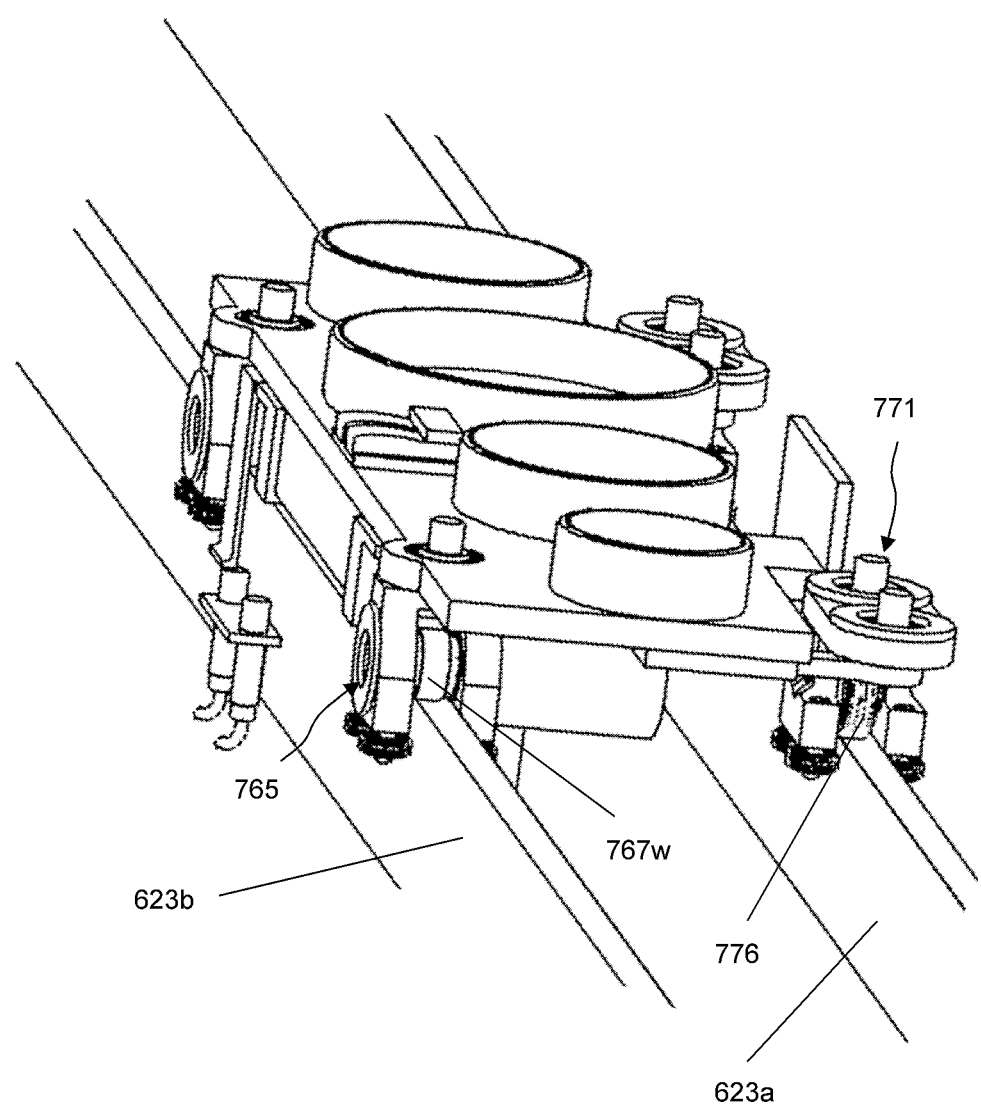
FIG. 49E shows an aerial view of the vehicle on a pair of rail tracks.

Referring to FIG. 49E, the vehicle 790 is configured to move on a pair of rail tracks 623a and 623b. The driving wheels 767w are configured to move on and touch the top surface of the rail track 623b. The wheels 776 are configured to move on and touch the top surface of the rail track 623a. The pair of wheels 769a and 769c (or the pair of wheels 769b and 769d) of each driving wheel mechanism 765 are configured to be limited by or to touch the opposite sides of the rail track 623b. The pair of wheels 777a and 777c (or the pair of wheels 777b and 777d) of each universal wheel mechanism 771 are configured to be limited by or to touch the opposite sides of the rail track 623a. The rail tracks 623a and 623b are straight and have a fixed width.

Figure 50:
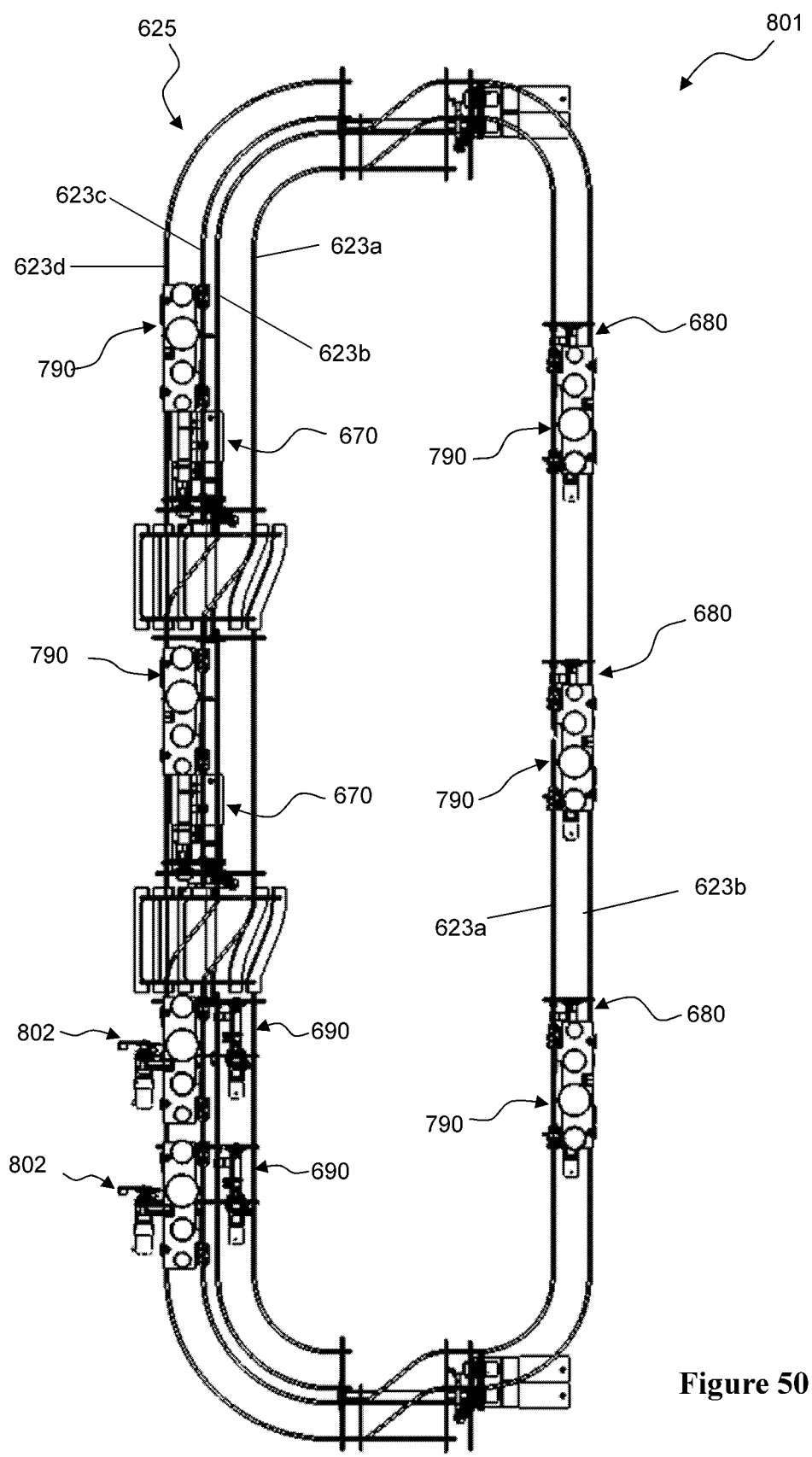
FIG. 50 shows a plane view of a transport system comprising vehicles, stopping mechanisms, charging mechanisms and a rail track system.

Referring to FIG. 50, a transport system 801 comprises: a rail track system 625; a plurality of vehicles 790; a plurality of charging mechanisms 802; a plurality of stopping mechanisms 680; and a plurality of stopping mechanisms 670. The stopping mechanisms 680 are mounted on the pair of rail tracks 623a and 623b of the rail track system 625. The stopping mechanisms 790 are mounted on the pair of rail tracks 624c and 624d and the pair of rail tracks 695c and 695d of the rail track system 625. The charging mechanisms 802 are mounted next to the pairs of rail tracks 624a and 624b, 624c and 624d. The transport system 801 is configured to transfer the container 107, either a container in another mechanism may be moved and be placed in one of the holding cups (785a,785b or 785c) or a container on one of the holding cups (785a,785b or 785c) is moved out of the holding device and placed on another mechanism by an unloading apparatus.

Figure 51A:
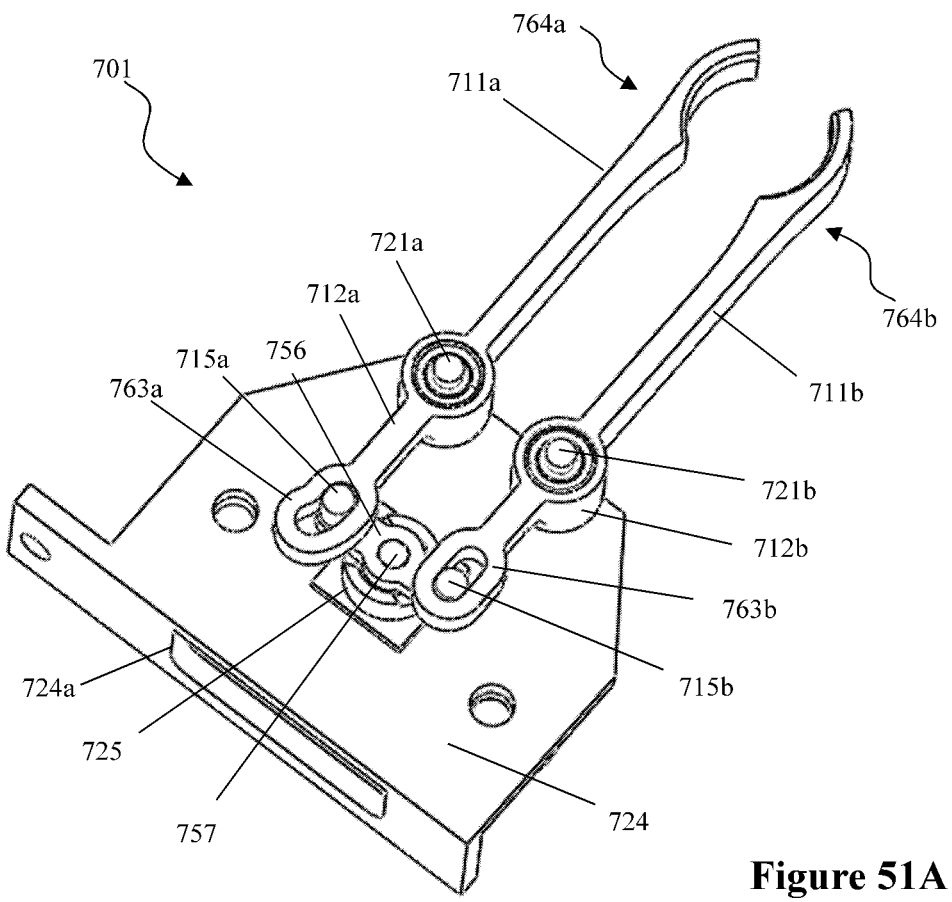
FIGS. 51A-51B show aerial views of a container gripping mechanism.
Figure 51B:
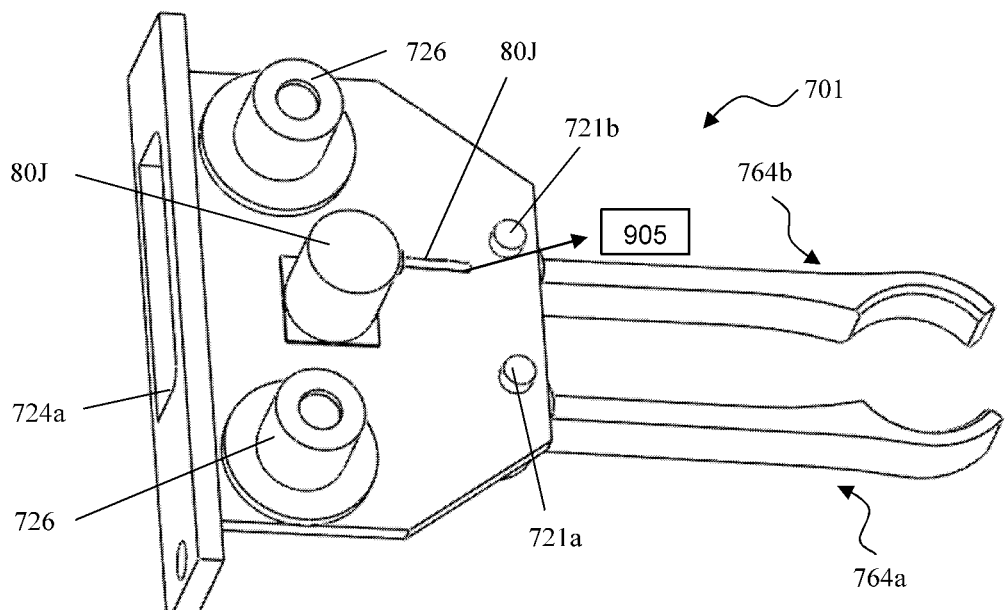

Referring to FIGS. 51A-51B, a container gripping mechanism 701 comprises gripping devices 764a and 764b, shafts 715a, 715b and 757, and a connector 756 configured to rigidly connect the shafts 715a, 715b and 757. The axes of the shafts 715a, 715b and 757 are configured to be vertical. The gripping device 764a or 764b comprises a curved hole 763a or respectively 763b, a bearing housing 712a or respectively 712b, a gripper 711a or respectively 711b, wherein the gripper 711a or 711b comprises a part of a cylindrical surface. The curved hole 763a and the gripper 711a are configured to be rigidly connected to the bearing housing 712a; and the curved hole 763b and the gripper 711b are configured to be rigidly connected to the bearing housing 712b. The gripping device 764a or 764b may comprise a rubber or silica gel or other elastic material which is attached to the cylindrical part of the gripper 711a or respectively 711b.

The container gripping mechanism 701 further comprises: two shafts 721a and 721b; an L-shaped support component 724 comprising a vertical board and a horizontal board, with a slot 724a on the vertical board, wherein the slot comprises a top horizontal surface and a bottom horizontal surface; two linear motion bearings 726 both of which comprise a vertical axis, wherein the pair of the linear motion bearings 726 are both fixedly connected to the horizontal board of the support component 724. The container gripping mechanism 701 further comprises a bearing housing 725 comprising a flange. The shafts 721a and 721b and the flange of the bearing housing 725 are all configured to be fixedly connected to the horizontal board of the support component 724; and the axes of the shafts 721a, 721b and the axis of the bearing housing 725 are configured to be vertical. The bearing housing 712a of the gripping device 764a is configured to be constrained to rotate relative to the shaft 721a around the axis of the shaft 721a. Similar, the bearing housing 712b of the gripping device 764b is configured to be constrained to rotate relative to the shaft 721b around the axis of the shaft 721b. The shaft 757 is configured to be constrained to rotate relative to the bearing housing 725 around the axis of the bearing housing 725.

The container gripping mechanism 701 further comprises a motor 80J comprising a shaft and a base component, wherein the base component of the motor is configured to be fixedly connected to the support component 724. The shaft of the motor 80J is connected to the shaft 757, so that the motor 80J can drive a rotation of the shaft 757 relative to the bearing housing 725, or equivalently, relative to the support component 724 around the axis of the shaft 757. When the shaft 757 is rotated by the motor 80J, the connector 756 is also rotated relative to the bearing housing 725 around the axis of the shaft 757, and then the shafts 715a and 715b are rotated around the axis of the shaft 757. The shaft 715a is configured to be inserted in the curved hole 763a of the gripping device 764a, so that a movement of the shaft 715a may induce a rotation in the gripping device 764a around the axis of the shaft 721a. Similarly, the shaft 715b is configured to be inserted in the curved hole 763b of the gripping device 764b, so that a movement of the shaft 715b may induce a rotation in the gripping device 764b, around the axis of the shaft 721b. As the gripping devices 764a and 764b are rotated in one direction, the grippers 711a and 711b may grip and hold an ingredient container 107; and the grippers 711a and 711b may be rotated in the other direction to release a gripped ingredient container 107. In summary, the rotation produced by the motor 80J may induce rotations of the grippers 711a and 711b as to grip or release an ingredient container 107. When an ingredient container 107 is gripped by the gripping devices 764a and 764b of the container gripping mechanism 701, the axis of the ingredient container 107 is configured to be vertical, and parallel to the axes of the shafts 721a and 721b. The motor 80J is connected to the computer 905 via wires 82H (see FIG. 51B). The computer 905 is configured to dynamically control the timing and/or speed of the motor 80J. Thus, the computer 905 may send signals to the motor 80J to control the angle of rotation of the motor 80J, as to accurately control the gripping devices 764a and 764b to grip or release an ingredient container 107. The motor 80J may be a stepper motor or a servo motor.

Figure 52:
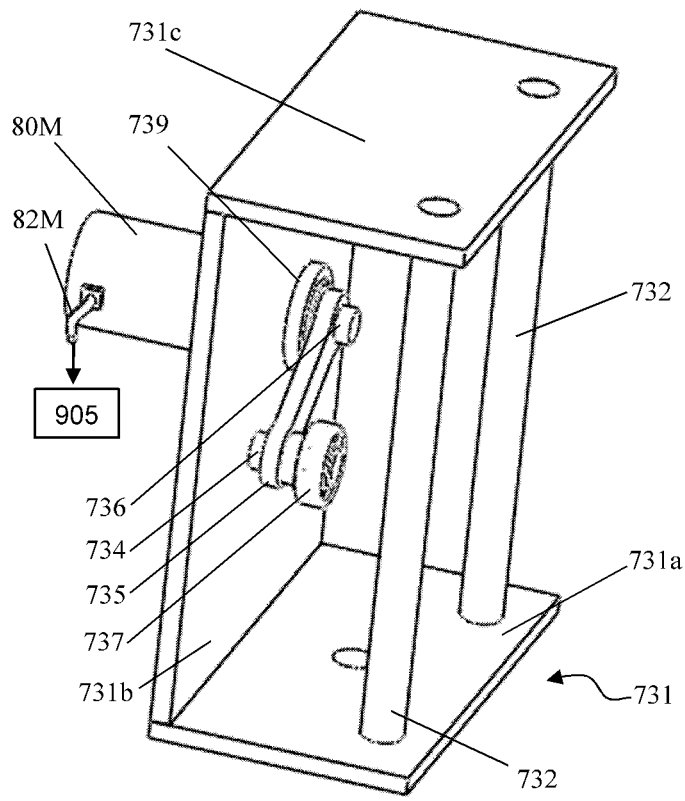
FIG. 52 shows an aerial view of parts of a transfer sub-apparatus.
Figure 53:
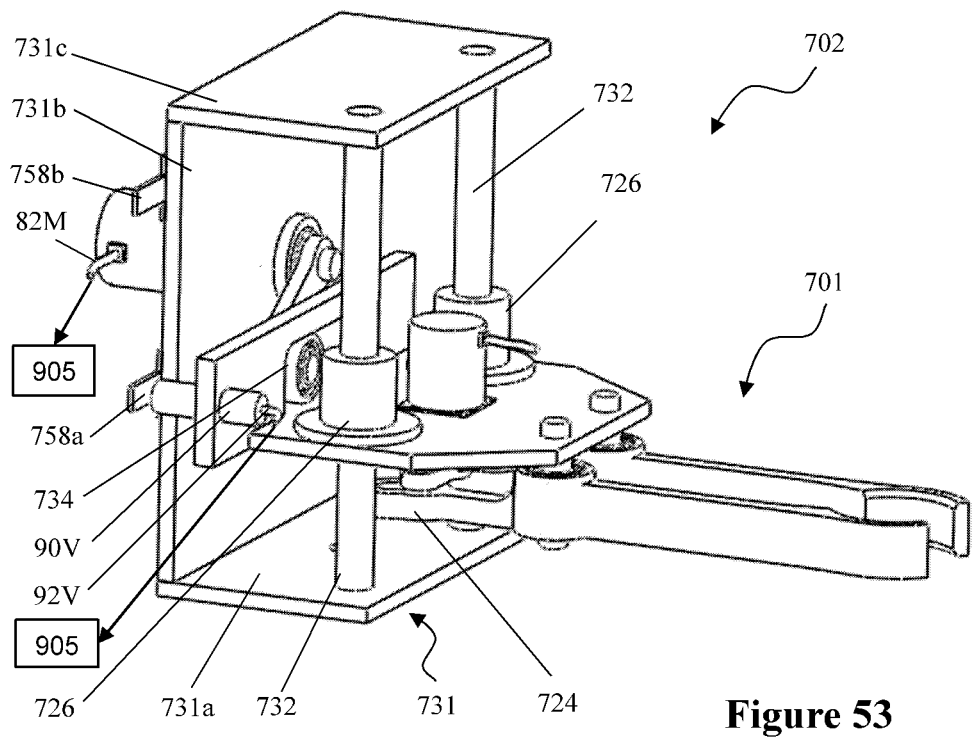
FIG. 53 shows an aerial view of the transfer sub-apparatus.

Referring to FIGS. 52-53, an unloading sub-mechanism 702 comprises: a pair of shafts 732; a support component 731 comprising a vertical board 731b and two horizontal boards 731a and 731c wherein the vertical board 731b is configured to rigidly connect the horizontal boards 731a and 731c. Each shaft 732 is configured to be fixedly connected to the horizontal boards 731a and 731c, wherein the axes of the pair of shafts 732 are configured to be vertical. The unloading sub-mechanism 702 further comprises: a bearing housing 739 with a horizontal axis; two shafts 734 and 736; a connector 735 configured to fixedly connect the shafts 734 and 736; and a motor 80M comprising a base component and a shaft. The bearing housing 739 is configured to be rigidly or fixedly connected to the vertical board 731b of the support component 731. The shaft 736 is configured to be constrained to rotate relative to the bearing housing 739 around the axis of the shaft 736, hence the connector 735 and the shaft 734 are constrained to rotated relative to the bearing housing 739 around the axis of the shat 736. The axes of the two shafts 734 and 736 are configured to be horizontal and parallel to each other. A wheel 737 is mounted on the shaft 734 so that the wheel 737 is constrained to rotate freely relative to the shaft 734, around the axis of the wheel 737; wherein the axis of the wheel 737 coincides with the axis of the shaft 734. The base component of the motor 80M is fixedly connected to the vertical board 731b, and the shaft of the motor 80M is fixedly connected to the shaft 736. When the shaft 736 is rotated by the motor 80M, the connector 735, the shaft 734 and the axis of the wheel 737 are also rotated around the axis of the shaft 736.

The unloading sub-mechanism 702 further comprises the container gripping mechanism 701 (see FIG. 53). Each linear motion bearing 726 of the container gripping mechanism 701 is configured to be engaged with a corresponding shaft 732 so that the linear motion bearing 726 is constrained to slide along the corresponding shaft 732 along the axis of the shaft 732. Since the support component 724 is configured to be fixedly connected to the flanges connected to the outer shells of the linear motion bearings 726, the support component 724 of the container gripping mechanism 701 is configured to be constrained to slide vertically relative to the support component 731. On the other hand, the wheel 737 is configured to be positioned between the top horizontal surface and the bottom horizontal surface of the slot 724a of the support component 724 of the container gripping mechanism 701, so that the rotation of the shaft 734 around the axis of the shaft 736 may induce a vertical linear movement of the support component 724 of the container gripping mechanism 701. The range of the vertical linear movement of the support component 724 can be equal to (or nearly equal to) two times the distance between the axes of the shafts 734 and 736.

The unloading sub-mechanism 702 further comprises a proximity switch 90V fixedly connected to the vertical board of the support component 724; and two targets 758a and 758b. Both targets 758a and 758b are configured to be rigidly or fixedly connected to the vertical board 731b of the support component 731, wherein the target 758b is positioned upper than the target 758a. The proximity switch 90V may monitor the target 758a or 758b when the proximity switch 90V is slid with the support component 724. The motor 80M is connected to the computer 905 via wire 82M. The computer 905 is configured to dynamically control the timing and/or speed of the motor 80M. The proximity switch 90V is also connected to the computer 905 via wires 92V, so that the computer 905 may receive signals from the proximity switch 90V. The computer 905 may also send signals to the motor 80M as to control the degree of rotation of the motor 80M. When the support component 724 is moved to a first position where the proximity switch 90V senses the target 758a, the signals of the proximity switch 90V are sent to the computer 905. The computer 905 can figure out the position of the target 758a, and the position of the support component 724. Similarly, when the support component 724 is moved to a second position where the proximity switch 90V senses the target 758b, the signals of the proximity switch 90V are sent to the computer 905. The computer 905 can figure out the position of the target 758b, and the position of the support component 724. Each time the support component 724 is moved to the first or second position, the motor 80M under the control of the computer 905, is stopped for a time during which the unloading sub-mechanism 702 is configured to complete a corresponding process. After this time, the motor 80M, under the control of the computer 905, may restart again and make a reverse rotation to move the support component 724 to the second position or respectively the first position.

Figure 54A:
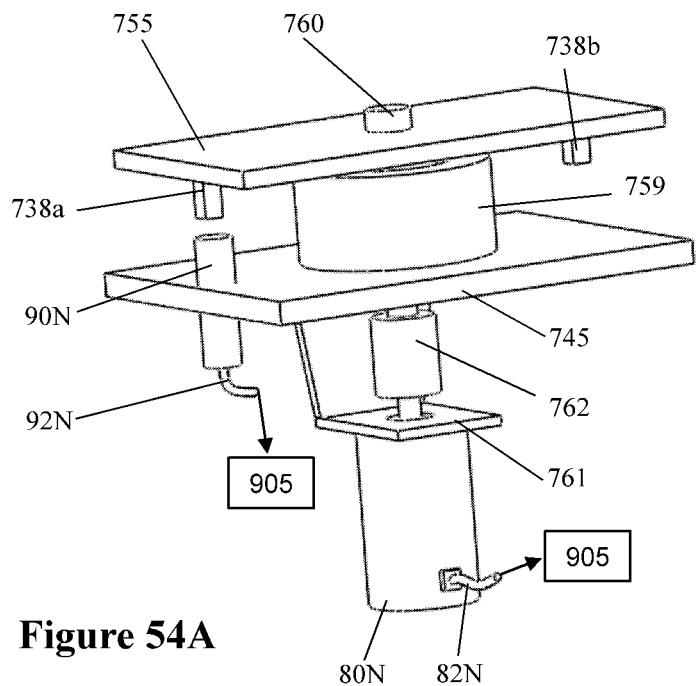
FIG. 54A shows an aerial view of a rotational motion mechanism.
Figure 54B:
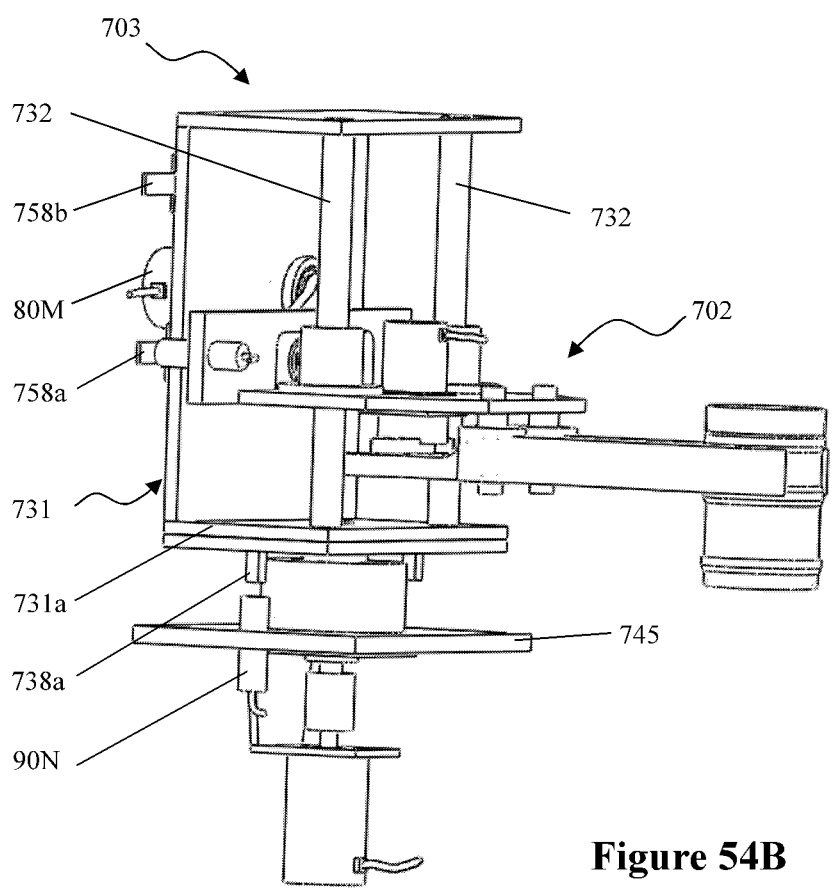
FIG. 54B shows an aerial view of a loading apparatus comprising the transfer sub-apparatus and the rotational motion mechanism.

Referring to FIGS. 54A-54B, an unloading apparatus 703 comprises: an unloading sub-mechanism 702; a shaft 760 comprising a vertical axis; a rigid component 755 which is rigidly connected to the shaft 760; a support component 745 in the shape of a board; a bearing housing 759; a motor 80N comprising a shaft and a base component; a connecting component 761 configured to fixedly connect the base component of the motor 80N to the support component 745. The bearing housing 759 is configured to be rigidly connected to the support component 745 and the axis of the bearing housing 759 is configured to be vertical. The shaft 760 is configured to be connected to the bearing housing 759 by bearings and accessories, so that the shaft 760 is constrained to rotate relative to the bearing housing 759, around the axis of the shaft 760. The horizontal board 731*a* of the support component 731 of the unloading sub-mechanism 702 is configured to be fixedly connected to the rigid component 755. Therefore, the support component 731 (or the unloading sub-mechanism 702) is configured to be constrained to rotate relative to the support component 745, around the axis of the shaft 760. The shaft of the motor 80N is fixedly connected to the shaft 760 via a coupling 762, so that the motor 80N may drive a rotation of the shaft 760 relative to the support component 745, around the axis of the shaft 760, hence the support component 731 is rotated relative to the support component 745 around the axis of the shaft 760.

The unloading apparatus 703 further comprises a proximity switch 90N, a connector 748 configured to connect the proximity switch 90N to the support component 745, and two targets 738*a* and 738*b* both of which are configured to be rigidly connected to the rigid component 755. The proximity switch 90N may monitor the targets 738*a* and 738*b* when the targets are rotated with the rigid component 755. The motor 80N is connected to the computer 905 via wires 82N. The computer 905 is configured to dynamically control the timing and/or speed of the motor 80N. The proximity switch 90N is also connected to the computer 905 via wires 92N, so that the computer 905 may receive signals from the proximity switch 90N. The computer 905 may also send signals to the motor 80N as to control the degree of rotation of the motor 80N. When the rigid component 755 is rotated to a first position where the proximity switch 90N senses the target 738*a*, the signals of the proximity switch 90N are sent to the computer 905. The computer 905 can figure out the position of the target 738*a*, and the position of the rigid component 755. Similarly, when the rigid component 755 is rotated to a second position where the proximity switch 90N senses the target 738*b*, the signals of the proximity switch 90N are sent to the computer 905. The computer 905 can figure out the position of the target 738*b*, and the position of the rigid component 755. Each time the rigid component 755 is rotated to the first or second position, the motor 80N under the control of the computer 905 is stopped for a time during which the unloading apparatus 703 is configured to complete a corresponding process. After this time, the motor 80N, under the control of the computer 905, may restart again as to rotate the rigid component 755 to the second position or respectively the first position.

It should be noted that the unloading apparatus 703 comprises the following:
(1) the container gripping mechanism 701 configured to grip or release a container 107, wherein the container gripping mechanism 701 comprises the support component 724, to be referred to as the base component of the container gripping mechanism 701, or the first support component of the unloading apparatus 703. The container gripping mechanism 701 further comprises two gripping devices 764*a* and 764*b* which are constrained to rotate relative to the first support component 724 by a motorized mechanism; and each gripping device comprise a gripper, wherein the grippers are configured to fit the ingredient container 107;
(2) the support component 731, referred to as a second support component of the unloading apparatus 703;
(3) the support component 745, referred to as a third support component, or the base component of the unloading apparatus 703;
(4) a vertical motion mechanism, referred to as a first motion mechanism, configured to produce a vertical linear motion in the first support component 724 relative to the second support component 731, wherein the first motion mechanism comprises the motor 80M, shafts 736 and 734, connector 735, bearing housing 739, slot 724*a*, two parallel shafts 732, and two linear motion bearings 726, etc.; and their connections to each other if any, and their connections to the other components of the unloading apparatus 703 if any;
(5) a rotational motion mechanism, referred to as a second motion mechanism, configured to produce a rotation of the second support component 731 relative to the third support component 745, around a vertical axis (i.e., the axis of the shaft 760), wherein the second motion mechanism comprises the motor 80N, connecting component 761, coupling 762, bearing housing 759, shaft 760, rigid component 755 etc.; and their connections with each other if any, and their connections to the other components of the unloading apparatus 703 if any.

The distance between the axis of the shaft 760 and the axis of an ingredient container 107 is configured to be a constant, when the ingredient container 107 is gripped by the container gripping mechanism 701 of the unloading apparatus 703, as in FIG. 54B. the constant is referred to as the radius of the unloading apparatus 703. The unloading apparatus 703 can be positioned in a proper position as to grip an ingredient container 107, when the axis of the ingredient container 107 is positioned vertically, and the distance from the axis of the ingredient container 107 to the axis of the shaft 760 is equal to the radius of the unloading apparatus 703, and when the height of the ingredient container 107 is within a certain limit. The unloading apparatus 703 may grip an ingredient container 107, and may move it linearly in vertical direction, or horizontally by a rotation around the axis of the shaft 760, or by a combination of both, and then it may release the ingredient container 107 at a position which is different from the previous position.

We note that the second motion mechanism of the unloading apparatus 703 may be substituted by a motion mechanism configured to move the second support component 731 relative to the third support component 745 by a horizontal translation, or more generally, by a horizontal planar motion.

The unloading apparatus 703 further comprises the proximity switches 90N, 90V and other electrical or electronic devices (not shown in figures), wherein the proximity switches are connected to the computer 905 via wires; wherein the proximity switches are used to detect the angle of rotation of the motors, the relative position of two components, etc., of the unloading apparatus 703 and send signals to the computer 905. Thus, the computer 905 can control the above described mechanisms and apparatuses.

Figure 55:
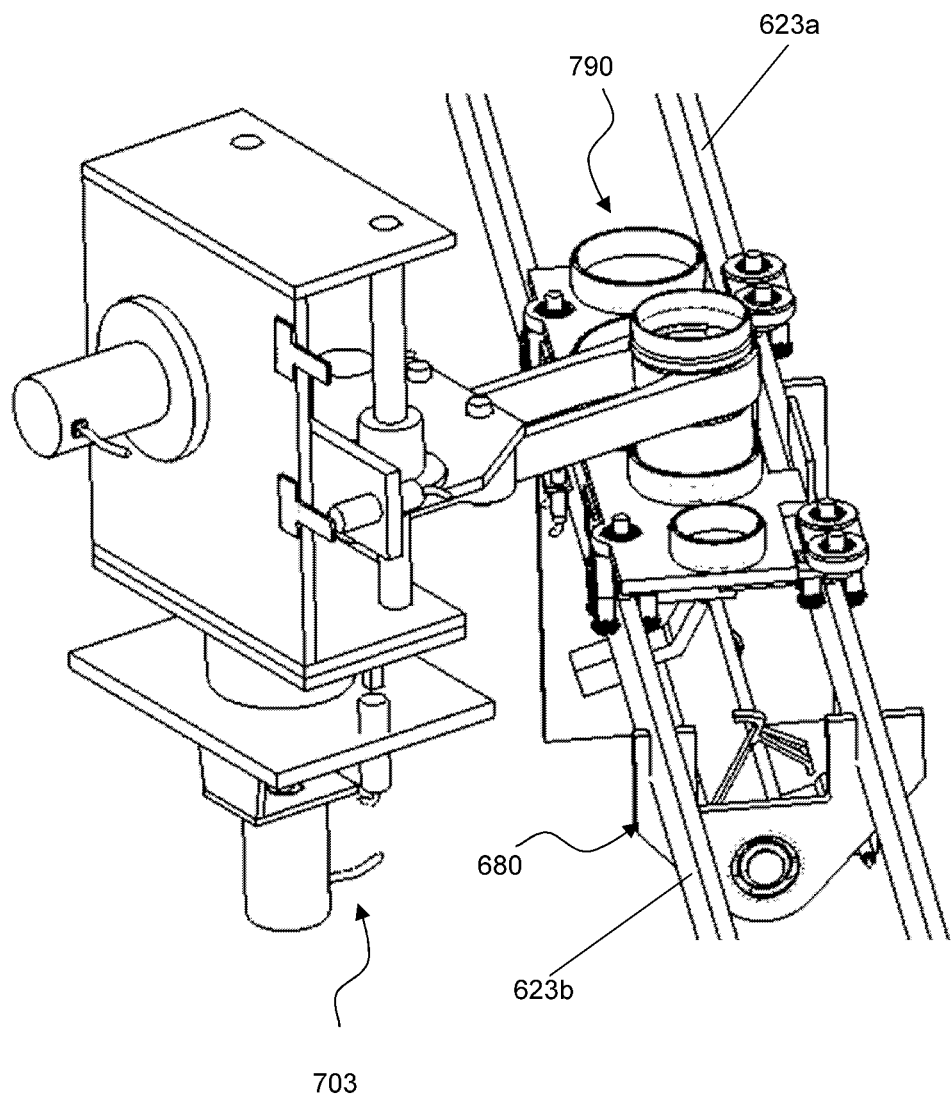
FIG. 55 shows the unloading of an emptied container from a vehicle.

As shown in FIG. 55, the relative position of the stopping mechanism 680 and the base component of the unloading apparatus 703 is configured to be properly fixed. When the vehicle 790 on the pair of rail tracks 623*a* and 623*b* is stopped at a position by the stopping mechanism 680 where one of stoppers of the stopping mechanism 680 is attracted by the magnet 783 on the vehicle 790, the unloading apparatus 703 is configured to transfer an emptied ingredient container from the holding cup of the vehicle 790 to another apparatus, such as a container cleaning apparatus (no shown in figures).

Figure 56:
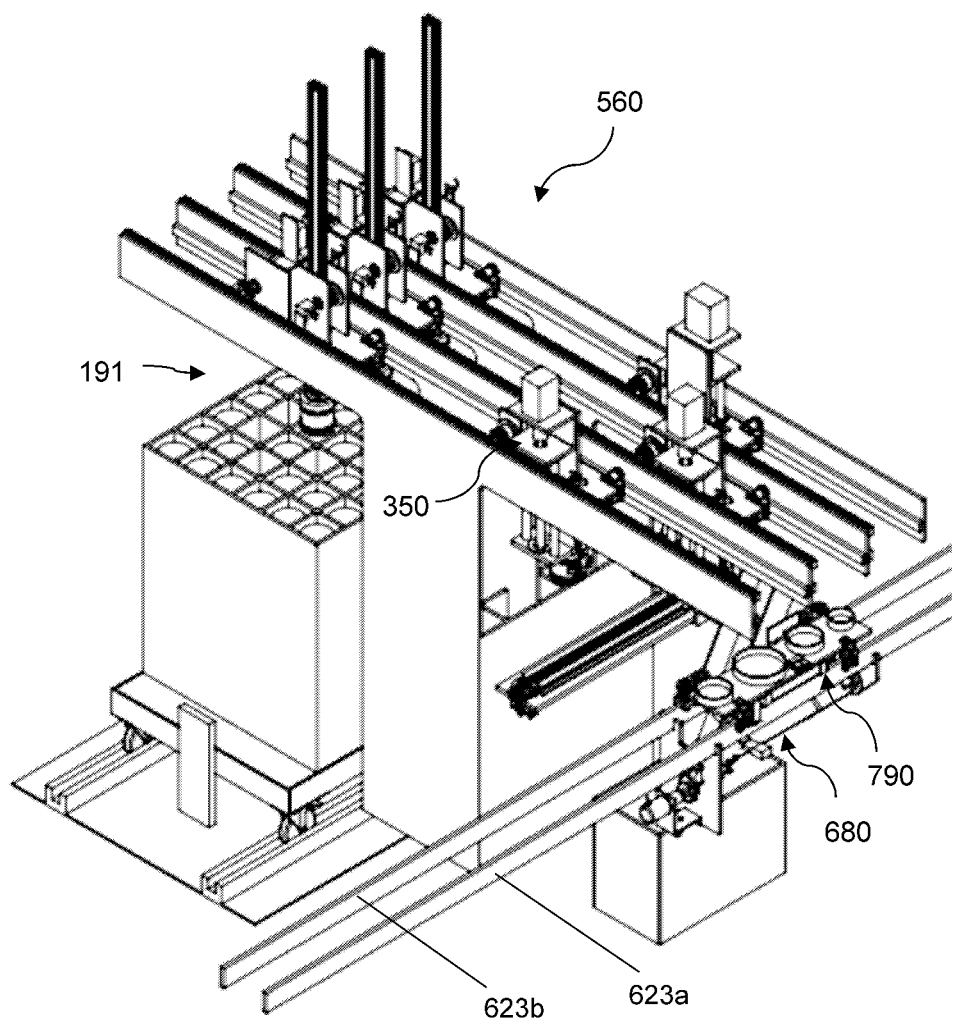
FIG. 56 shows an aerial view of the storage system and a part of the transport system near the storage system.

Referring to FIG. 56, a part of the transport system 801 is configured to be located next to the storage system 560. When the vehicle 790 on the pair of rail tracks 623*a* and 623b is stopped at a position by the stopping mechanism 680, wherein one of stoppers of the stopping mechanism 680 is attracted by the magnet 783 on the vehicle 790. Then, the container loading apparatus 350 transfers an ingredient container 107 from the container holder 454 of the sub-apparatus 440 to a holding cup on the vehicle 790 of the transport system 801. The relative position of the stopping mechanism 680 and the storage apparatus 191 of the storage system 560 is relatively fixed and properly configured.

Figure 57A:
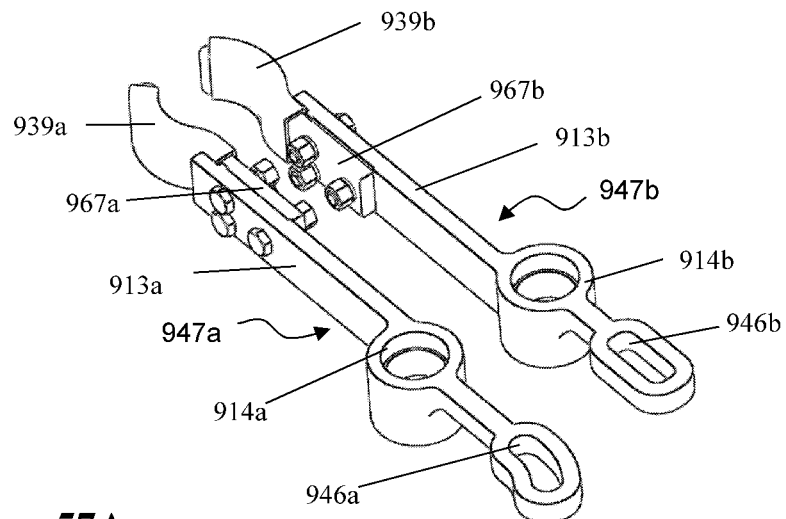
FIG. 57A shows an aerial view of two gripping devices.
Figure 57B:
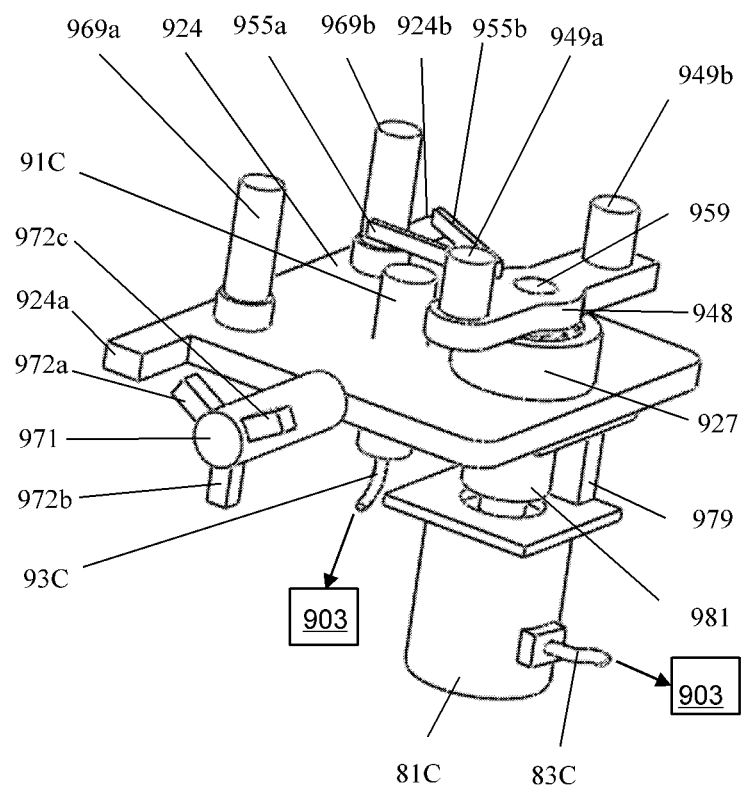
FIG. 57B shows an aerial view of parts of a container gripping mechanism.
Figure 57C:
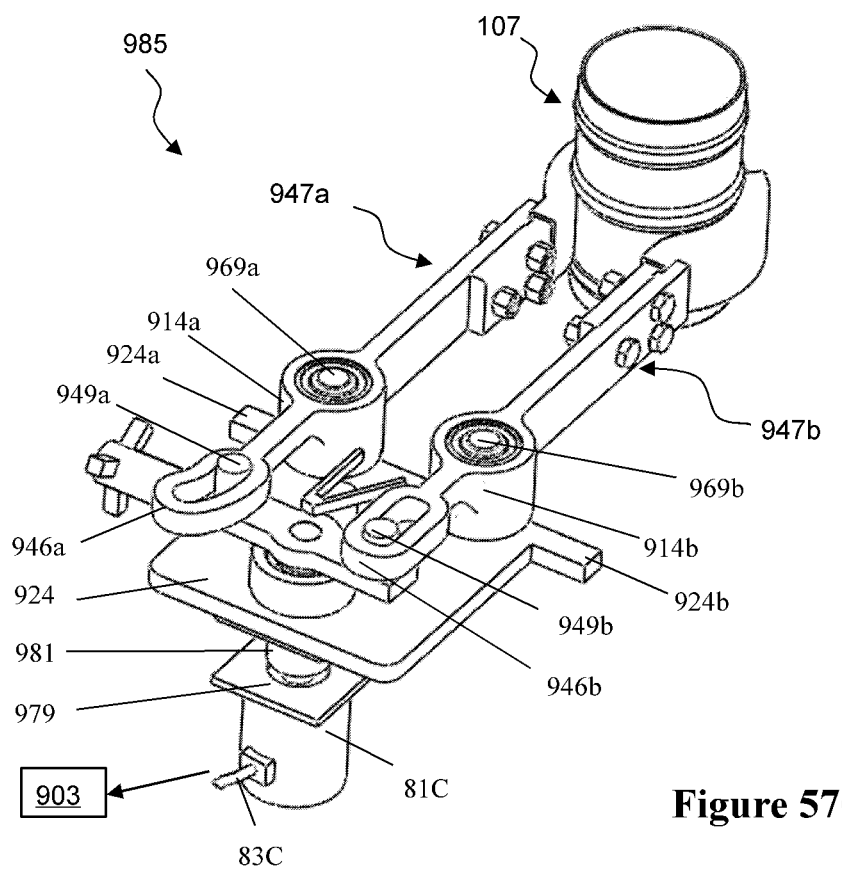
FIG. 57C shows an aerial view of the container gripping mechanism.

Referring to FIGS. 57A-57C, a container gripping mechanism 985 comprises: gripping devices 947a and 947b; shafts 949a, 949b and 959; and a connector 948 configured to rigidly connect the shafts 949a, 949b and 959. The axes of the shafts 949a, 949b and 959 are configured to be parallel to each other. The gripping device 947a (or 947b) comprises a support component 913a (or respectively 913b) and a gripper 967a (or respectively 967b). The support component 913a (or 913b) comprises a curved hole 946a (or respectively 946b) and a bearing housing 914a (or respectively 914b). The surface of the gripper 967a or 967b comprises a part of a cylindrical surface. The gripper 913a (or 913b) is configured to be fixedly connected to the support component 913a (or respectively 913b) by bolts and nuts. The gripping device 947a (or 947b) further comprises a rubber (or silica gel) 939a (or respectively 939b) which is attached to the gripper 967a (or respectively 967b).

The container gripping mechanism 985 further comprises shafts 969a and 969b, a support component 924 in the shape of a board, a bearing housing 927 rigidly connected to the top of the support component 924, a shaft 971 comprising a horizontal axis, and three targets 972a, 972b and 972c all of which are configured to be fixedly connected to the shaft 971 (see FIG. 57B). The support component 924 comprises two sub-component 924a and 924b. The shafts 969a and 969b are configured to be rigidly connected to the support component 924 wherein the axes of the two shafts 969a and 969b are configured to be perpendicular to the top surface of the support component 924. The shaft 959 is configured to be connected to the bearing housing 927 by bearings and accessories, so the shaft 959 is constrained to rotate relative to the bearing housing 927 (or equivalently, relative to the support component 924), around the axis of the shaft 959. As explained before, the connector 948 is configured to be rigidly connected to the shaft 959, so that the connector 948 and the components (the shafts 949a, 949b) attach on it are constrained to rotate relative to the support component 924 around the axis of the shaft 959. The axes of the shafts 969a, 969b, the axis of the shaft 959 and the axis of the bearing housing 927 are configured to be mutually parallel. The shaft 969a (or 969b) is configured to be connected to the bearing housing 914a (or respectively 914b) of the gripping device 947a (or respectively 947b) by bearings and accessories, so that the gripping device 947a (or 947b) is constrained to rotate relative to the shaft 969a (or respectively 969b) around the axis of the shaft 969a (or respectively 969b) (see FIG. 57C). The shafts 949a (or 949b) is configured to be inserted in the curved hole 946a (or respectively 946b) of the gripping devices 947a (or respectively 947b), so that a movement of the shaft 949a (or 949b) can induce a rotation in the gripping device 947a (or respectively 947b) around the axis of the shaft 969a (or respectively 969b). Since the gripping devices 947a and 947b are rotated, the grippers 967a and 967b (and the rubbers 939a and 939b) may grip or release a container 107.

The container gripping mechanism 985 further comprises: a motor 81C comprising a shaft and a base component, a connecting component 979 configured to fixedly connect the base component of the motor 81C to the support component 924; a coupling 981 configured to connect the shaft of the motor 81C to the shaft 959. As explained before, the motor 81C may drive the rotation of the shaft 959, the connector 948, and the shafts 949a and 949b relative to the support component 924 around the axis of the shaft 959.

The container gripping mechanism 985 further comprises: a proximity switch 91C, two targets 955a and 955b both of which are configured to be rigidly connected to the connector 948. The proximity switch 91C may monitor the targets 955a and 955b when the targets are rotated with the connector 948. As shown in FIG. 57C, the motor 81C is connected to the computer 903 via wires 83C. The computer 903 is configured to dynamically control the timing and/or speed of the motor 81C. The proximity switch 91C is also connected to the computer 903 via wires 93C, so the computer 903 may receive signals from the proximity switch 91C. The computer 903 may also send signals to the motor 81C as to control the degree of rotation of the motor 81C. When the connector 948 is rotated to a first position where the proximity switch 91C senses the target 955a, the gripping devices 947a and 947b are configured to grip a container 107. At the same time, the signals of the proximity switch 91C are sent to the computer 903, the computer 903 use the information to track the positions of the target 955a and of the gripping devices 947a and 947b. Similarly, when the connector 948 is rotated to a second position where the proximity switch 91C senses the target 955b, the gripping devices 947a and 947b are configured to release the container 107. At the same time, the signals of the proximity switch 91C are sent to the computer 903. The computer 903 can figure out the position of the target 955b, and the position of the gripping devices 947a and 947b. Using the information sent by the proximity switch 91C, the computer 903 may accurately control the motion of the gripping devices 947a and 947b as to grip or release a container 107.

Figure 57D:
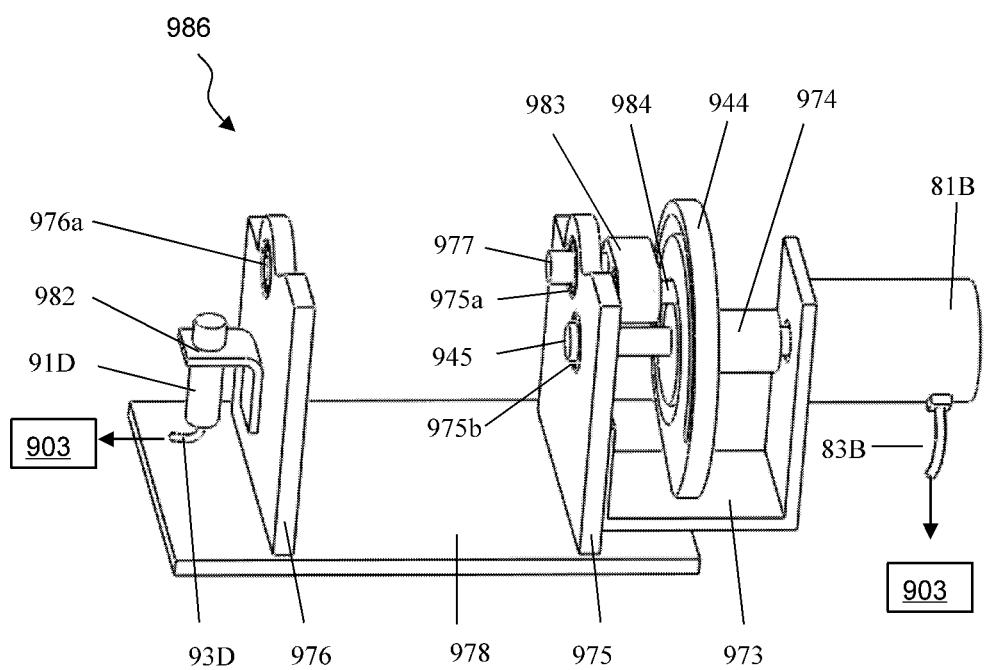
FIG. 57D shows an aerial view a rotational motion mechanism, with a horizontal rotational axis.

Referring to FIG. 57D, a rotational motion mechanism 986 comprises a horizontal support component 978, two vertical boards 975 and 976 both configured to be rigidly connected to the support component 978, and shafts 977 and 945. The vertical board 975 comprise two bearing housings 975a and 975b, and the vertical board 976 comprise a bearing housing 976a. The axes of the bearing housing 975a of the vertical board 975 and the bearing housing 976a of the vertical board 976 are configured to be the same. The shaft 977 is connected to the bearing housing 975a of the vertical board 975 by bearings and accessories, so that the shaft 977 is constrained to rotate relative to the vertical board 975 (or equivalently, relative to the support component 978), around the axis of the shaft 977. The shaft 945 is connected to the bearing housing 975b of the vertical board 975 by bearings and accessories, so that the shaft 945 is constrained to rotate relative to the vertical board 975 (or equivalently, relative to the support component 978), around the axis of the shaft 945.

The rotational motion mechanism 986 further comprises: a cam 944 comprising a curved hole; a connector 983; a shaft 984; a motor 81B comprising a shaft and a base component; a connecting component 973 configured to fixedly connect the base component of the motor 81B to the vertical board 975; and a coupling 974. The shaft 977 is rigidly connected to the connector 983. The connector 983 may comprise a bearing housing (although this is not strict requirement) which is configured to be connected to the shaft 984 by bearings and accessories. Thus, the connector 983 and the shaft 984 are constrained to rotate relative to the support component 975 around the axis of the shaft 977 as well as the shaft 977. It should be noted that the axes of the shafts 977 and 984 are configured to be parallel to each other. The cam 944 is rigidly connected to the shaft 945 and the curved hole of the cam 944 is configured to constrain the shaft 984. The shaft of the motor 81B is connected to the shaft 945 via the coupling 974. Thus, the motor 81B may drive the rotation of the shaft 945 around the axis of the shaft 945, hence the cam 944 is rotated around the axis of the shaft 945. Since the curved hole of the cam 944 constrains the shaft 984, the rotation of the cam 944 produces a motion of the shaft 984, i.e., a rotation around the axis of the shaft 977, hence the shaft 977 is rotated around the axis of the shaft 977.

It should be noted that the curved hole in the cam 944 is modelled on a "modeling curve" comprising a union of a middle curve and two ending curves, wherein the ending curves are arcs of two circles centered at the axis of the shaft 945. The shaft 984 is constrained by the edges in the curved hole in the cam 944, by touching between the shaft 984 and the edges in the curved hole. When the shaft 984 touches the part of the edges corresponding to the ending curves, the shaft 984 may be static when the cam 944 is rotated. The modeling curve is configured to have continuously varying tangents (i.e. no sharp turns on the curve); and a smooth rotation of the cam 944 produces a motion in the shaft 984 with limited acceleration.

The rotational motion mechanism 986 further comprises a proximity switch 91D and a connecting component 982 configured to fixedly connect the proximity switch 91D to the vertical board 976. The motor 81B is connected to the computer 903 via wires 83B. The computer 903 may be configured to dynamically control the timing and/or speed of the motor 81B. The proximity switch 91D is also connected to the computer 903 via wires 93D, so the computer 903 may receive electric or electronic signals from the proximity switch 91D.

It should be noted that the width of the curved hole in the cam 944 may be configured to be equal to or slightly larger than the diameter of the shaft 984.

Figure 57E:
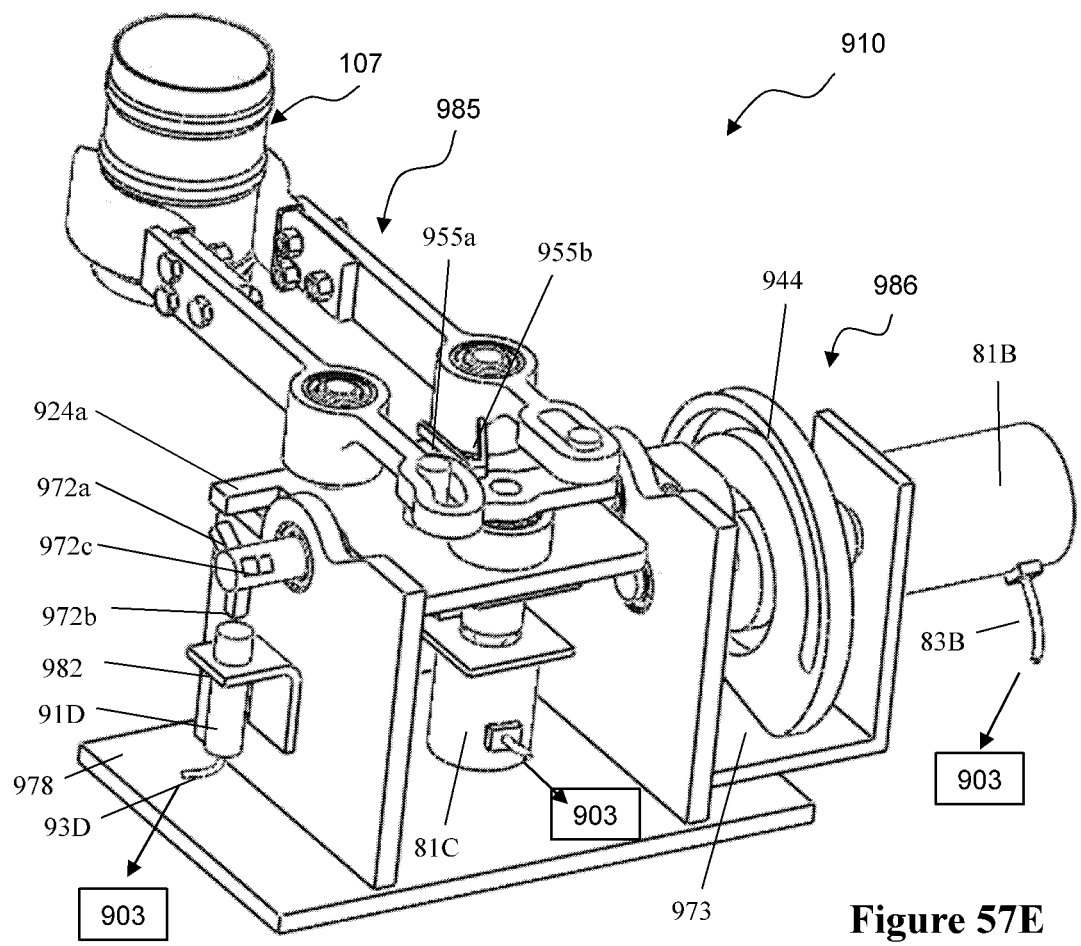
FIG. 57E shows an aerial view of a dispensing apparatus configured to dispense food ingredients from an ingredient container.

Referring to FIG. 57E, a dispensing apparatus 910 comprises the container gripping mechanism 985 and the rotational motion mechanism 986. The shaft 977 of the rotational motion mechanism 986 is configured to be rigidly connected to the support component 924 in the container gripping mechanism 985, and the shaft 971 of the container gripping mechanism 985 is connected to the bearing housing 976a of the rotational motion mechanism 986, so that the motor 81B of the rotational motion mechanism 986 may drive a rotation of the support component 924 (or equivalently the container gripping mechanism 985) relative to the support component 978 around the axis of the shaft 977.

As explained before, the axis of the shaft 971 of the container gripping mechanism 985 and the axis of the shaft 977 of the rotational motion mechanism 986 are configured to be concentric. The proximity switch 91D may monitor the three targets 972a, 972b, and 972c of the container gripping mechanism 985 when the targets are rotated with the shaft 971. The motor 81B is connected to the computer 903 via wires 83B. The computer 903 is configured to dynamically control the timing and/or speed of the motor 81B. The proximity switch 91D is also connected to the computer 903 via wires 93D, so the computer 903 may receive signals from the proximity switch 91D. The computer 903 may also send signals to the motor 81B as to control the degree of rotation of the motor 81B. When the shaft 971 (or equivalently, the support component 924) is rotated by the motor 81B to a first position where the proximity switch 91D senses the target 972a, the signals of the proximity switch 91D are sent to the computer 903. The computer 903 can figure out the position of the target 972a, and the position of the support component 924. Similarly, when the shaft 971 (or equivalently, the support component 924) is rotated by the motor 81B to a second (or third) position where the proximity switch 91D senses the target 972b (or respectively 972c), the signals of the proximity switch 91D are sent to the computer 903. The computer 903 can figure out the position of the target, and the position of the support component 924.

When the support component 924 of the container gripping mechanism 985 is controlled by the computer 903 to rotate to the first position where the sub-components 924a and 924b respectively touch the top edges of the vertical boards 975 and 976, the support component 924 is stopped from rotating and the vertical boards 975 and 976 function as a physical barrier for the motion of the rigid component 924. When the support component 924 of the container gripping mechanism 985 is controlled by the computer 903 to rotate to the second position, the angle of rotation of the support component 924 relative to the first position may be pre-assigned angle usually 75 degrees. When the support component 924 of the container gripping mechanism 985 is controlled by the computer 903 to rotate to the third position where the sub-components 924a and 924b respectively touch the top edges of the vertical boards 975 and 976, the angle of rotation of the support component 924 relative to the first position may be pre-assigned angle usually 150 degrees. Each time the support component 924 is rotated to the first, second or third position, the motor 81B is controlled to be stopped for a time during which the dispensing apparatus 910 is configured to complete a corresponding process.

When the support component 924 of the container gripping mechanism 985 is rotated to the first position, and the connector 948 is rotated to the position where the proximity switch 91C senses the target 955a. At this time, a pre-assigned angle (explained before) of rotation of the connector 948 around the axis of the shaft 959, as produced by the motor 81C of the container gripping mechanism 985, hence the gripping devices 947a and 947b in the container gripping mechanism 985 are rotated a corresponding angle, as to grip a container 107 which may contain or otherwise hold food or food ingredients. If a container 107 is thus gripped, the axis of the gripped container 107 is configured to be parallel to the axis of the shafts 969a, 969b and 959 (of the container gripping mechanism 985). After the container 107 is gripped, as shown in FIG. 57E, the computer 903 would control the rotational motion mechanism 986 driven a rotation of the support component 924 of the container gripping mechanism 985 to the third position. During this period, the container 107 is kept gripped by the gripping devices 947a and 947b. Therefore, the container 107 and the gripping devices 947a and 947b are rotated by the same angular degree as the support component 924, around the axis of the shaft 977 to the third position. In particular, the food or food ingredients contained in the container 107 can be dispensed as the container 107 is turned by 150 degrees. After the dispensing of the food or food ingredients contained or held in the container 107, the container gripping mechanism 985 may be returned to the first position, when the rotational motion mechanism 986 rotates the support component 924 backward.

When the support component 924 of the container gripping mechanism 985 is at the first position, and hence that the connector 948 are rotated to the position where the proximity 91C senses the target 955b, as to induce the gripping devices 947*a* and 947*b* to rotate, as to release a container 107, the rotational motion mechanism 986 may also rotate the support component 924 of the container gripping mechanism 985 to the second position. After a time (as needed), the container gripping mechanism 985 may be returned to the first position, when the rotational motion mechanism 986 rotates the support component 924 backward.

The dispensing apparatus 910 further comprises the proximity switches 91C, 91D and other electrical or electronic devices (not shown in figures), wherein the proximity switches are configured to detect the angle of rotation of the motor in the dispensing apparatus 910 and send the reading to the computer 903. Thus the computer 903 can control the above described mechanism and apparatus, especially the angle of the rotation of motor 81C in the container gripping mechanism 985 so that the gripping devices 947*a* and 947*b* of the container gripping mechanism 985 are configured to grip or release a container 107; the angle of rotation of the motor 81B so that the support component 924 of the container gripping mechanism 985 is be rotated a pre-assigned angle (e, g, 150 degrees) as to unload the food or food ingredients contained in the container 107.

Figure 58A:
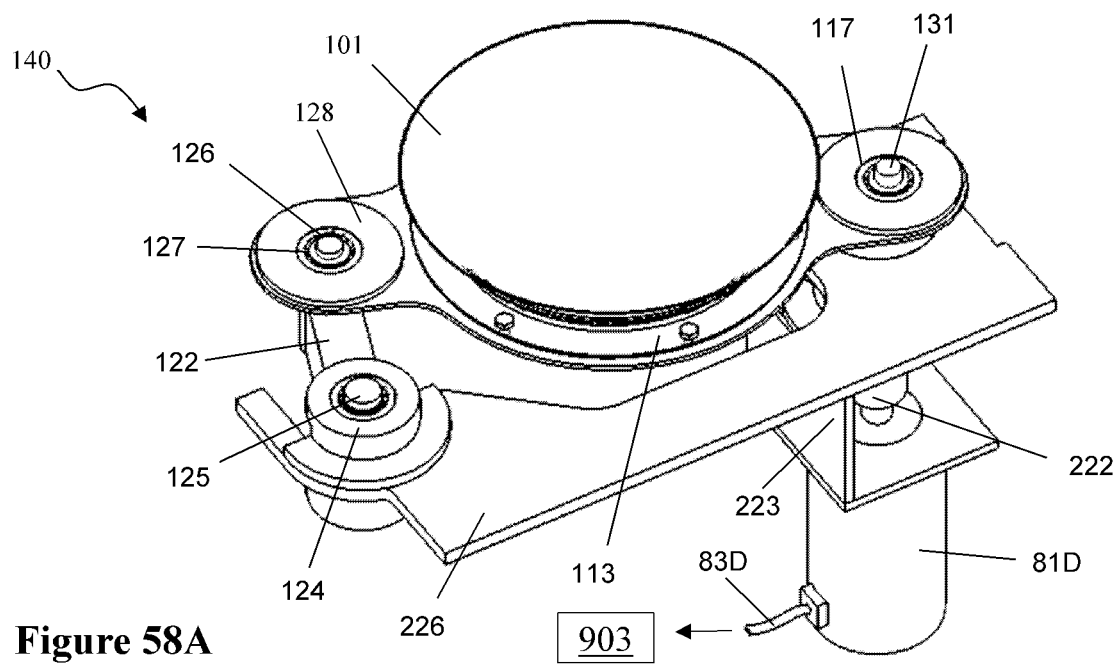
FIG. 58A show an aerial view of a cooking apparatus.
Figure 58B:
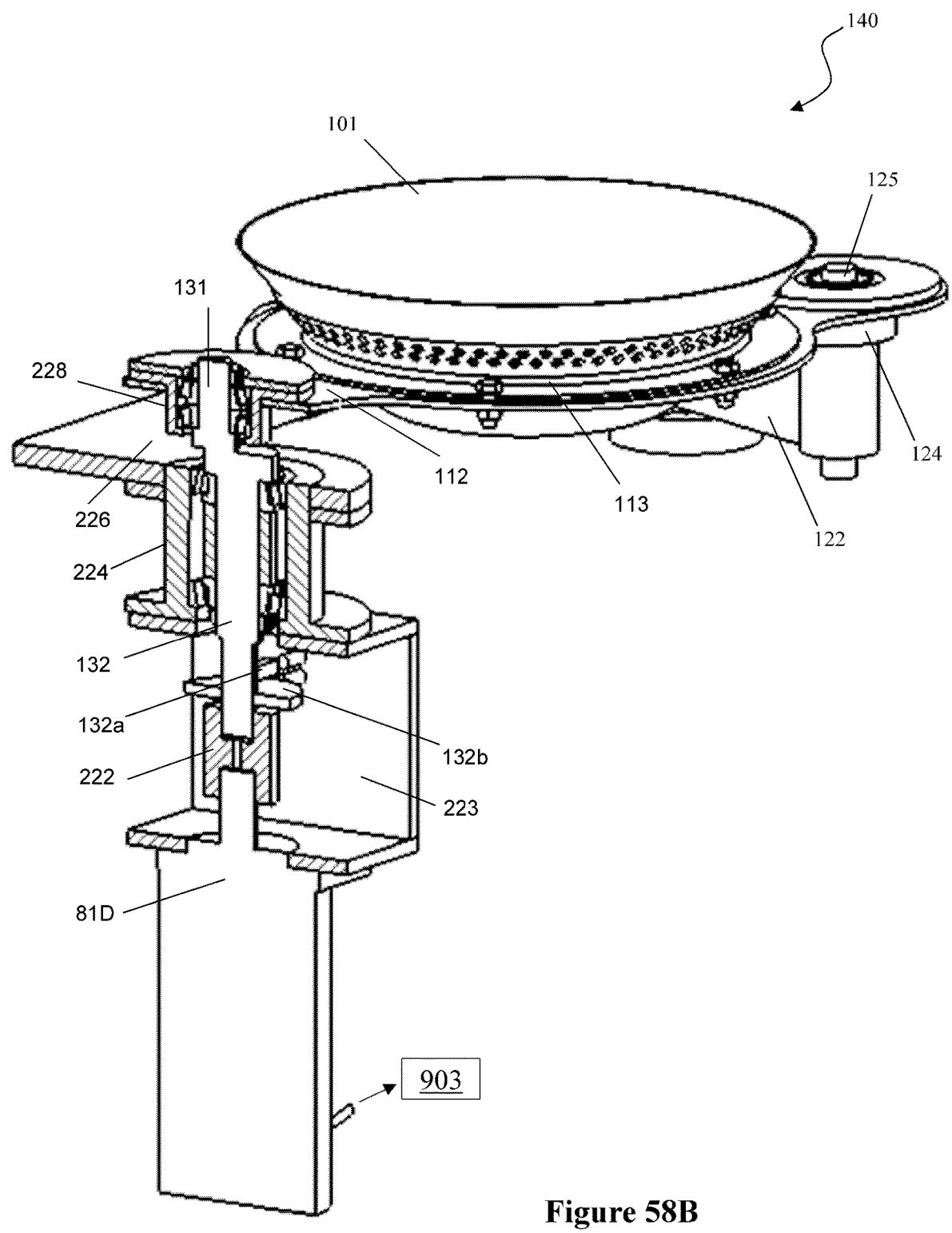
FIG. 58B shows a cut view of the cooking apparatus.

Referring to FIGS. 58A-58B, a cooking apparatus 140 comprises: a cookware 101; a pair of shafts 125 and 126 that are rigidly connected by a connector 122 (see FIG. 58A); a pair of shafts 131 and 132 that are rigidly connected (see FIG. 58B). The shafts 125, 126, 131 and 132 are configured to have parallel axes; and the distance between the axes of the shafts 125 and 126 is strictly larger than the distance between the axes of the shafts 131 and 132. The cooking apparatus 140 also comprises bearing housings 124, 128, 224 and 228. The bearing housings 124 and 224 are rigidly connected to a support component 226. The bearing housings 128 and 228 are connected to a board 112, wherein the board 112 is fixedly connected to the cookware 101 by a connector 113 and some connecting accessories.

Bearings and accessories are configured to connect the shaft 125 and the bearing housing 124 so that shaft 125 is constrained to rotate relative to the bearing housing 124, around the axis of the shaft 125. Bearings and accessories are configured to connect the shaft 126 and the bearing housing 128 so that shaft 126 is constrained to rotate relative to the bearing housing 128, around the axis of the shaft 126 (see FIG. 58A).

Bearings 117 and accessories are configured to connect the shaft 131 and the bearing housing 228 so that shaft 131 is constrained to rotate relative to the bearing housing 228, around the axis of the shaft 131. Bearings 127 and accessories are configured to connect the shaft 132 and the bearing housing 224 so that shaft 132 is constrained to rotate relative to the bearing housing 224, around the axis of the shaft 132 (see FIG. 58B).

The cooking apparatus 140 further comprises: a motor 81D comprising a base component and a shaft, wherein the base component is fixedly connected to the support component 226 by a connector 223, and the shaft of the motor 81D is connected to the shaft 132 by a coupling 222. Thus, the motor 81D may drive the rotation of the shaft 132, and hence the shaft 131 is rotated around the axis of the shaft 132, and the rotation induces a cyclic movement in the cookware 101 which may stir, mix and distribute the food or food ingredients contained in the cookware 101. The motor 81D is connected to a computer 903 via wires 83D. The computer 903 may be configured to send electric or electronic signals to the motor 81D as to dynamically control the timing and/or speed of the motor 81D (or indirectly the angle of rotation of the main shaft 132).

The shaft 132 is referred to as the main shaft, and shaft 131 as the eccentric shaft. The main shaft 132 is configured be vertical when the cookware 101 is in an upright position as to contain or otherwise hold a food or food ingredient.

It should be noted that the cooking apparatus 140 comprises: a cookware 101; a stirring motion mechanism comprising a support component 226 and a motor 81D, said stirring motion mechanism configured to produce a motion in the cookware 101 as to stir, mix or distribute the food or food ingredients contained in the cookware 101.

Figure 59:
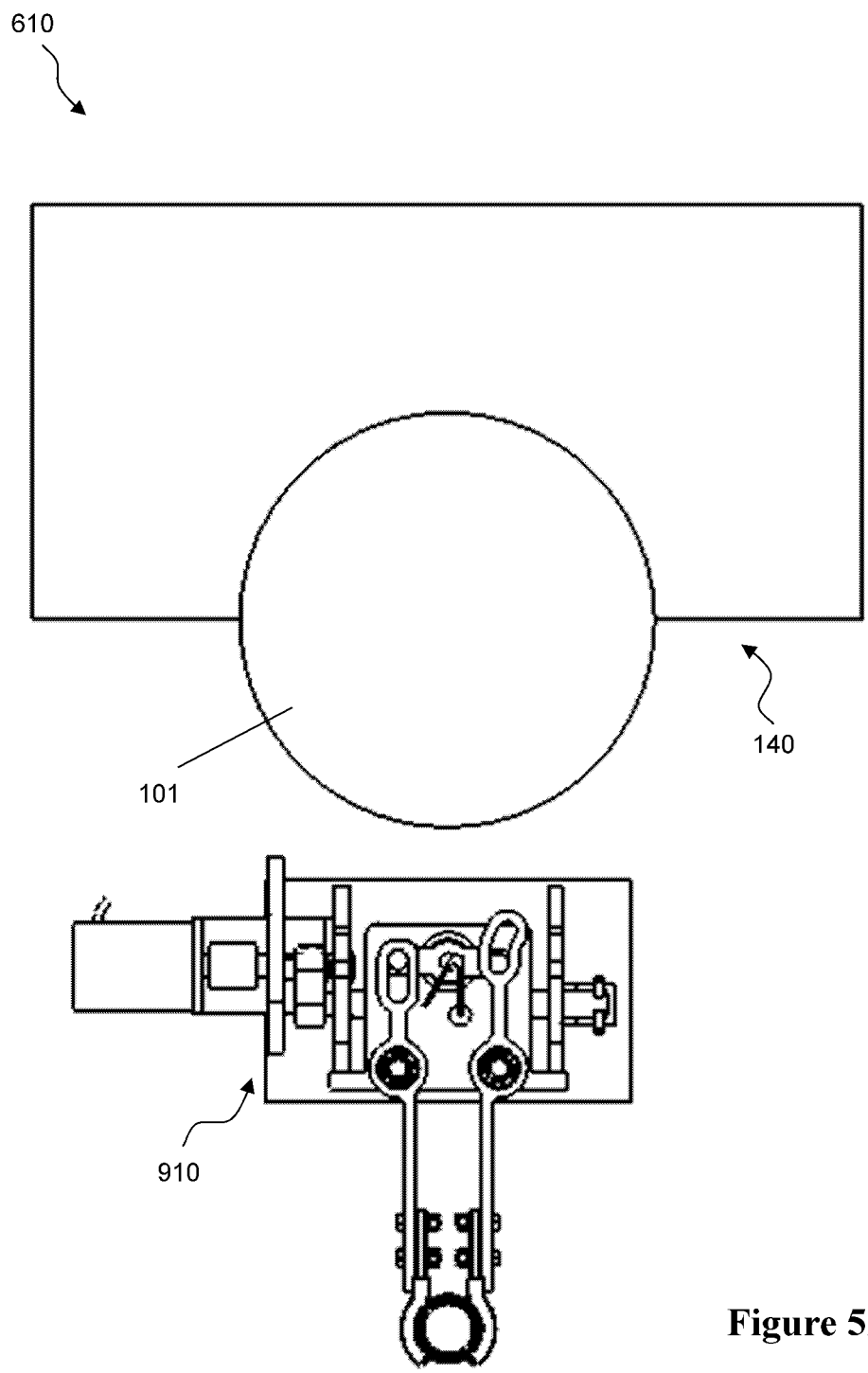
FIG. 59 shows a schematic view of a cooking system.

Referring to FIG. 59, a cooking system 610 comprises the dispensing apparatus 910 and a cooking apparatus 140. The dispensing apparatus 910 is configured to grip a container 107 of food ingredients and turn it as to dispense the food ingredients from the container to the cookware 101 of the cooking apparatus 140.

The cooking system 610 may further comprise a cleaning apparatus configured to clean the cookware 101 after a food is cooked; a lid apparatus configured to limit passage of air from and towards the cookware 101, or to limit the food or food ingredients from jumping out from the cookware 101 during a cooking process; etc. The details of the cooking system 610 are presented in the U.S. patent application Ser. No. 16/155,895, filed on Oct. 10, 2018, by the same inventor, the content of which is incorporated herein by reference in its entirety.

It should be noted that the cooking apparatus 140 in the cooking system 610 may be substituted by other types of cooking apparatus. In particular, the cookware 101 and the stirring motion mechanism in the cooking apparatus 140 may be substituted by other types of cookware and stirring motion mechanisms. Same can be said on the lid apparatus, dispensing apparatus, cleaning apparatuses of the cooking apparatus 140.

Figure 60:
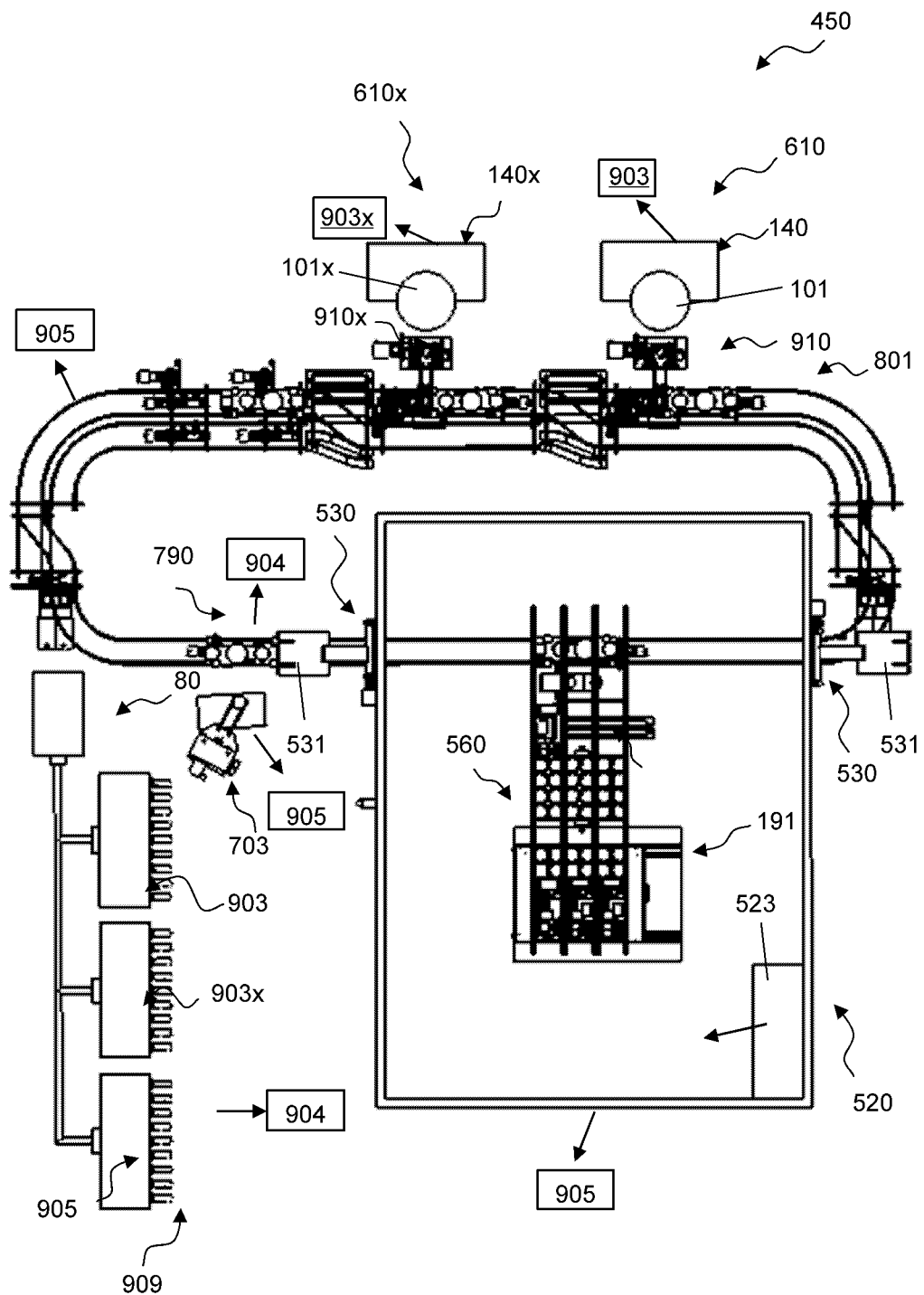
FIG. 60 shows a schematic view of a kitchen system comprising the cooking system.
Figure 61:
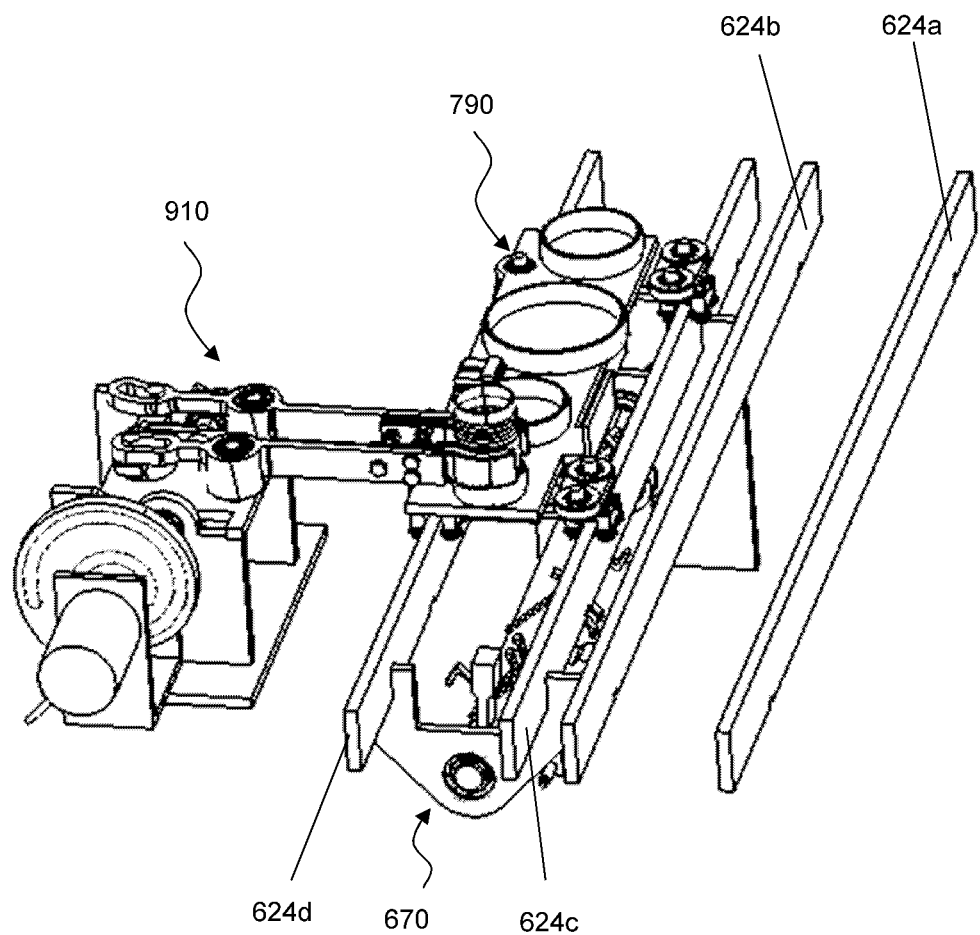
FIG. 61 shows an aerial view of parts of the kitchen system.

In some embodiments, referring to FIGS. 60-61, an automated kitchen system 450 comprises: a storage system 560; a transport system 801; a storage room 520; the refrigeration mechanism 523; the board 531 and the rotational motion mechanism 530; a cooking system 610; and a cooking system 610*x*. The storage system 560 and a part of the transport system 801 are located inside the storage room 520, as previously shown in FIGS. 46A-46B.

The cooking system 610*x* is configured the same way as the cooking system 610. Thus, the cooking system 610*x* comprising: (1) a dispensing apparatus 910*x* which is configured the same way as the dispensing apparatus 910; (2) a cooking apparatus 140*x*, which is identically configured as the cooking apparatus 140. Thus, the cooking apparatus 140*x* comprises a cookware 101*x*; a stirring motion mechanism comprising a support component 226*x*, said stirring motion mechanism being configured to produce a motion in the cookware 101*x* as to stir, mix or distribute the food or food ingredients contained in the cookware 101*x*; and a rotational motion mechanism 104 configured to rotate the support component 226*x* of the cooking apparatus 140*x* and turn the cookware 101*x* as to dispense a cooked food from the cookware. The computer 903*x* is configured to control the timing, direction or speed of the rotation of all motors in the cooking system 610*x*.

The automated kitchen system 450 further comprises an unloading apparatus 703 configured to grip and move an emptied ingredient container 107 from a holding cup of the vehicle 790 to another position (see FIG. 61). The unloading apparatus 703 may be used to unload the emptied container and move the container into a collection box for emptied containers.

The base support components of various apparatuses on the automated kitchen system 450 need to be properly positioned.

The automated kitchen system 450 further comprises the computer system 909 which includes inter-connected computers 80, 905, 903 and 903x, wherein the computers 905, 903 and 903x are connected by wires to sensors 91A, 91B, 91C, etc.; wherein said sensors can be encoders, proximity switches, and temperature sensors, etc., of the cooking systems 610 and 610x, storage system 560, transport system 801, rotational motion mechanisms 530, and unloading apparatus. The computers 905, 903 and 903x are connected by wires to electrical or electronic devices, 81A, 81B, 81C, etc.; wherein said electrical or electronic devices can be various of types of motors, electro-magnets inductive stoves or electric stoves, refrigeration apparatus of the cooking systems 610 and 610x, storage system 560, transport system 801, rotational motion mechanisms 530, and unloading apparatus. The computers 905, 903 and 903x are configured to control the functions of the electrical or electronic devices by sending signals to the electrical or electronic devices. The computer 80 as a first computer is configured to send signals to control the computers 905, 903 and 903x as second computers.

The computer 904 may optionally be connected to the computer system 909 by wireless means.

The capped ingredient containers 109 containing food ingredients may be previously placed in a transport cart 194, together with a plurality of other capped ingredient containers (usually of the same diametrical size). The transport cart 194 may be placed (e.g., by a human) in a certain fixed position in the storage apparatus 191 of the storage system 560, so that the transfer apparatus 220 may be controlled by the computer system as to grip and transfer the ingredients containers in the transport box of the transport cart 194 to other locations.

In the above discussed kitchen systems, the dispensing apparatus is configured to dispense all the food ingredients in an opened ingredient container at once.

Referring to FIG. 62, the following tasks are performed by the computer system 909 of the kitchen system 450 (or under the control of the computer system 909) before the business opens.

In Step 860, store some sub-programs in each of second computers (905, 903, and 903x) and computers 904 wherein each sub-program comprises procedures for the computer to control one or more motors and/or other electric or electronic devices of the cooking system 610 (or 610x), the storage system 560, the transport system 801, the unloading apparatus 703, etc, which are connected to the computers as to perform specific functions, and/or procedures for the computers to read the information of sensors or other electric or electronic devices, and then have the information sent to the first computer 80. The start time of a sub-program can be scheduled later, in accordance with needs. Also, install a database in the computer 80. The database will store some lists of data, including the lists as described in the following. Each cooking system (610 or 610x) is given an ID. The IDs of all cooking systems are stored in the computer 80. Each of second computers (905, 903, and 903x) and the computers 904 are given an ID. The IDs of the computers are stored in the computer 80.

In Step 861, store a list of "ingredient content types" in the computer 901. For example, an ingredient content type can be "20 oz. of sliced angus beef;" another ingredient content type can be "1.5 oz. of minced onion and 2 oz. of minced garlic." In our applications, the content contained in an ingredient container comprises food ingredient(s) of an ingredient content type. Then the computer 80 stores a menu, which is a list or a sub-list of food items that can be cooked in the kitchen. The cooking of a single food item of the menu needs the entire content of food ingredients contained in one or more ingredient containers. This reduces the burden of dividing the food ingredients contained in an ingredient container.

It should be noted that the content of some ingredient containers may not belong to an "ingredient content type" stored in the computer 80.

In Step 862, for each food item in the menu and corresponding to each cooking system (610 or 610x), the computer 80 stores in its database: (1) a "list of cooking sub-programs, IDs of the second computers and relative timings" wherein each cooking sub-program is a program run by a computer (905, 903 or 903x) of a specific ID to control the functions of, and/or to receive information from some motor(s) and/or other electric or electronic device(s) in the cooking system (610 or 610x); and (2) a "list of ingredient content types exclusively needed for the food item and their dispensing timings" comprising a list of ingredient content types that are entirely needed for cooking the food item, and the relative timing for their dispensing into the cookware (101 or 101x) of the cooking system (610 or 610x), wherein the relative timing is relative to the start times of the sub-programs in the "list of cooking sub-programs, second computer IDs and relative timings". The start time of a cooking sub-program may be fixed or limited relative to the start times of some or all of the other sub-programs in the same list, and the relations among various start times are included in the list; but the list does not include sub-programs controlling the transport system 80.

In Step 863, store the information of the storage apparatus 191 including a list of positions for storing containers of food ingredients, in the database of the computer 80. For each transport cart 194, the computer 80 stores in its database a "transport cart content information" which include the information of the containers of ingredients in the transport cart 194, including information of the barcode or QR code of the container, and the type of food ingredients contained in the container, when a capped container 109 is moved by the transfer apparatus 220 from a transport cart 194 to a position in the storage box 192 of the storage apparatus 191, it passes through a position above the scanner 90F so that the scanner 90F can take an image of the QR code or barcode of the container, and then send the image to the computer system 909 as to decode the code. The computer system 909 matches the code with the container in the "transport cart content information," and add the container to a "list of ingredient containers in storage," which lists the container code, ingredient content type, position of the container in the storage apparatus 191.

In Step 864, for each position of the container in the storage apparatus 191, and for each position of the vehicles 790 in the transport system 801, and for each cooking system (610 or 610x), the computer 80 stores in its database a "list of transfer and cap-opening sub-programs, IDs of the second computers and relative timings" for controlling functions of some motor(s) and/or other electric and electronic device(s) in the transfer apparatuses 220, the cap opening apparatus 370, the transport system 801, the container loading apparatuses 350, for the purpose that a container in the position in the storage apparatus 191 is transferred out, and is uncapped by a cap opening apparatus 370, and then is transferred to a position on the vehicle 790 of the transport system 801. As before, a sub-program here may include procedures for reading the information of some of the sensors or other electric or electronic devices and have the information sent to the computer system 909. The timing of a sub-program in the list may be fixed or limited relative to the timings of some of the other sub-programs in the same list, and the relations among various timings are included in the list. In some applications, the start times of sub-programs controlling the transport system 801 need to be limited, but not necessarily fixed relative to the start times of other sub-programs. For the battery information of each vehicle 790, the computer 80 stores in its database a "list of charging sub-programs, IDs of the second computers and the computers 904 and relative timings" for controlling the vehicle 790 to charge, the battery of the vehicle 790 is running low.

Referring to FIG. 63, the following tasks are performed by the computer system 909 of the cooking system 450.

In Step 871, when an inquiry is made for availability of a food item of the menu, usually by a person using another computer which is connected to the computer system 909, the computer system 909 is configured to read the "list of ingredient content types and numbers" of the food item and determine if there are enough containers containing the ingredient content types and numbers in the "list of containers of food ingredient in the storage apparatus 191" as required to cook the food item. If yes, then allow an order for the food item. If not, then do not allow an order for the food item.

In Step 872, for a food item ordered in Step 871, the computer system 909 determines the positions of the (capped) ingredient containers 109 in the storage apparatus 191 which are needed for cooking the food item and remove these containers from the "list of ingredient containers in storage." If facing multiple choices, the computer system 909 may be programmed to prioritize the ingredient containers which are positioned above the other ingredient containers in the same compartment of the storage apparatus 191.

In Step 873, following Step 872, for the food item ordered, the computer system 909 is configured to schedule the following: (1) the transfer and cap-opening of the needed containers of the food item ordered; (2) the cooking of the next ordered food item at a cooking system 600 or 600x, which can be a next available cooking system. The above schedule includes the start time of each sub-program in the list of cooking sub-programs or in the list of transfer and cap-opening sub-programs. The schedule also includes the timings for the ingredient containers to be transferred to and transferred out of the transport system 801.

In Step 874, the database of the computer 80 comprises a "list of instructions," where each instruction includes a sub-program, the timing of the sub-program, and the identity of the second computer (905, 903, or 903x) to run the sub-program. Following Step 873, the computer system 909 adds the following to the list of instructions: (1) the "list of cooking sub-programs, the IDs of the second computers and relative timings" corresponding to the ordered food item, with times and IDs of the second computers scheduled in Step 873; (2) the "list of transfer and cap-opening sub-programs, IDs of the second computers (905, 903, or 903x) and the computers 904 and relative timings" with specified start times and IDs of the second computers (905, 903, or 903x) and the computers 904 as scheduled in Step 873.

In Step 875, for the food item ordered, the computer system 909 can control the motions of the storage system 560, the transport system 801 and the cooking system 610 (or 610x) through the above sub-programs, schedule the following: (1) the transfer apparatuses 220 move the needed containers out of the storage apparatus 191 and the cap opening apparatus 370 opens the caps of the needed containers. (2) the container loading apparatus 350 moves the uncapped container to a mini vehicle 790 and the mini vehicle 790 move the uncapped container to a position accessible by the dispensing apparatus 910 (or 910x). (3) then the cooking system 610 (or 610x) starts cooking the food item ordered and the dispensing apparatus 910 (or 910x) dispense the food ingredients in the uncapped container into the cookware 101 (or respectively 101x) of the cooking system according to the "list of ingredient contents exclusively needed for the food item and their dispensing timings.

It should be noted that a motor in the present patent application may be an AC or DC motor, stepper motor, servo motor, inverter motor, pneumatic or hydraulic motor, etc. A motor may optionally further comprise a speed reducer, encoder, and/or proximity sensor.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

A support component described in the present patent application can be any type of rigid component. A support component may be moved or fixed relative to the ground. A rigid component may comprise one or more of the following: a bar, a tube, a beam, a board, a frame, a structure, a bearing housing, a shaft. A rigid component can be made by metal such as steel or aluminum, or by other materials, or by a combination of several types of materials.

Only a few examples and implementations are described. Other implementations, variations, modifications and enhancements to the described examples and implementations may be made without deviating from the spirit of the present invention. For example, the term cookware is used to generally refer to a device for containing or holding food ingredients during cooking. For the purpose of present patent application, a cookware can be a wok, a pot, a pan, a basket, a bowl, a container, a board, a rack, a net, or any object used to contain or otherwise hold food or food ingredients during a cooking process. The cooking also is not limited to any particular ethnic styles. The cooking may include but is not limited to frying (including stir frying), steaming, boiling, roasting, baking, smoking, microwaving, etc. The cooking apparatus may or may not use a heater.

Similarly, a food container, ingredient container, or container, can be a bowl, a plate, a cup, ajar, a bottle, a flat or curved board, a basket, a net, a wok, a pan, or any object used to contain or otherwise hold a food or food ingredients. A container can have a rather arbitrary geometric shape.

For the purpose of the present patent application, a connection of a computer (or computer system) and an electric or electronic component may compromise a wired and/or wireless connection between the computer (or computer system) and the electric or electronic device, as to allow the computer to communicate with said electric or electronic component. A connection of a computer (or computer system) and a mechanism or apparatus may comprise a wired and/or wireless connection between the computer (or computer system) and some (or all) of the electric or electronic components of the mechanism or apparatus as to allow the computer to communicate with said electric or electronic components.

The invention claimed is:

1. An automatic cooking system, comprising:
a computer system comprising a computer;
a plurality of ingredient containers, each configured to hold food ingredients; and
a system comprising a plurality of stations and a plurality of mini vehicles, wherein each mini vehicle is configured to move from station to station around the plurality of stations;
wherein each mini vehicle is configured to carry one or more said ingredient containers;
wherein the plurality of stations comprises:
a plurality of cooking stations, each comprising:
a cooking container configured to cook food ingredients therein to produce a cooked food; and
an unloading apparatus comprising a motor, wherein the unloading apparatus is configured to move a said ingredient container from a said mini vehicle as to dispense the food ingredients held in the ingredient container to the cooking container; and
one or more storage stations, each configured to store food ingredients.

2. The automatic cooking system of claim 1, wherein the computer system is configured to control the mini vehicles using wireless communication.

3. The automatic cooking system of claim 1, wherein the number of the ingredient containers carried by a mini vehicle of the plurality of mini vehicles is plural, wherein the computer system is configured to control the mini vehicle to stop at a plurality of positions at a station of the plurality of stations.

4. The automatic cooking system of claim 1, further comprising sensors configured to detect positions of the plurality of mini vehicles and send signals to the computer system, wherein the computer system is configured to determine positions of the plurality of vehicles based on the signals.

5. The automatic cooking system of claim 1, further comprising one or more rail tracks configured to connect the plurality of cooking stations and the one or more storage stations, wherein the plurality of mini vehicles are configured to move along the one or more rail tracks.

6. The automatic cooking system of claim 5 wherein the number of rail tracks is plural, the system further comprising a track switch, wherein the track switch comprises:
a support member;
a plurality of connection tracks configured to be mounted on the said support member; and
a movement mechanism configured to slide or rotate said support member among a plurality of positions;
wherein the computer system is configured to control the track switch to direct a mini vehicle of the plurality of mini vehicles to different routes along the rail tracks.

7. The automatic cooking system of claim 1, wherein the computer system is configured to control the movements of said motor(s).

8. The automatic cooking system of claim 1, wherein a said storage station comprises:
a storage container configured to store food ingredients;
a loading apparatus configured to dispense food ingredients from the storage container to a said ingredient container which is carried by a said mini vehicle, wherein the loading apparatus comprises a motor, wherein the computer system is configured to control the motor.

9. An automatic cooking system, comprising:
a computer system comprising a computer;
a plurality of ingredient containers, each configured to hold food ingredients; and
a system comprising a plurality of stations and a transport apparatus configured to move a said ingredient container from station to station around the plurality of stations;
wherein the plurality of stations comprise:
a plurality of cooking stations each comprising:
a cooking container configured to cook food ingredients therein to produce a cooked food; and
an unloading apparatus configured to turn a said ingredient container as to unload food ingredients held in the ingredient container to the cooking container,
wherein the unloading apparatus comprises a motor; and
one or more storage stations each configured to store food ingredients;
wherein the computer system is configured to control the transport apparatus and the motors in the unloading apparatuses of the plurality of cooking stations.

10. The automatic cooking system of claim 9, wherein the plurality of stations comprises a cleaning station comprising:
a cart turning apparatus configured turn an ingredient container of the plurality of ingredient containers, wherein the cart turning apparatus comprises a motor; and
an apparatus configured to spray liquid on said ingredient container, said apparatus comprising liquid pipes;
wherein the computer system is configured to control the motor of the cart turning apparatus;
wherein the computer system is configured to control the timing of the spraying of liquid.

11. The automatic cooking system of claim 9, wherein the plurality of cooking stations comprises a first cooking station configured to produce a first cooked food, wherein the plurality of cooking stations comprises a second cooking station configured to use the first cooked food as an ingredient to produce a second cooked food, wherein the first cooked food is transferred from the first cooking station to the second cooking station by a said ingredient container.

12. The automatic cooking system of claim 9, wherein the unloading apparatus of a cooking station of the plurality of cooking stations comprises:
a first component; and
a support component;
wherein the first component is configured to be rotatable relative to the support component around an axis.

13. The automatic cooking system of claim 12, wherein the unloading apparatus is configured to turn a said ingredient container around the axis of rotation of the first component relative to the support component.

14. The automatic cooking system of claim 12, wherein the unloading apparatus further comprises a second component configured to be rotatable relative to the first component around an axis.

15. The automated cooking system of claim 14, wherein the unloading apparatus further comprises:
- one or more hooks configured to be connected to the first component;
- one or more hooks configured to be connected to the second component;
- a wheel configured to be rotatable relative to the second component; and
- a curved track mounted on the support component;
- wherein the wheel is configured to be restrained by the curved track;
- wherein the axis of rotation of the second component relative to the first component is configured to be parallel to the axis of rotation of the first component relative to the support component.

16. The automated cooking system of claim 9, wherein the unloading apparatus of a cooking station of the plurality of cooking stations comprises:
- a powered apparatus configured to grab a said ingredient container;
- a rotation mechanism configured to turn the powered apparatus around an axis; and
- a motor configured to drive the rotation mechanism.

17. The automatic cooking system of claim 9, wherein a said storage station comprises
- a storage container configured to store food ingredients; and
- a loading apparatus configured to dispense food ingredients from the storage container to a said ingredient container, wherein the loading apparatus comprises a motor, wherein the computer system is configured to control the motor.

18. The automated cooking system of claim 17, wherein the loading apparatus comprises one or more of: a tunnel, a funnel, a clipping device, a robotic arm, or a grabbing device.

19. The automatic cooking system of claim 9, further comprising a storage container and a loading apparatus comprising:
- a first component mounted below the said storage container, configured to enclose a space under the storage container, wherein the space is configured to receive food ingredients from the storage container; and
- a second component;
- wherein the first component is configured to slide relative to the second component under the control of the computer system, wherein said sliding is configured either to adjust the volume of the enclosed space, or to transfer the food ingredients in the enclosed space to the cooking container of a cooking station of the plurality of cooking stations.

20. The automatic cooking system of claim 9, wherein the computer system is configured to track the types and quantities of the food ingredients held in the storage stations, and the types and quantities of the food ingredients held in the plurality of ingredient containers.

* * * * *